(12) United States Patent
Honda et al.

(10) Patent No.: US 9,817,889 B2
(45) Date of Patent: Nov. 14, 2017

(54) SPEECH-BASED PRONUNCIATION SYMBOL SEARCHING DEVICE, METHOD AND PROGRAM USING CORRECTION DISTANCE

(75) Inventors: Hitoshi Honda, Kanagawa (JP); Yoshinori Maeda, Kanagawa (JP); Satoshi Asakawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 537 days.

(21) Appl. No.: 13/511,401

(22) PCT Filed: Dec. 2, 2010

(86) PCT No.: PCT/JP2010/071605
§ 371 (c)(1),
(2), (4) Date: Aug. 29, 2012

(87) PCT Pub. No.: WO2011/068170
PCT Pub. Date: Jun. 9, 2011

(65) Prior Publication Data
US 2013/0006629 A1  Jan. 3, 2013

(30) Foreign Application Priority Data
Dec. 4, 2009 (JP) ................................ 2009-276996

(51) Int. Cl.
*G10L 15/00* (2013.01)
*G06F 17/30* (2006.01)
(Continued)

(52) U.S. Cl.
CPC ...... *G06F 17/30681* (2013.01); *G10L 15/187* (2013.01); *G10L 15/08* (2013.01); *G10L 15/22* (2013.01); *G10L 2015/025* (2013.01)

(58) Field of Classification Search
CPC .... G10L 15/08; G10L 15/22; G10L 2015/025
(Continued)

(56) References Cited

U.S. PATENT DOCUMENTS 4,839,853 A * 6/1989 Deerwester ............. G06F 17/21
6,701,292 B1 * 3/2004 Kawai et al. ................. 704/238
(Continued)

FOREIGN PATENT DOCUMENTS

CN    101206859 A    6/2008
JP    2001-242884    9/2001
(Continued)

OTHER PUBLICATIONS

International Seach Report dated Jan. 18, 2011 in PCT/JP10/71605 Filed Dec. 2, 2010.
(Continued)

*Primary Examiner* — David Hudspeth
*Assistant Examiner* — Oluwadamilola M Ogunbiyi
(74) *Attorney, Agent, or Firm* — Chip Law Group

(57) ABSTRACT

The present invention relates to a searching device, searching method, and program whereby searching for a word string corresponding to input voice can be performed in a robust manner.

A voice recognition unit 11 subjects an input voice to voice recognition. A matching unit 16 performs matching, for each of multiple word strings for search results which are word strings that are to be search results for word strings corresponding to the input voice, of a pronunciation symbol string for search results, which is an array of pronunciation symbols expressing pronunciation of the word string search result, and a recognition result pronunciation symbol string which is an array of pronunciation symbols expressing pronunciation of the voice recognition results of the input voice. An output unit 17 outputs a search result word string which is the result of searching the word strings corresponding to the input voice from the multiple word strings for search results, based on the matching results of the pronunciation symbol string for search results and the recognition
(Continued)

result pronunciation symbol string. The present invention can be applied in the case of performing voice searching, for example.

11 Claims, 49 Drawing Sheets

(51) Int. Cl.
*G10L 15/187* (2013.01)
*G10L 15/22* (2006.01)
*G10L 15/08* (2006.01)
*G10L 15/02* (2006.01)

(58) Field of Classification Search
USPC .......................................................... 704/251
See application file for complete search history.

(56) References Cited

U.S. PATENT DOCUMENTS

| | | | |
|---|---|---|---|
| 7,353,164 B1* | 4/2008 | Bellegarda | 704/1 |
| 7,725,307 B2* | 5/2010 | Bennett | G06F 17/27 704/238 |
| 7,983,915 B2* | 7/2011 | Knight et al. | 704/254 |
| 8,166,029 B2* | 4/2012 | Park et al. | 707/732 |
| 2003/0050779 A1* | 3/2003 | Riis et al. | 704/236 |
| 2004/0249774 A1* | 12/2004 | Caid | G06F 17/30256 706/14 |
| 2005/0102139 A1 | 5/2005 | Fukada | |
| 2005/0159953 A1* | 7/2005 | Seide et al. | 704/254 |
| 2008/0037716 A1* | 2/2008 | Bran | H04M 1/72547 379/67.1 |
| 2008/0162125 A1* | 7/2008 | Ma et al. | 704/222 |
| 2008/0270138 A1* | 10/2008 | Knight | G06F 17/30026 704/260 |
| 2009/0234853 A1* | 9/2009 | Gupta | G06F 17/30864 |
| 2011/0153329 A1* | 6/2011 | Moorer | G06Q 30/02 704/254 |

FOREIGN PATENT DOCUMENTS

| | | |
|---|---|---|
| JP | 2002 252813 | 9/2002 |
| JP | 2002-252813 | 9/2002 |
| JP | 2005 150841 | 6/2005 |
| JP | 2005-150841 | 6/2005 |

OTHER PUBLICATIONS

Combined Chinese Office Action and Search Report dated Jul. 22, 2013 in Chinese Patent Application No. 201080053823.0 (with English-language translation).

* cited by examiner

FIG. 26

| | SPEAKING |
|---|---|
| | 世界/遺産/都市/の/遺産/イタリア/ローマ/ベネチア/ナポリ/フィレンツェ<br>(SEKAI/ISAN/TOSHI/NO/ISAN/ITARIA/ROMA/VENECHIA/NAPORI/FIRENZE)<br>WORLD/HERITAGE/CITY/OF/HERITAGE/ITALY/ROME/VENICE/NAPLES/FLORENCE |

⇕ DISTANCE CALCULATION

| PROGRAM TITLE | |
|---|---|
| | 世界/遺産<br>(SEKAI/ISAN)<br>WORLD/HERITAGE |
| | 探検/ロマン/世界/遺産/イタリア/フィレンツェ/歴史/地区<br>(TANKEN/ROMAN/SEKAI/ISAN/ITARIA/FIRENZE/REKISHI/CHIKU)<br>EXPLORE/ROMANTICISM/WORLD/HERITAGE/ITALY/<br>FLORENCE/HISTORICAL/DISTRICT |

| COSINE<br>DISTANCE | FIRST<br>CORRECTION<br>DISTANCE | SECOND<br>CORRECTION<br>DISTANCE |
|---|---|---|
| 0.4772 | 0.2991 | 0.2 |
| 0.4472 | 0.4229 | 0.4 |

FIG. 27

| SPEAKING |
|----------|
| World/ Heritage |

⇔ MATCHING

| PROGRAM TITLE | COSINE DISTANCE | FIRST CORRECTION DISTANCE | SECOND CORRECTION DISTANCE |
|---|---|---|---|
| The/World/Heritage/Special/Program/on/Italian/Cities/Rome/Venice | 0.4472 | 0.6687 | 1 |
| World/Affairs | 0.5 | 0.5 | 0.5 |

FIG. 30

| PROGRAM TITLE | ENTERTAINER NAME | DETAILED INFORMATION |
|---|---|---|
| GOKIGENYO BY LION | KOSAKAI KAZUKI | STORE RUN BY A 5-YEAR OLD ▽NAKAGAWA-KE, ETC. |
| WARATTE IITOMO | TAMORI | ▽MANY ASTONISHINGLY MISMATCHED COUPLES ON SHOW ▽ON TELEPHONE SHOCKING |
| MERENGE NO KIMOCHI | HISAMOTO MASAMI, MATSUURA AYA, USUDA ASAMI, ISHIDZUKA HIDEHIKO | TENDO YOSHIMI'S MANSION UNVEILED!! FUJIWARA HARANISHI'S WIFE AND DAUGHTER |
| THE WORLD HERITAGE | ICHIMURA MASACHIKA | PIAZZA DEL DUOMO OF PISA (ITALY) |
| TAMESHITE GATTEN | TATEKAWA SHINOSUKE, ONO FUMIE | DIET FOR A HEALTHY BRAIN SUPER-EASY JOGGING REVOLUTION! |

FIG. 40

| USER SPEAKING | 「音声検索で再生」<br>(ONSEI KENSAKU DE SAISEI)<br>"SAISEI (PLAY, TURNAROUND, RENEW,<br>PLAYBACK, ETC.) WITH VOICE SEARCH"<br><br>NHKスペシャル企業再生<br>(NHK SUPESHARU KIGYOU SAISEI)<br>NHK SPECIAL: CORPORATE TURNAROUND<br><br>小さな旅思い出再生　工房〜東京墨田区〜<br>(CHISANA TABI OMOIDE SAISEI KOBO<br>〜TOKYO SUMIDA-KU〜)<br>SMALL JOURNEY: PLAYBACK OF MEMORIES: WORKSHOP<br>-SUMIDA-KU, TOKYO- | 「再生」<br>(SAISEI)<br>"PLAY" | TREAT AS PLAY COMMAND FOR DEVICE CONTROL INSTEAD OF PERFORMING A PROGRAM SEARCH |

FIG. 41

| USER SPEAKING | "Program Search, Play" | "Play" |
|---|---|---|
| | Child's Play | No TV Program Search Done. Treated as Control Command |
| | Play of the Week | |

FIG. 42

| USER SPEAKING | 「番組タイトル検索でタモリ」<br>(BANGUMI TAITORU KENSAKU DE TAMORI)<br>"TAMORI WITH PROGRAM TITLE SEARCH" | 「人名検索でタモリ」<br>(JINMEI KENSAKU DE TAMORI)<br>"TAMORI WITH NAME SEARCH" |
|---|---|---|
| SEARCH RESULT | タモリ倶楽部<br>(TAMORI KURABU)<br>TAMORI CLUB | 笑っていいとも<br>(WARATTE IITOMO)<br>WARATTE IITOMO |
| | ブラタモリ<br>(BURA TAMORI)<br>BURA TAMORI | ミュージックステーション<br>(MUSIC STATION)<br>MUSIC STATION |

FIG. 43

| USER SPEAKING | "Program Title Search by Obama" | "Cast Search by Obama" |
|---|---|---|
| SEARCH RESULT | President Obama Press Conference | Tonight Show with Jay Leno |
| | The Election of Barack Obama | Larry King Live |

FIG. 47

| RECOGNITION RESULT | | | | | | | | |
|---|---|---|---|---|---|---|---|---|
| RECOGNITION RESULT PRONUNCIATION SYMBOL STRING | VECTOR SUBSTITUTION INFORMATION OF VOICE RECOGNITION RESULTS | | | | | | | |
| | | 1 | 2 | 3 | 4 | 5 | 6 | 7 |
| さんまのまんま (SANMANOMANMA) | | さ(SA) | の(NO) | ま(MA) | ま(MA)(2) | ま(MA)(3) | ん(N) | ん(N)(2) |

REVERSE LOOKUP INDEX

| PRONUNCIATION SYMBOL | ID | | | |
|---|---|---|---|---|
| あ(A) | 4 | | | |
| い(I) | 2 | 3 | | |
| い(I)(2) | 2 | | | |
| か(KA) | 2 | | | |
| き(KI) | 4 | | | |
| さ(SA) | 1 | 2 | | |
| す(SU) | 3 | 4 | | |
| せ(SE) | 2 | | | |
| だ−(DAH) | 3 | | | |
| て(TE) | 4 | | | |
| の(NO) | 1 | 4 | | |
| ぱ(PA) | 3 | | | |
| ま(MA) | 1 | 3 | | |
| ま(MA)(2) | 1 | | | |
| ま(MA)(3) | 1 | | | |
| ん(N) | 1 | 2 | 3 | 4 |
| ん(N)(2) | 1 | | | |

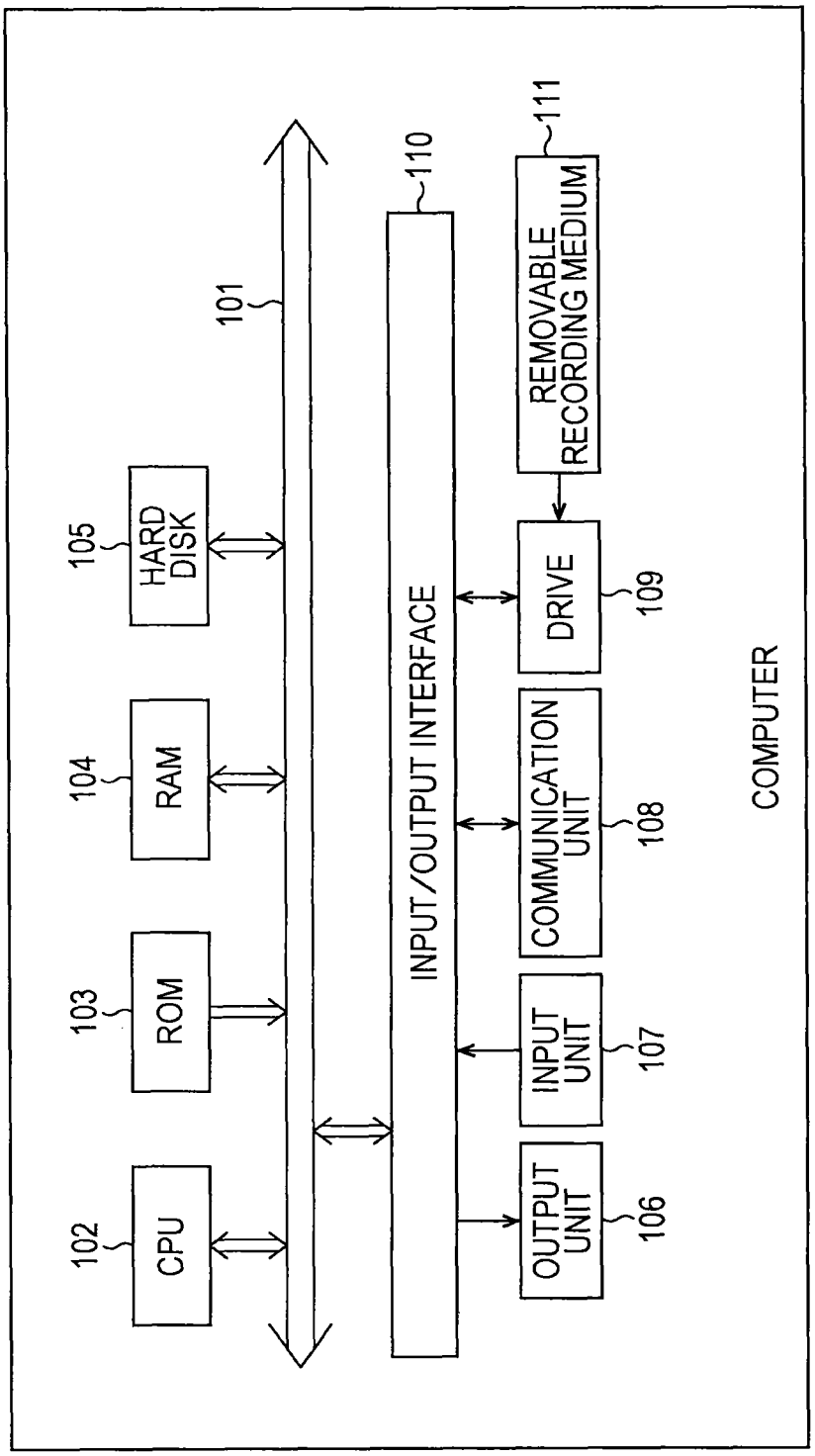

US 9,817,889 B2

1

SPEECH-BASED PRONUNCIATION SYMBOL SEARCHING DEVICE, METHOD AND PROGRAM USING CORRECTION DISTANCE

TECHNICAL FIELD

The present invention relates to a searching device, searching method, and program, and particularly relates to a searching device, searching method, and program whereby searching of a word string corresponding to input voice can be performed in a robust manner, for example.

BACKGROUND ART

As a method of voice searching that uses input voice which is a input voice from a user and searches a word string such as text or the like corresponding to the voice thereof, for example there is a method that uses only a voice recognition device (e.g., see PTL 1).

With voice searching that uses only a voice recognition device, in the voice recognition device, voice recognition of the input voice is performed on the array of words (vocabulary) registered beforehand in a dictionary, with voice recognition results as the object, and the voice recognition results thereof are output as a search result word string which is the result of searching for the word string corresponding to the input voice.

Accordingly, with the voice search that uses only a voice recognition device, the word string intended for search results of a word string corresponding to the input voice (hereafter, also called word string for search results) is only a word string which is an array of words registered in the dictionary (according to the present Specification, one word is included) which is intended for voice recognition results, whereby speech by the user is limited to the array of words registered in the dictionary used for voice recognition.

Now, in recent years, a voice searching method called voice search (Voice Search) has been proposed.

In Voice Search, a language model such as N-gram or the like is used to perform consecutive voice recognition, and matching of the voice recognition results and text that is registered in a DB (Database) prepared separately from the dictionary used for voice recognition (text searching of text corresponding to the voice recognition results from the text registered in the DB) is performed.

Subsequently, based on the matching results thereof, the text that is the highest ranking or that is within the top N places matching the voice recognition result is output as the search result word string.

With Voice Search, the text registered in the DB prepared separately from the dictionary used for voice recognition becomes the word string for search results, whereby, by registering multiple texts in the DB, the multiple texts thereof can be subjected to voice searching as word strings for search result.

That is to say, according to Voice Search, even if the user performs speech of words other than the words registered in the dictionary used for voice recognition, voice searching can be performed with a certain degree of accuracy within the range of the text serving as the word strings for search results registered in the DB.

2

CITATION LIST

Patent Literature

PTL 1: Japanese Unexamined Patent Application Publication No. 2001-242884

SUMMARY OF INVENTION

Technical Problem

Now, with conventional Voice Search, matching of the voice recognition results and the text serving as the word strings for search results is performed by using the voice recognition results and notation symbols which are symbols that express notation of each of the word strings for search results, in increments of words or increments of notation symbols.

Accordingly, if there is an error in the notation symbol of the voice recognition results, during the matching, a completely different word string for search results from the word string corresponding to the input voice may be matched to the voice recognition results, and consequently, such a completely different word string for search results from the word string corresponding to the input voice may be output as the search result word string.

That is to say, if the user speaks "toshi no sekai", for example, in Japanese as the input voice, and in the case that the symbol string of the voice recognition result thereof is "toshi no sekai" ("world of cities", in English), with matching in increments of words, the notation symbol string of the voice recognition result "toshi no sekai" is segmented into one word at a time, as "toshi/no/sekai/" (the slash (/) indicates a segment), and matching is performed, and with matching in increments of notation symbols, the notation symbol string of the voice recognition result "toshi no sekai" is segmented into one notation symbol at a time, as "to/shi/no/se/kai", and matching is performed.

On the other hand, in the case that the notation symbol string of the voice recognition result of the input voice toshi no sekai" is "toshi-no-se kai" ("is it the end of the year?" in English), with matching in increments of words, the notation symbol string of the voice recognition result "toshi-no-se kai" is segmented into one word at a time, as "/toshi/no/se/kai/", matching is performed, and with matching in increments of notation symbols, the notation symbol string of the voice recognition result "toshi-no-se kai" is segmented into one notation symbol at a time, as "toshi/no/se/ka/i", and matching is performed.

Accordingly, the case that the notation symbol string of the voice recognition result of the input voice "toshi no sekai" is ("world of cities", in English), and in the case of "toshi-no-se kai" ("is it the end of the year?" in English), the word string for search results that match the voice recognition results greatly differ, and consequently, a word string for search results that is completely different from the word string corresponding to the search result word string may be output as the search result word string, while a word string corresponding to the input voice may not be output as the search result word string.

As in the above, the matching using the notation symbols does not have a high consistency with the voice recognition results, and the word string corresponding to the input voice may not be output as the search result word string.

Also, in the case that the user speaks, as an input voice, in English, for example, "tolkien" (Lord of the Rings author (the author of "the Lord of the Rings")), and the notation symbol string of the voice recognition results thereof is one word, "tolkien", for example, in matching in increments of words, the one word "tolkien" which is the notation symbol string of the voice recognition results is used without change and matching is performed, and in matching in increments of notation symbols (alphabetic character), the notation symbol string of the voice recognition results "tolkien" is segmented into single notation symbols as t/o/l/k/i/e/n, and matching is performed.

On the other hand, in the case that the notation symbol string of the voice recognition results of the input voice "tolkien" is "toll keene", for example, in matching in increments of words, the notation symbol string "toll keene" of the voice recognition result is segmented into single words as toll/keene and matching is performed, and in matching, in increments of notation symbol (alphabetic character) increments, segmenting is done in alphabet increments which are single notation symbols, as t/o/l/l/k/e/e/n/e, and matching is performed.

Accordingly, the word string for search results that matches the voice recognition results differs greatly between the case that the notation symbol string of the voice recognition result of the input voice "tolkien" is "tolkien" and in the case of "toll keene", and consequently, while a completely different word string for search results from the word string corresponding to the input voice is output as the search result word string, the word string corresponding to the input voice may not be output as the search result word string.

The present invention has been made with consideration for such situations, and enables searching of a word string corresponding to input voice in a robust manner, and obtaining the word string corresponding to the input voice as the search result words string.

Solution to Problem

An aspect of the present invention is a searching device, or a program to cause a computer to function as a searching device, wherein the searching device or program according to an aspect of the present invention has a voice recognition unit to subject input voice to voice recognition; a matching unit to perform matching, regarding each of multiple word strings for search results which are word strings that are to be search results for word strings corresponding to the input voice, of a pronunciation symbol string for search results, which is an array of pronunciation symbols expressing pronunciation of the word string search result, and a recognition result pronunciation symbol string which is an array of pronunciation symbols expressing pronunciation of the voice recognition results of the input voice; and an output unit to output a search result word string which is the result of searching the word strings corresponding to the input voice from the multiple word strings for search results, based on the matching results of the pronunciation symbol string for search results and the recognition result pronunciation symbol string.

The searching method according to an aspect of the present invention is a searching method that includes the steps for a searching device to search for a word string corresponding to an input voice, wherein the input voice is subjected to voice recognition; matching is performed regarding each of multiple word strings for search results which are word strings that are to be search results for word strings corresponding to the input voice, of a pronunciation symbol string for search results, which is an array of pronunciation symbols expressing pronunciation of the word string search result, and a recognition result pronunciation symbol string which is an array of pronunciation symbols expressing pronunciation of the voice recognition results of the input voice; and a search result word string is output, which is the result of searching the word strings corresponding to the input voice from the multiple word strings for search results, based on the matching results of the pronunciation symbol string for search results and the recognition result pronunciation symbol string.

According to an aspect as in the above, an input voice is subjected to voice recognition, matching is performed regarding each of multiple word strings for search results which are word strings that are to be search results for word strings corresponding to the input voice, of a pronunciation symbol string for search results, which is an array of pronunciation symbols (phonetic symbol) expressing pronunciation of the word string search result, and a recognition result pronunciation symbol string which is an array of pronunciation symbols expressing pronunciation of the voice recognition results of the input voice. Also, a search result word string is output, which is the result of searching the word strings corresponding to the input voice from the multiple word strings for search results, based on the matching results of the pronunciation symbol string for search results and the recognition result pronunciation symbol string.

Note that the searching device may be an independent device, or may be an internal block that makes up one device.

Also, the program can be provided by transmitting via a transmission medium or by recording on a recording medium.

Advantageous Effects of Invention

According to an aspect of the present invention, searching for a word string corresponding to input voice can be performed in a robust manner.

BRIEF DESCRIPTION OF DRAWINGS

FIG. 26 is a diagram illustrating an example of matching simulation results in the case of employing a cosine distance D, first correction distance D1, and second correction distance D2, as a degree of similarity between the voice recognition results and the word string for search results.

FIG. 27 is a diagram illustrating an example of matching simulation results in the case of employing a cosine distance D, first correction distance D1, and second correction distance D2, as a degree of similarity between the voice recognition results and the word string for search results.

FIG. 30 is a diagram showing an example of program metadata serving as the word string for search results that is stored in a storage unit for search results 53.

FIG. 40 is a diagram illustrating an example of voice searching by input voice that includes an identified phrase.

FIG. 41 is a diagram illustrating an example of voice searching by input voice that includes an identified phrase.

FIG. 42 is a diagram illustrating an example of voice searching by input voice that includes an identified phrase.

FIG. 43 is a diagram illustrating an example of voice searching by input voice that includes an identified phrase.

FIG. 47 is a diagram describing a method to calculate the inner product $V_{UTR} \cdot V_{TITLE}(i)$, using the reverse lookup index.

FIG. 49 is a block diagram illustrating a configuration example of an embodiment of a computer to which the present invention has been applied.

DESCRIPTION OF EMBODIMENTS

Figure 1:
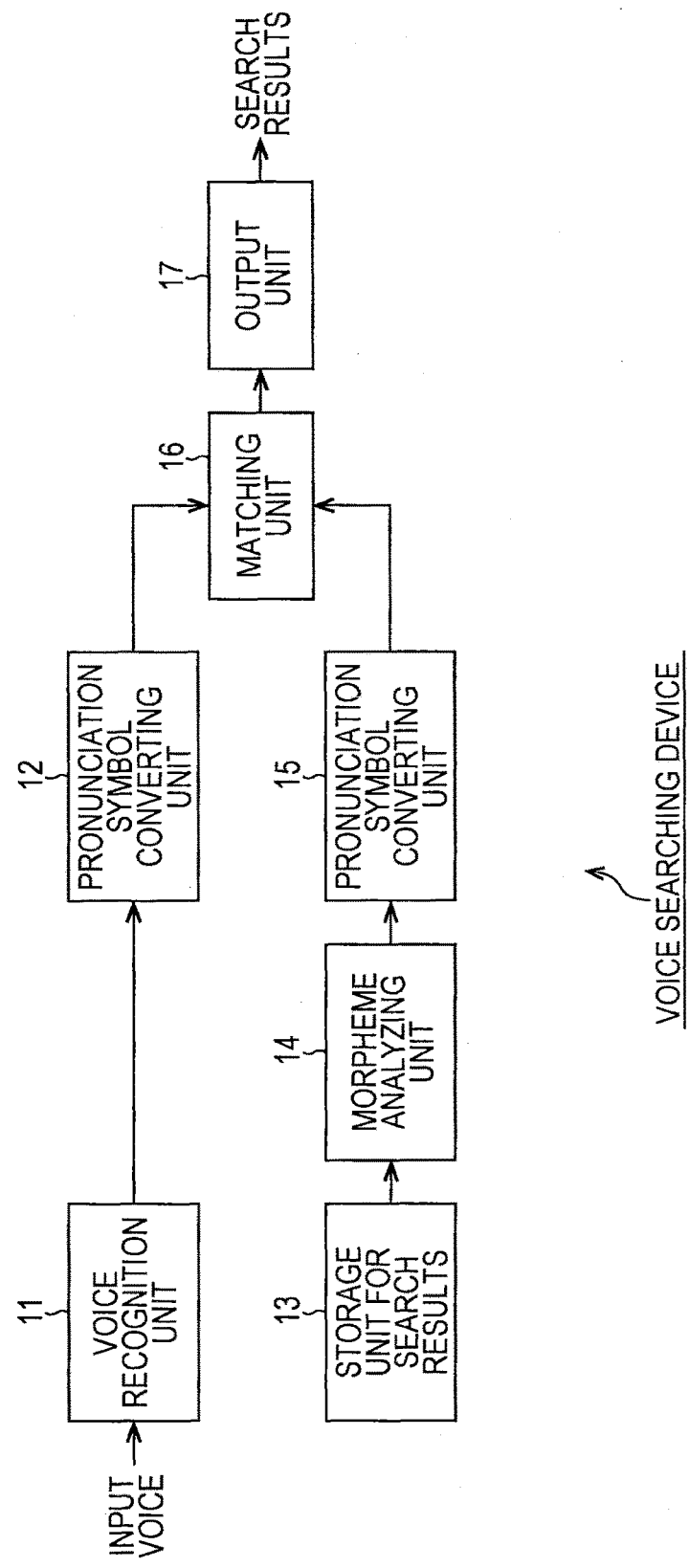
FIG. 1 is a block diagram illustrating a first configuration example of an embodiment of a voice searching device to which the present invention has been applied.

An embodiment of the present invention will be described below, but first, an overview of voice searching with Voice Search will be briefly described.

[Overview of Voice Search]

With Voice Search, matching between voice recognition results and text serving as a word string for search results is performed in increments of words or in increments of notation symbols, using notation symbols which are symbols expressing the notation for each of the voice recognition results and the word string for search results.

Accordingly, if there is an error in the notation symbol of the voice recognition results, during the matching, a completely different word string for search results from the word string corresponding to the input voice may be matched to the voice recognition results, and consequently, such a completely different word string for search results from the word string corresponding to the input voice may be output as the search result word string.

That is to say, if the user speaks "toshi no sekai", for example, in Japanese as the input voice, and in the case that the symbol string of the voice recognition result thereof is "toshi no sekai" ("world of cities", in English), with matching in increments of words, the notation symbol string of the voice recognition result "toshi no sekai" is segmented into one word at a time, as "toshi/no/sekai/" (the slash (/) indicates a segment), and matching is performed, and with matching in increments of notation symbols, the notation symbol string of the voice recognition result "toshi no sekai" is segmented into one notation symbol at a time, as "to/shi/no/se/kai", and matching is performed.

On the other hand, in the case that the notation symbol string of the voice recognition result of the input voice toshi no sekai" is "toshi-no-se kai" ("is it the end of the year?" in English), with matching in increments of words, the notation symbol string of the voice recognition result "toshi-no-se ka" is segmented into one word at a time, as "/toshi/no/se/kai/", matching is performed, and with matching in increments of notation symbols, the notation symbol string of the voice recognition result "toshi-no-se kai" is segmented into one notation symbol at a time, as "toshi/no/se/ka/i", and matching is performed.

Accordingly, the case that the notation symbol string of the voice recognition result of the input voice "toshi no sekai" is "toshi no sekai" ("world of cities", in English), and in the case of "toshi-no-se kai" ("is it the end of the year?" in English), the word string for search results that match the voice recognition results greatly differ, and consequently, a word string for search results that is completely different from the word string corresponding to the search result word string may be output as the search result word string, while a word string corresponding to the input voice may not be output as the search result word string.

Also, in the case that the user speaks, as an input voice, in English, for example, "tolkien", and the notation symbol string of the voice recognition results thereof is one word, "tolkien", for example, in matching in increments of words, the one word "tolkien" which is the notation symbol string of the voice recognition results is used without change and matching is performed, and in matching in increments of notation symbols, the notation symbol string of the voice recognition results "tolkien" is segmented into single notation symbols as t/o/l/k/i/e/n, and matching is performed.

On the other hand, in the case that the notation symbol string of the voice recognition results of the input voice "tolkien" is "toll keene", for example, in matching in increments of words, the notation symbol string "toll keene" of the voice recognition result is segmented into single words as toll/keene and matching is performed, and in matching in increments of notation symbol increments, segmenting is done in alphabet increments which are single notation symbols, as t/o/l/l/k/e/e/n/e, and matching is performed.

Accordingly, the word string for search results that matches the voice recognition results differs greatly between the case that the notation symbol string of the voice recognition result of the input voice "tolkien" is "tolkien" and in the case of "toll keene", and consequently, while a completely different word string for search results from the word string corresponding to the input voice is output as the search result word string, the word string corresponding to the input voice may not be output as the search result word string.

As in the above, the matching using the notation symbols does not have a high consistency with the voice recognition results, and the word string corresponding to the input voice may not be output as the search result word string.

Now, according to the present embodiment, by performing matching of the voice recognition results and word strings for search result by using pronunciation symbols which are symbols expressing the pronunciation of each of the voice recognition results and the word strings for search results, searching for a word string corresponding to input voice can be performed in a robust manner, and therefore a word string corresponding to the input voice can be prevented from being output as a search result word string.

Also, with Voice Search, in the matching of the voice recognition results and word strings for search results, a degree of similarity is sought which is the degree that the voice recognition results and the word string for search results are similar.

As a degree of similarity, cosine distance (cosine distance) of a vector space method, or the like, may be used, for example.

Now, in a vector space, if a vector indicating the voice recognition results is expressed as X, and a vector indicating the word string for search results is expressed as Y, the cosine distance serving as the degree of similarity between the voice recognition results and the word string for search results can be found by dividing the inner product of the vectors X and Y with a value derived from multiplying a vector X size (norm) |X| and vector Y size |Y|.

As in the above, the cosine distance is found by dividing the inner product by a value derived from multiplying the size |X| of the vector X expressing voice recognition results and the size |Y| of the vector Y expressing the word string for search results, whereby discrepancies in the lengths of the voice recognition results and word string for search results can affect the cosine distance.

Therefore, when employing cosine distance as a degree of similarity, for example, with a word string for search result that includes the same word string as that included in the voice recognition result but that has a length longer than the voice recognition result, and a word string for search results that is shorter than the voice recognition results, there is a strong trend whereby the degree of similarity with the word string for search results that is shorter than the voice recognition results is higher (similar), and the degree of similarity with the word string for search results that is longer than the voice recognition results is lower (not similar).

Accordingly, in the case of outputting a word string for search results having a high degree of similarity within the top N places, obtained as a result of the matching, to serve as the search result word string, degree of similarity with a word string for search results that includes the same word string as that included in the voice recognition results but that the length is longer than the voice recognition results becomes low, and such long word strings for search results will often not be output as search result word strings, and the search accuracy of word strings corresponding to the input voice deteriorates.

Thus, according to the present embodiment, so as to reduce the effects of discrepancies in the lengths of the voice recognition results and the word string for search results, a corrected distance that corrects the cosine distance is employed as a degree of similarity between the voice recognition result and word string for search results, whereby searching for a word string corresponding to the input voice can be performed in a robust manner, and thus deterioration of accuracy in searching for a word string corresponding to the input voice is prevented.

Note that as a method to find the correction distance wherein the cosine distance is corrected so as to reduce the effects of discrepancies in the lengths of the voice recognition results and the word string for search results, for example there is a method which uses, instead of a size |Y| that is proportional to the length of the word string for search results used in the event of finding the cosine distance, a non-proportional value, and a method that does not use the size |Y|.

Next, with Voice Search, there may be an enormous number of texts serving as a word string for search results, such as several hundreds of thousands, and in order to quickly output the search result word strings, as to the speech of the user, which are search results of word strings corresponding to the speech (input voice) thereof, matching has to be performed at high speed.

Thus, according to the present embodiment, matching is performed at high speed by using a reverse lookup index or the like.

Also, with audio recognition of Voice Search, an acoustic model such as HMM (Hidden Markov Model) or the like is used to find an acoustic score indicating the acoustic likelihood of a voice recognition result, of a recognition hypothesis which is a voice recognition result candidate (hypothesis), while a language score expressing the linguistic likelihood of a recognition hypothesis is found using a language model such as N-gram or the like, and (the recognition hypothesis serving as) the voice recognition results are found by considering both of the acoustic score and language score thereof.

The language model used in the voice recognition of Voice Search is generated using word strings written in a newspaper, for example.

Accordingly, if the user in an effort to obtain a word string for search results that includes a word string having low frequency of appearing in a text written in a newspaper (including word strings that do not appear) (low frequency word string), as the search result word string, speaks the low frequency word string thereof, the language score obtained for the low frequency word string is low in the voice recognition, and the correct voice recognition results may not be able to be obtained.

In the case, then, that the correct voice recognition results are not obtained, in the Voice Search, even with matching performed subsequent to the voice recognition, the search result word string corresponding to the input voice (word string for search results appropriate to the input voice) does not match the voice recognition results, and the word string for search results corresponding to the input voice may not be output as the search result word string.

Specifically, for example, with a recorder to which the Voice Search is applied, in the case of searching for the program having the title that the user has spoken with Voice Search from an EPG (Electronic Program Guide), as to the speech of the user, and performing a recording reservation of the program thereof, with Voice Search, first, voice recognition of the title of the program that the user has spoken is performed.

Coined terms, names of entertainers (stage names, etc.), and unique expressed are often used in program titles, and accordingly, word strings that are not word strings generally used in articles written in the newspaper are not often included.

If the voice recognition of the speech of such a program title is performed using a language model generated using the word strings written in newspapers (hereafter, also called general-use language model), a high value is not obtained on a language score of the recognition hypothesis matching the program title.

Consequently, the recognition hypothesis matching the program title is not obtained as the voice recognition results, and the accuracy of the voice recognition deteriorates.

Thus, according to the present embodiment, multiple word strings for search results which are word strings that are for search results of the word string corresponding to the input voice, i.e., in Voice Search the word strings for search results that are the word strings that match the voice recognition results, are used to generated a so-called dedicated language model, and by performing voice recognition using such dedicated language model, accuracy of the voice recognition can be improved.

That is to say, for example, as described above, in the case of searching for a program title from an EPG, the words strings that are the configuration elements making up the EPG (program titles, entertainer names, etc.) are the word strings for search results that match the voice recognition results, whereby the dedicated language model is generated using word strings for search results serving as the configuration elements making up the EPG.

Now, in the case that the word strings that are the configuration elements making up the EPG (program titles, entertainer names, etc) are the word strings for search results, the word strings for search results can be said to be divided into fields such as program titles, entertainer names, etc.

Now, in the case that word strings divided into multiple fields are prepared, a language model is generated for each field, using the word strings of each field, and the language model for each field is interpolated (interpolate) to one language model, and when voice recognition is performed using the one language model thereof, the language score of the recognition hypothesis wherein (one portion each of) the word strings of the different field are arrayed may increase.

That is to say, for example, as described above, if voice recognition is performed using one language model obtained by interpolating the language models for each field that have been generated using the word strings for search results that are divided by field such as program title, entertainer name, and so forth, a word string arraying a portion of the title of a certain program A and a portion of an entertainer name of an entertainer in another program B may become the recognition hypothesis, and further, the language score of the recognition hypothesis thereof may increase.

However, a word string arraying a portion of the title of program A and a portion of an entertainer name of program B does not exist in the configuration elements of the EPG which is the word strings for search results, whereby it is not desirable for such a word string to become a recognition hypothesis with a high language score which can become the voice recognition results.

Thus, according to the present embodiment, in the case that the word strings for search results are divided into multiple fields (in the case that division can be made), the word strings for search results of the various fields are used to generate a language model for each field (field dependent language model), and the various field language models are used to perform voice recognition.

Also, for example, as described above, in the case of performing Voice Search with the configuration elements of the EPG divided into fields, such as program titles and entertainer names, as word strings for search results, even if the user speaks the program title, for example, matching is performed not only for the word strings for search results of the program title field, but for word strings for search results for all fields and the audio recognition results of the user speech, the word strings for search results that match the voice recognition results thereof are output as search result word strings.

Accordingly, with Voice Search, a program, which includes in the detailed information and so forth serving as the word string for search result, a word string that is a program unrelated to the program of which the user has spoken the title, i.e., for example, that is similar to a word string that is a program title not similar to the program title spoken by the user, but that is included in the program title spoken by the user (includes the case of matching), can be obtained as the result of the Voice Search.

As in the above, obtaining, as Voice Search results, a program unrelated to the program of which the user has spoken the title can cause the user to feel annoyed.

Thus, according to the present embodiment, in the case that the word strings for search results are divided into multiple fields, matching with the voice recognition results can be performed for only the word string for search results of predetermined fields such as the field desired by the user or the like.

In this case, the user can perform searching flexibly, such as searching for a program that includes a certain word string in only the title, or searching for a program that includes a certain word string in only the entertainer name.

Also, for example, with a device such as a recorder or the like to which Voice Search is applied, in the case that a word string that matches a word string defined as a command to control the recorder is spoken, Voice Search of the program may not be able to be performed.

Specifically, the recorder to which Voice Search is applied has a function for program searching wherein, as to speech of a user, for example, a program that includes the speech of the user in the title or the like is searched for by Voice Search.

Further, the recorder has a voice control function to perform selection of one program out of one or more programs searched by the program searching function as the program to perform playing, according to the user speaking "select".

According to the speech "select" by the user, with voice recognition of Voice Search, the voice control function to select a program targets the voice recognition results of "select", and with the recorder, can realize the "select" obtained as voice recognition results to be understood as a command that controls the recorder.

According to a recorder as in the above that has a program selection function by Voice Search and a voice control function, the user speaks "select", whereby one program to perform playing can be selected by the recorder from the programs obtained by the program selection function.

However, in this case, when performing program searching with the program search function by Voice Search, the user cannot speak "select" which matches the command "select" that controls the recorder.

That is to say, in this case, if the user speaks "select" so as to search a program including "select" in the title or the like thereof with the program searching function, "select" serving as a command to control the recorder is obtained with the voice recognition of Voice Search as voice recognition results.

Consequently, with the recorder, the user speech "select" is understood as a command, and searching for a program including "select" in the title or the like thereof is not performed.

Thus, according to the present embodiment, by having the user allow a small burden such as including identified phrases in speech and so forth, even if a word string that matches a word string defined as a command to control the device is spoken, searching of word strings corresponding to input voice such as performing Voice Search of a program or the like can be flexibly performed.

[Embodiment of Voice Searching Device to which the Present Invention is Applied]

FIG. 1 is a block diagram illustrating a first configuration example of an embodiment of the voice searching device to which the present invention has been applied.

In FIG. 1, the voice searching device has a voice recognition unit 11, pronunciation symbol converting unit 12, storage unit for search results 13, morpheme analyzing unit 14, pronunciation symbol converting unit 15, matching unit 16, and output unit 17.

(Data of) an input voice which is speech of the user is supplied to the voice recognition unit 11 from an unshown microphone or the like.

The voice recognition unit 11 subjects the input voice supplied thereto to voice recognition, and supplies (the notation symbol, for example, of) the voice recognition results to the pronunciation symbol converting unit 12.

The pronunciation symbol converting unit 12 converts (the notation symbol, for example, of) the voice recognition results of the input voice supplied from the voice recognition unit 11 into a recognition result pronunciation symbol string, which is an array of pronunciation symbols expressing the pronunciation of the voice recognition results thereof, and supplies this to the matching unit 16.

The storage unit for search results 13 stores multiple word strings for search results, i.e., matching with the voice recognition results is performed in the matching unit 16, and (text serving as notation symbols, for example, of) word strings which are able to become search result word strings that are the search results of the word string corresponding to the input voice are stored.

The morpheme analyzing unit 14, by performing morpheme analysis of the word string for search results stored in the storage unit for search results 13, divides the word string for search results into increments of words (morphemes), for example, and supplies this to the pronunciation symbol converting unit 15.

The pronunciation symbol converting unit 15 converts (notation symbol, for example, of) the word string for search results supplied from the morpheme analyzing unit 14 into a pronunciation symbol string for search results which is an array of pronunciation symbols expressing the pronunciation of the word string for search results thereof, and supplies this to the matching unit 16.

The matching unit 16 matches the recognition result pronunciation symbol string from the pronunciation symbol converting unit 12 and the pronunciation symbol string for search results from the pronunciation symbol converting unit 15, and supplies the matching results to the output unit 17.

That is to say, the matching unit 16 performs matching for each of all of the word strings for search results stored in the storage unit for search results 13 with the voice recognition result of input voice, using a pronunciation symbol of the voice recognition results and the pronunciation symbol of the word string for search results.

The matching unit 16 performs matching for each of all of the word strings for search results stored in the storage unit for search results 13 with the voice recognition result of input voice, and supplies the matching results thereof to the output unit 17.

The output unit 17 outputs a search result word string which is the result of a search for a word string corresponding to an input voice, from among word strings for search results that have been stored in the storage unit for search results 13, based on the matching results from the matching unit 16.

With the voice searching device configured as above, voice searching processing is performed according to speech by the user.

That is to say, when the user performs speech, and the input audio serving as the speech thereof is supplied to the voice recognition unit 11, the input voice thereof is subjected to voice recognition by the voice recognition unit 11, and the voice recognition results of the input voice thereof is supplied to the pronunciation symbol converting unit 12.

The pronunciation symbol converting unit 12 converts the voice recognition results of the input voice from the voice recognition unit 11 into a recognition result pronunciation symbol string, and supplies this to the matching unit 16.

On the other hand, the morpheme analyzing unit 14 performs morpheme analysis of all of the word strings for search results that have been stored in the storage unit for search results 13, and supplies this to the pronunciation symbol converting unit 15.

The pronunciation symbol converting unit 15 converts the word strings for search results from the morpheme analyzing unit 14 into pronunciation symbol strings for search results, and supplies this to the matching unit 16.

The matching unit 16 matches each of all of the word strings for search results stored in the storage unit for search results 13 with the voice recognition results of the input voice, using the recognition result pronunciation symbol string from the pronunciation symbol converting unit 12 and the pronunciation symbol string for search results from the pronunciation symbol converting unit 15, and supplies the matching results thereof to the output unit 17.

With the output unit 17, based on the matching results from the matching unit 16, a search result word string (serving as a word string for search results), which is the result of the search for a word string corresponding to the input voice, is selected from the word strings for search results stored in the storage unit for search results 13, and output.

Accordingly, by only speaking, the user can obtain a word string for search results serving as the search result word string that matches the speech of the user, from the word strings for search results stored in the storage unit for search results 13.

Figure 2:
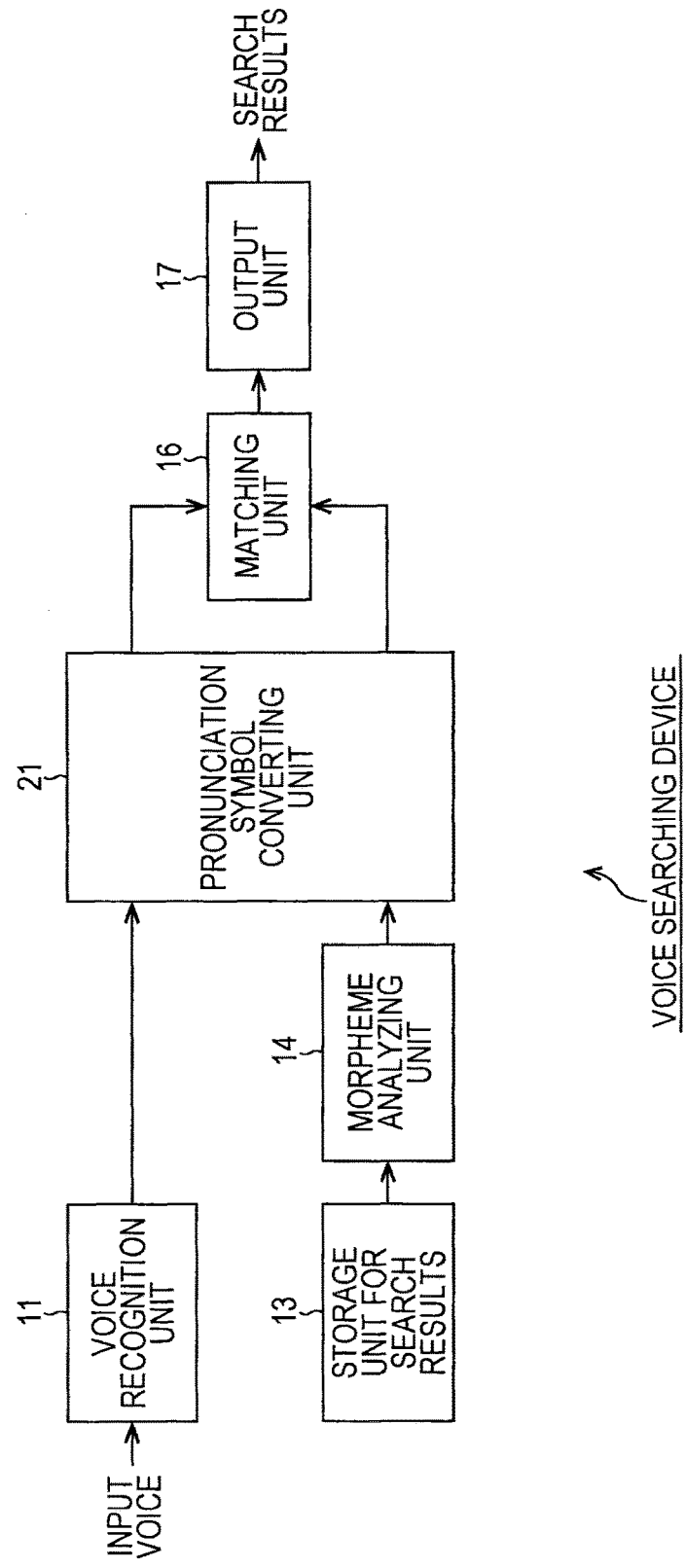
FIG. 2 is a block diagram illustrating a second configuration example of an embodiment of a voice searching device to which the present invention has been applied.

FIG. 2 is a block diagram illustrating a second configuration example of an embodiment of the voice searching device to which the present invention has been applied.

Note that in the drawing, the portions corresponding to the case in FIG. 1 have the same reference numerals appended thereto, and the descriptions thereof below will be omitted as appropriate.

The voice searching device in FIG. 2 is common to the case in FIG. 1, in the points of having a voice recognition unit 11, storage unit for search results 13, morpheme analyzing unit 14, matching unit 16, and output unit 17, and differs from the case in FIG. 1 in the points that, instead of the pronunciation symbol converting units 12 and 15, a pronunciation symbol converting unit 21 is provided.

In FIG. 2, the pronunciation symbol converting unit 21 converts the voice recognition results of the input voice supplied from the voice recognition unit 11 into a recognition result pronunciation symbol string, and supplies this to the matching unit 16, while converting the word string for search results supplied from the morpheme analyzing unit 14 into a pronunciation symbol string for search results, and supplies this to the matching unit 16.

That is to say, in FIG. 1, the conversion of voice recognition results of the input voice into a recognition result pronunciation symbol string and the conversion of a word string for search results into a pronunciation symbol string for search results are each performed by separate pronunciation symbol converting units 12 and 15, but in FIG. 2, the conversion of voice recognition results of the input voice into a recognition result pronunciation symbol string and the conversion of a word string for search results into a pronunciation symbol string for search results are performed by sharing, so to speak, one pronunciation symbol converting unit 21.

Accordingly, with the voice searching device in FIG. 2, except for the conversion of voice recognition results of the input voice into a recognition result pronunciation symbol string and the conversion of a word string for search results into a pronunciation symbol string for search results not each being performed by separate pronunciation symbol converting units 12 and 15, but being performed by the pronunciation symbol converting unit 21, similar voice searching processing is performed as in the case in FIG. 1.

Figure 3:
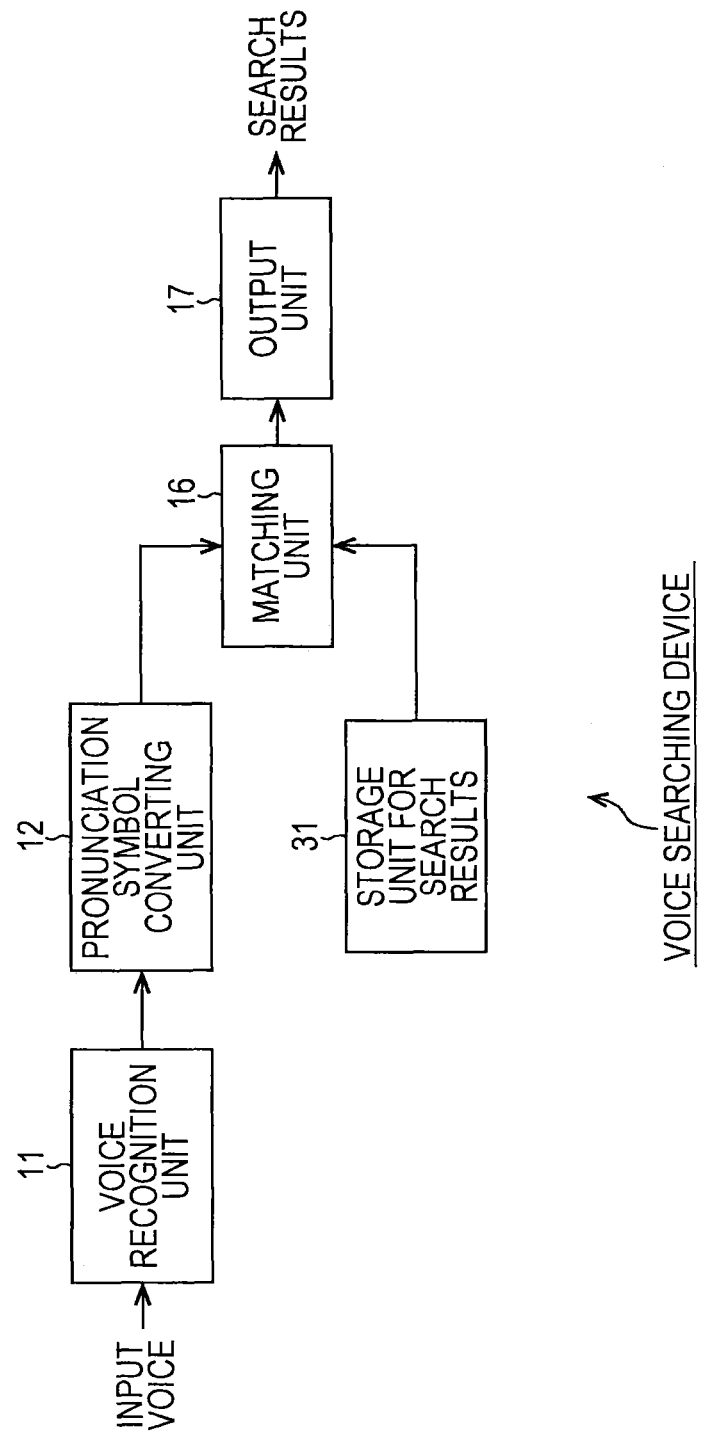
FIG. 3 is a block diagram illustrating a third configuration example of an embodiment of a voice searching device to which the present invention has been applied.

FIG. 3 is a block diagram illustrating a third configuration example of an embodiment of the voice searching device to which the present invention has been applied.

Note that in the drawing, the portions corresponding to the case in FIG. 1 have the same reference numerals appended thereto, and the descriptions thereof below will be omitted as appropriate.

The voice searching device in FIG. 3 is common to the case in FIG. 1, in the points of having a voice recognition unit 11, pronunciation symbol converting unit 12, matching unit 16, and output unit 17, and differs from the case in FIG. 1 in the points that, instead of the storage unit for search results 13, morpheme analyzing unit 14, and pronunciation symbol converting unit 15, a storage unit for search results 31 is provided.

In FIG. 3, the storage unit for search results 31 stores (notation symbols, for example, of) the same word string for search results as stored in the storage unit for search results 13, as well as the pronunciation symbol string for search results wherein the word strings for search results above have been converted into pronunciation symbols.

Accordingly, with the voice searching device in FIG. 3, the pronunciation symbol string for search results used in matching with the matching unit 16 is stored in the storage unit for search results 31, whereby, except for the morpheme analysis of the word string for search results and the conversion to the pronunciation symbol string for search results not being performed, similar voice searching processing is performed as in the case of FIG. 1.

Figure 4:
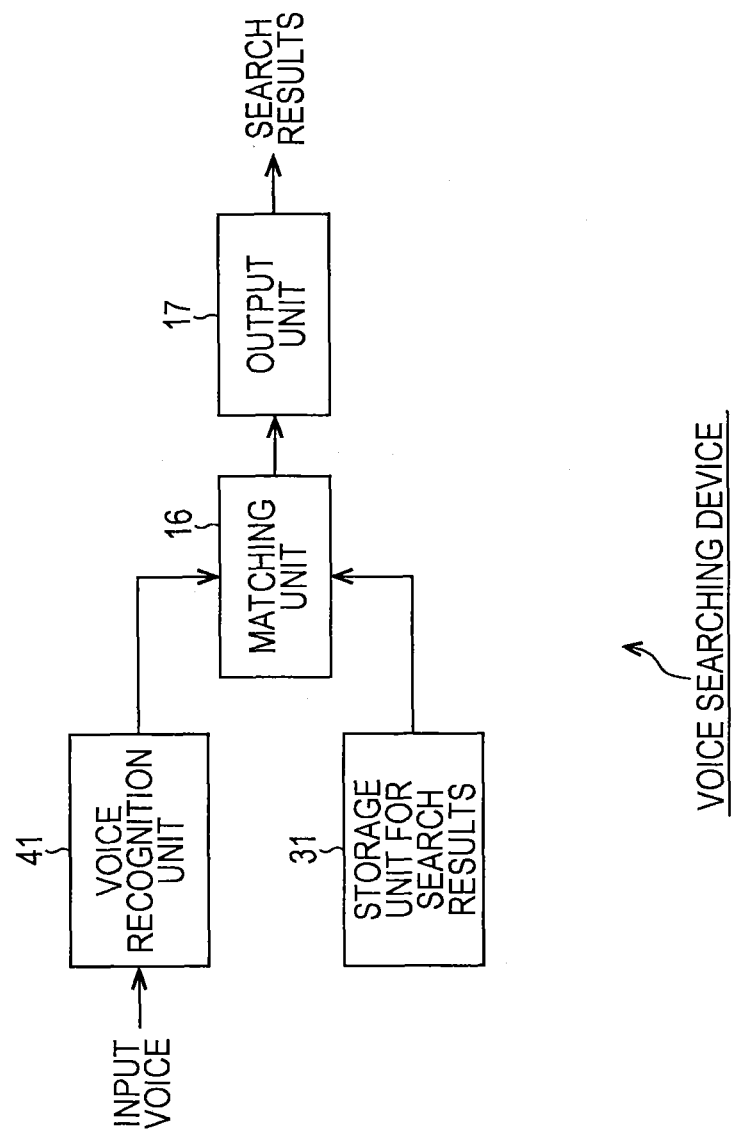
FIG. 4 is a block diagram illustrating a fourth configuration example of an embodiment of a voice searching device to which the present invention has been applied.

FIG. 4 is a block diagram illustrating a fourth configuration example of an embodiment of the voice searching device to which the present invention has been applied.

Note that in the diagram, the portions corresponding to the cases in FIG. 1 or FIG. 3 have the same reference numerals appended thereto, and the descriptions thereof below will be omitted as appropriate.

The voice searching device in FIG. 4 is common to the case in FIG. 3 with regard to the point of having the matching unit 16, output unit 17, and storage unit for search results 31, and differs from the case in FIG. 3 in the points that, instead of the voice recognition unit 11 and pronunciation symbol converting unit 12, a voice recognition unit 41 is provided.

In FIG. 4, the voice recognition unit 41 subjects the input voice to voice recognition, and supplies the recognition result pronunciation symbol string of the voice recognition results of the input voice thereof to the matching unit 16.

That is to say, for example, the voice recognition unit 41 has the voice recognition unit 11 and pronunciation symbol converting unit 12 of FIG. 3 built in.

Accordingly, with the voice searching device in FIG. 4, except for the voice recognition unit 41 outputting the recognition result pronunciation string instead of the notation symbols, for example, of the voice recognition results, similar voice searching processing is performed as in the case of FIG. 3.

[Information Processing System to which the Voice Searching Device is Applied]

The voice searching devices in FIG. 1 through FIG. 4 can be applied to various types of information processing systems ("system" refers to a logical collection of multiple devices, regardless of whether the devices of various configurations are within the same housing or not).

That is to say, the voice searching devices in FIG. 1 through FIG. 4 can be applied to a recorder that performs program recording and playing, for example, as an information processing system.

With the recorder serving as an information processing system to which the voice searching device of FIG. 1 through FIG. 4 has been applied (hereafter, also called information processing system with voice searching function), a program that the user desires can be searched for by voice searching from among programs that have been recorded (recorded programs), for example, and played.

That is to say, as a keyword for performing voice searching of a program to be played, for example, if the user speaks an input voice of "world heritage", with the recorder, by performing voice searching of the recorded program title or the like as a word string for search results, a program of which the pronunciation of the title is similar to the pronunciation of the input voice of "world heritage" is searched from among the recorded programs.

Next, with the recorder, (the title, etc, of) a program, of which the pronunciation of the title is similar to the pronunciation of the input voice "world heritage" within the top N places, is displayed (on a TV to which the recorder is connected (television receiver) or the like) as the candidate program for performing playing (playing candidate program), as the voice searching result.

Subsequently, upon the user selecting one program as the program to perform playing from among the N playing candidate programs, the program is played with the recorder.

Now, as a method of the user selecting one program from among the N playing candidate programs, there is a method wherein the user operates a remote commander that remote controls the recorder to select one program from among the N playing candidate programs.

Also, as a method for the user to select one program from among N playing candidate programs, in the case that the display of the N playing candidate programs is performed with a touch panel, there is a method to select one program from among the N playing candidate programs by the user operating the touch panel thereof.

Further, as a method for the user to select one program from among N playing candidate programs, there is a method for the user to select one program from among the N playing candidate programs by voice.

That is to say, for example, in the case that the title of the second playing candidate program from among the N playing candidate programs is "world heritage/Great Wall of China", and the second playing candidate program thereof which is "world heritage/Great Wall of China" is one of the programs that the user desires to play, the user can select the playing candidate program thereof by speaking "second" which is the order of the playing candidate program", or the title which is "world heritage/Great Wall of China", or the like.

Also, with the recorder serving as an information processing system with voice searching function, for example the program that the user desires from among the EPG programs can be searched for with voice searching, and recording reservations (and viewing reservations) can be made.

That is to say, as a keyword to perform voice searching of a program to reserve a recording, upon the user speaking the input voice "world heritage", for example, with the recorder, by performing voice searching with the title of the program and so forth serving as the configuration elements that make up the EPG as the word string for search results, a program having the pronunciation of the title and so forth that is similar to the pronunciation of the input voice "world heritage" is searched for from the EPG.

With the recorder, similar to the case of performing playing of recorded programs, (the title, etc, of) a program, of which the pronunciation of the title is similar to the pronunciation of the input voice "world heritage" within the top N places, as the result of voice searching, is displayed as a candidate program for performing recording reservations (recording candidate program).

Subsequently, upon the user selecting one program as the program to perform recording reservations from among the N recording candidate programs, recording reservations of the program thereof is performed with the recorder, and further, recording of the program is performed according to the recording reservations thereof.

Now, as a method to select one program from among the N recording candidate programs, in the playing of the above-described recorded program, a similar method can be employed as in the case of selecting one program from among the N playing candidate programs.

Note that as an information processing system to which the voice searching device in FIG. 1 through FIG. 4 can be applied, there are systems to search for and purchase programs (video content) via a video-on-demand site that is linked via a network, systems to search for and purchase games via a gaming software sales site that is linked via a network, and so forth, in addition to the above-described recorder.

Also, in voice searching, various types of word strings can be employed as the word strings for search results.

That is to say, for example, in the case of searching for a television broadcast program, metadata of the program, (a portion of, or all of the) subtitles overlaying the images of the program (closed caption), and so forth of the program title, entertainer names, and detailed information to describe the program content, can be employed as word strings for search results.

Also, for example, in the case of searching for a tune (music), (a portion of, or all of the) title of the tune, lyrics, artist name, and so forth, can be employed as the word string for search results.

Figure 5:
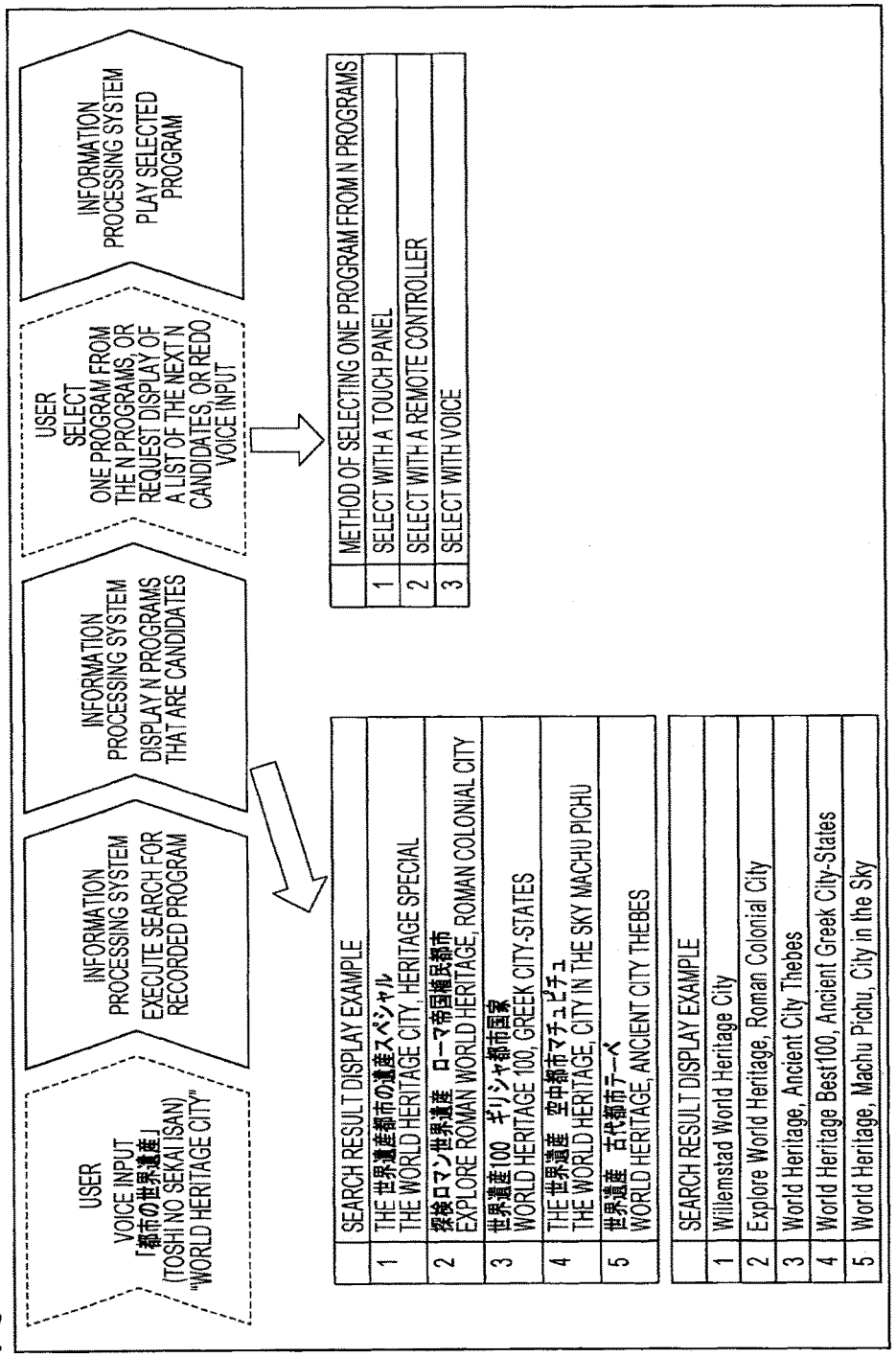
FIG. 5 is a diagram describing processing to play a recorded program with a recorder serving as an information processing system having a voice searching function.

FIG. 5 is a diagram to describe the processing to play a recorded program with the recorder serving as an information processing system with voice searching function.

With the recorder serving as an information processing system with voice searching function, for example a program that the user desired is searched for by voice searching from among the recorded programs, for example, and in the case of playing, the user speaks a keyword to perform voice searching of the program to be played, such as the Japanese input voice "toshi no sekai isan" ("world heritage city" in English) or the English input voice "World Heritage City".

With the recorder serving as an information processing system with voice searching function, voice searching is performed for a title of the like of a recorded program as a word string for search results, and a program having the pronunciation of a title that is similar to the pronunciation of the input voice "toshi no sekai isan" ("world heritage city" in English) or the English input voice "World Heritage City" is searched for from among the recorded programs.

Also, with the recorder serving as an information processing system with voice searching function, (the title or the like of) a program that has pronunciation of the title similar to the pronunciation of the input voice "toshi no sekai isan" ("world heritage city" in English) or the English input voice "World Heritage City", within the top N places, is displayed, as the search result, as a playing candidate program which is a program that is a candidate for performing playing.

In FIG. 5, five playing candidate programs are displayed (as search results of voice searching).

In the case that the program desired by the user does not exist among the playing candidate program, the user can request by speech that as playing candidate programs, the next top N programs of the programs within the top N places currently displayed are displayed as playing candidate programs, or that a different keyword is used as the keyword to perform voice searching.

Also, in the case that a program exists which the use desires among the playing candidate programs, the user can select the desired program thereof.

As a method for the user to select a desired program, there is a method of operating a touch panel, a method of operating a remote commander, and a method of selecting by voice, as described above.

Upon the user selecting a desired program from among the N playing candidate programs, the program thereof is played with the recorder serving as the information processing system with voice search function.

Figure 6:
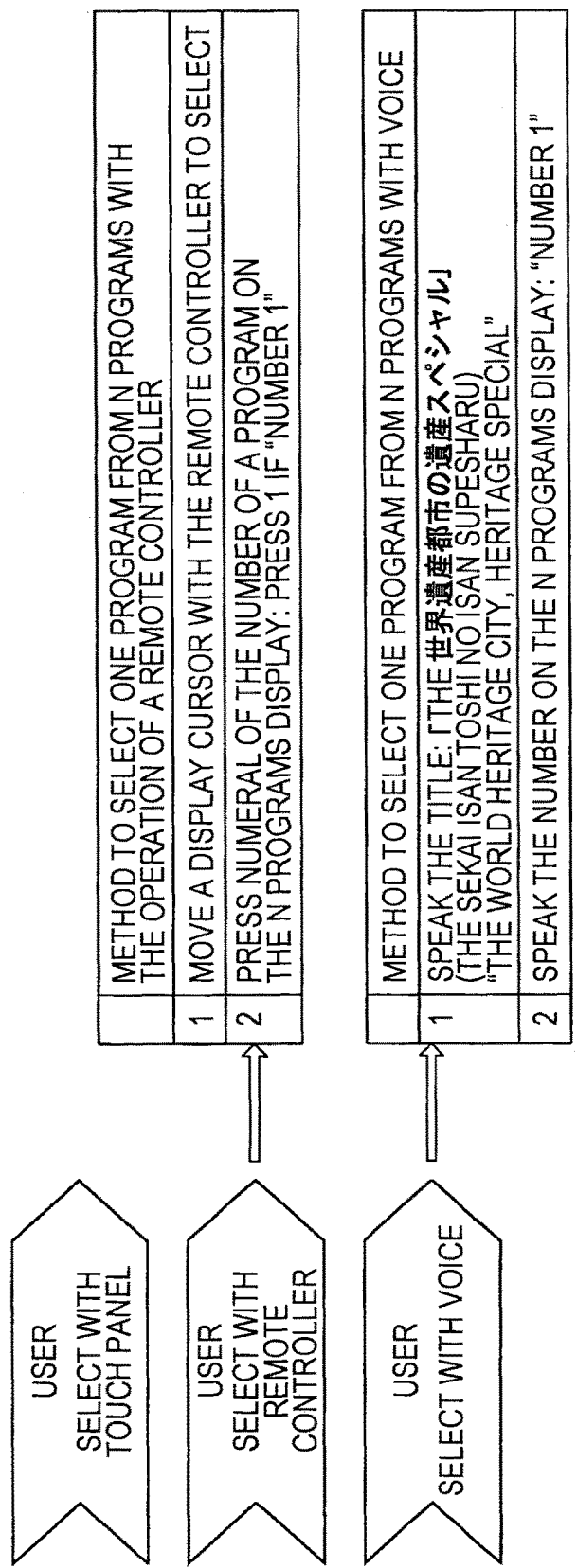
FIG. 6 is a diagram describing a method for a user to select a desired program from N play candidate programs.

FIG. 6 is a diagram describing a method for the user to select a desired program from among the N playing candidate programs.

For example, in the case that the N playing candidate programs are displayed on a touch panel, the user can select a desired program by touching the display portion (of, for example, the title) of the desired program, out of the N playing candidate programs displayed on the touch panel thereof.

Also, for example, in the case that the N playing candidate programs are displayed together with a cursor that can be moved by the remote commander, which can selectively focus each playing candidate program, the user can select the desired program by operating the remote commander to move the cursor so that the desired program is focused, and further, by operating the remote commander so as to confirm the selection of the desired program that is focused.

Further, for example, in the case that N playing candidate programs are displayed with numerals expressing the order of the playing candidate programs appended thereto, and that numeral buttons for specifying the numerals are provided on the remote commander, the user can select a desired program by operating the numeral button specifying the numeral that is appended to the desired program, of the numeral buttons on the remote commander.

Also, the user can select a desired program of the N playing candidate programs, by speaking the title of the desired program.

Further, for example, in the case that N playing candidate programs are displayed with numerals expressing the order of the playing candidate programs appended thereto, the user can select a desired program by speaking the numeral that is appended to the desired program.

Figure 7:
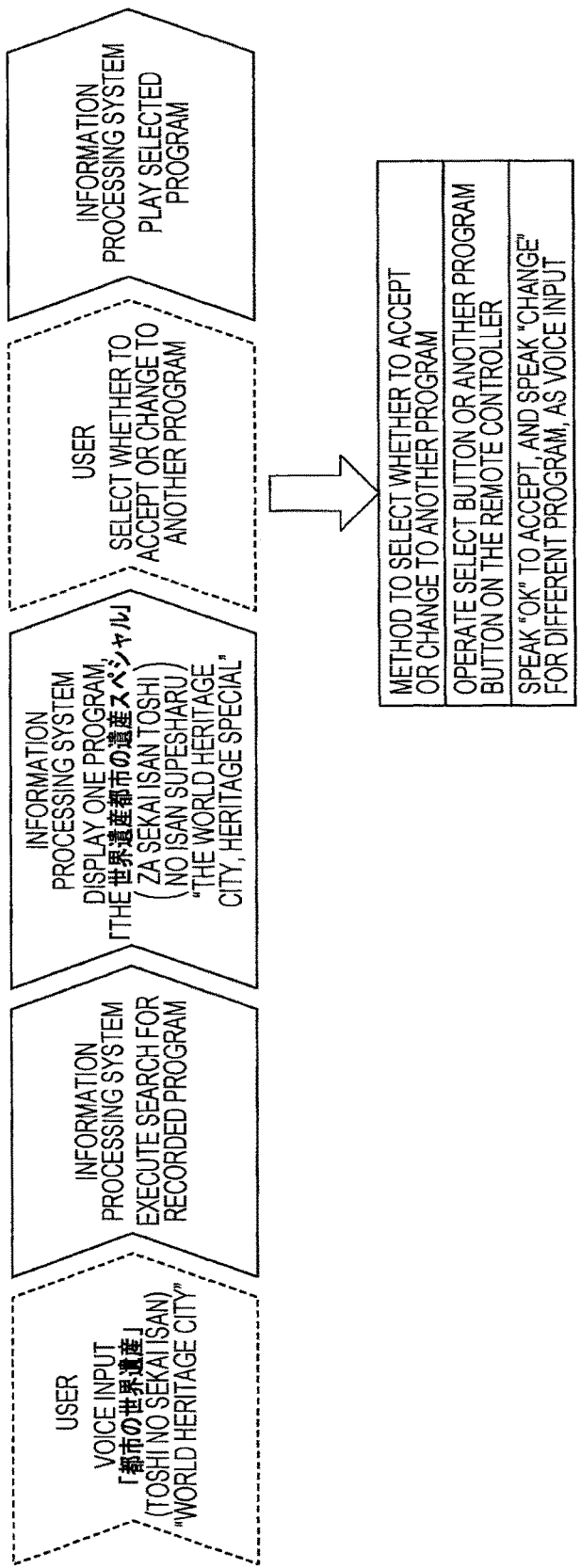
FIG. 7 is a diagram describing other processing with a recorder serving as an information processing system having a voice searching function.

FIG. 7 is a diagram describing other processing of the recorder serving as the information processing system with voice searching function.

In FIG. 5, multiple, such as five, playing candidate programs are displayed as the search results of the voice searching from the recorded program, but in FIG. 7, only one playing candidate program is displayed.

That is to say, if a user speaks, for example, the input voice "world heritage city", which is a keyword for performing voice searching of the program to be played, with the recorder serving as the information processing system with voice searching function, the title or the like of the recorded program is subjected to voice searching, as the word string for search results, and a program having title pronunciation that is similar to the pronunciation of the input voice "world heritage city" is searched from among the recorded programs.

With the recorder serving as the information processing system with voice searching, as search results of voice searching, the (title or the like of the) top one program of which the pronunciation of the title is similar to the pronunciation of the input voice "world heritage city" is displayed as the playing candidate program.

In this case, the user can select whether to select (accept) the one playing candidate program obtained as a result of the voice searching as the program to be played, or whether to redisplay another program as the playing candidate program.

For example, in the case that an accepting button to specify acceptance, and an another program button to specify that another program is to be redisplayed as the playing candidate program, are provided on the remote commander that remote controls the recorder serving as the information processing system with voice searching function, the user can specify whether to select the one playing candidate program obtained as a result of the voice searching as program to perform playing, or whether to redisplay another program is the playing candidate program, by operating the accept button or the another program button.

Also, for example, the user can specify whether to select the one playing candidate program obtained as a result of audio searching as the program to perform playing, or whether to redisplay another program as the playing candidate program, by speaking, for example, "OK" as a voice to specify acceptance, or for example, "change" as a voice to specify that another program is to be redisplayed as the playing candidate program.

With the recorder serving as the information processing system with voice searching function, in the case that the one playing candidate program obtained as a result of voice searching is selected as the program for performing playing, the playing candidate program thereof is played.

Also, in the case that redisplaying another program as the playing candidate program is specified, the playing candidate program that is next in the order after the one playing candidate program currently displayed is displayed with the recorder serving as the information processing system with voice searching function.

Figure 8:
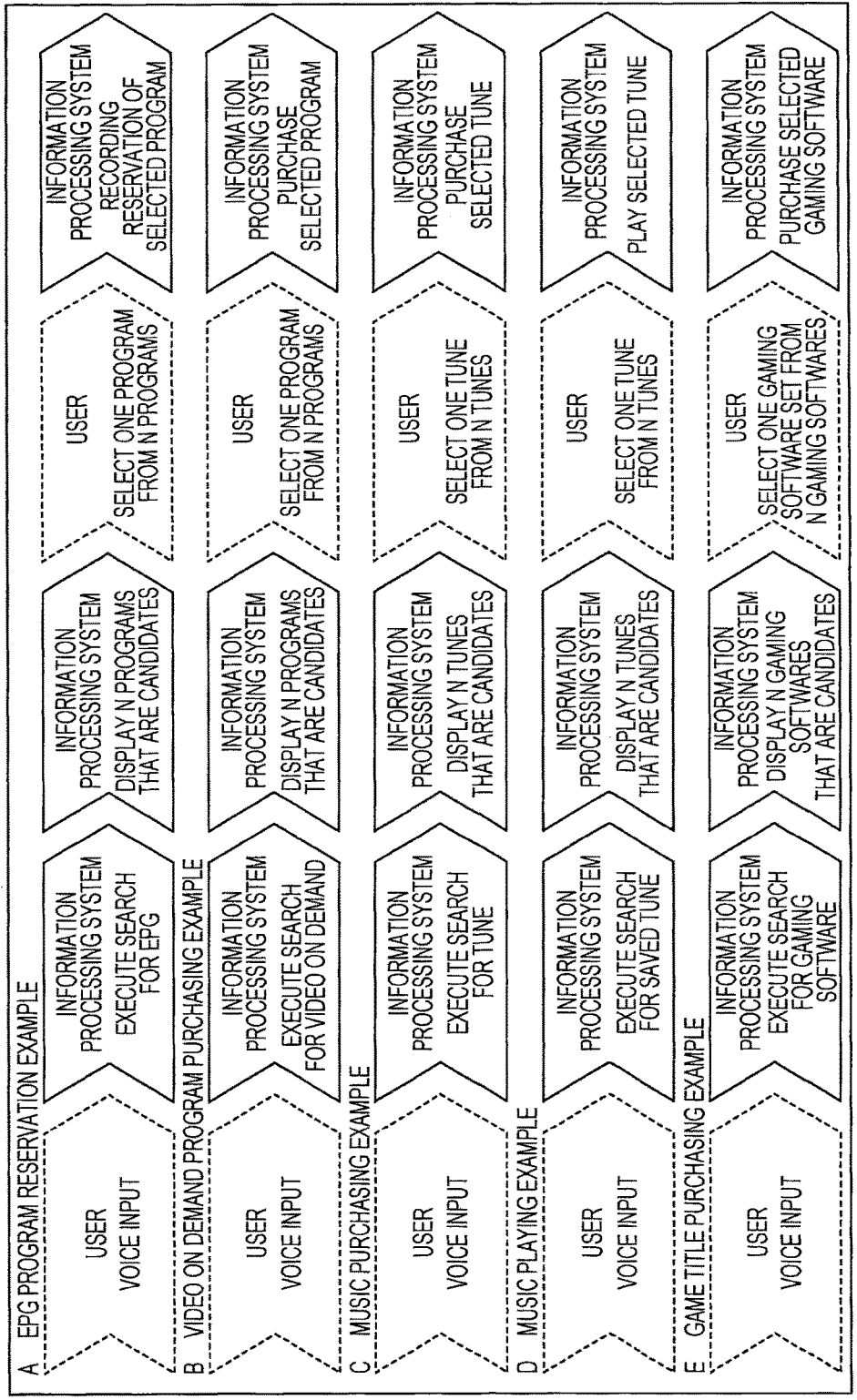
FIG. 8 is a diagram describing processing performed by various types of devices serving as information processing systems having a voice searching function.

FIG. 8 is a diagram describing the processing performed by various types of devices serving as the information processing system with voice searching function.

A in FIG. 8 is a diagram describing processing to perform recording reservations with the recorder serving as the information processing system with voice searching function.

Upon the user speaking the input voice serving as a keyword for performing voice searching of the program to perform recording reservations, with the recorder, the program title or the like serving as the configuration elements making up the EPG, as the word string for search results, is subjected to voice searching, whereby a program of which the pronunciation of the title or the like is similar to the pronunciation of the input voice is searched from the EPG.

Also, as the result of the voice searching, (the title or the like of) the programs within the top N places having pronunciation of a title that is similar to the pronunciation of the input voice are displayed as recording candidate programs, which are programs that are candidates for performing recording reservations.

Subsequently, upon the user selecting one program from among the N recording candidate program as the program to perform recording reservations, recording reservations of the program thereof is performed with the recorder, and further, recording of the program is performed according to the recording reservations thereof.

B in FIG. 8 is a diagram describing processing to purchase a program with a program purchasing system, to purchase a program (video content), serving as the information processing system with voice searching function.

Upon the user speaking the input voice serving as a keyword for performing voice searching of the program to be purchased, with the program purchasing system, a video-on-demand site that sells programs is accessed via a network such as the Internet for example, and the program title or the like that the video-on-demand site is selling, as the word string for search results, is subjected to voice searching (video-on-demand searching), whereby a program of which the pronunciation of the title or the like is similar to the pronunciation of the input voice is searched for.

Also, with the program purchasing system, as the result of the voice searching, (the title or the like of) the programs within the top N places having pronunciation of a title that is similar to the pronunciation of the input voice are displayed as purchasing candidate programs, which are programs that are candidates for purchasing.

Subsequently, upon the user selecting one program from among the N purchasing candidate programs as the program to purchase, purchasing processing of the program thereof is performed with the program purchasing system, i.e., downloading the program from the video-on-demand website, settlement processing for payment of the price of the program, and so forth are performed.

C in FIG. 8 is a diagram describing processing to purchase a tune with a music purchasing system, to purchase a tune (music), serving as the information processing system with voice searching function.

Upon the user speaking the input voice serving as a keyword for performing voice searching of the tune to be purchased, with the music purchasing system, a tune sales site that sells tunes is accessed via a network such as the Internet, and the tune title (tune name) or the like that the tune sales site is selling, as the word string for search results, is subjected to voice searching, whereby a tune of which the pronunciation of the title or the like is similar to the pronunciation of the input voice is searched for.

Also, with the tune purchasing system, as the result of the voice searching, (the title or the like of) the tunes within the top N places having pronunciation of a title that is similar to the pronunciation of the input voice are displayed as purchasing candidate tunes, which are tunes that are candidates for purchasing.

Subsequently, upon the user selecting one tune from among the N purchasing candidate tunes as the tune to purchase, purchasing processing of the tune thereof is performed with the music purchasing system.

D in FIG. 8 is a diagram to describe processing to play a tune recorded on a storage medium, with a music playing system that plays tunes (music) serving as the information processing system with voice searching function.

Upon the user speaking the input voice serving as a keyword for performing voice searching of the tune to be played, with the music playing system, the tune title (tune name) or the like recorded in the storage medium, as the word string for search results, is subjected to voice searching, whereby a tune of which the pronunciation of the title or the like is similar to the pronunciation of the input voice is searched from the storage medium.

Also, with the music playing system, as the result of the voice searching, (the title or the like of) the tunes within the top N places having pronunciation of a title that is similar to the pronunciation of the input voice are displayed as playing candidate tunes, which are candidate tunes that are to be played.

Subsequently, upon the user selecting one tune from among the N playing candidate tunes as the tune to play, playing of the tune thereof is performed with the music playing system.

E in FIG. 8 is a diagram describing processing to purchase gaming software with a gaming software purchasing system, to purchase gaming software (software), serving as the information processing system with voice searching function.

Upon the user speaking the input voice serving as a keyword for performing voice searching of the gaming software to be purchased, with the gaming software purchasing system, a gaming software sales site that sells gaming software is accessed via a network such as the Internet for example, and the gaming software title (game title) or the like that the gaming software sales site is selling, as the word string for search results, is subjected to voice searching, whereby gaming software of which the pronunciation of the title or the like is similar to the pronunciation of the input voice is searched for.

Also, with the gaming software purchasing system, as the result of the voice searching, (the title or the like of) the gaming software within the top N places having pronunciation of a title that is similar to the pronunciation of the input voice are displayed as purchasing candidate gaming software, which is gaming software that is a candidate for purchasing.

Subsequently, upon the user selecting one gaming software from among the N purchasing candidate gaming softwares as the gaming software to purchase, purchasing processing of the gaming software thereof is performed with the gaming software purchasing system.

Note that the voice searching is not performed on the information processing system side which is connected to sites such as a video-on-demand site (B in FIG. 8), music sales site (C in FIG. 8), and gaming software sales site (E in FIG. 8), but can be performed on the site side.

Also, the voice searching devices in FIG. 1 through FIG. 4 can be applied to a system other than the above-described information processing system.

That is to say, the voice searching devices in FIG. 1 through FIG. 4 can be applied to an information processing system that searches for tunes including lyrics of which the user has spoken a portion of the lyrics, an information processing system that searches for content of movies including dialogue of which the user has spoken a portion of the dialogue, an information processing system that searches for an (electronic) book or magazine including writings of which the user has spoken a portion of the writings.

[Configuration Example of Recorder to which the Voice Searching Device has been Applied]

Figure 9:
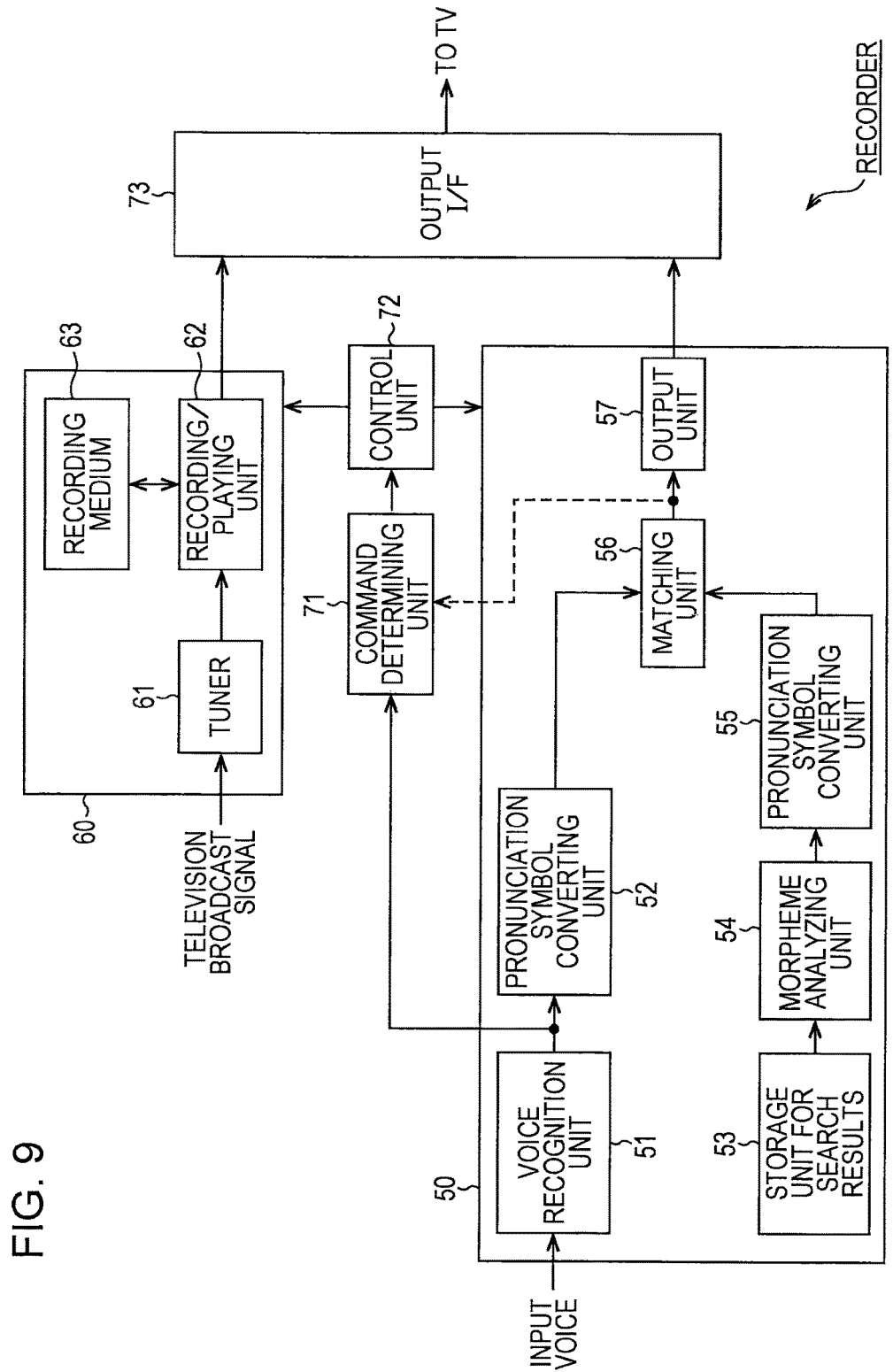
FIG. 9 is a block diagram illustrating a configuration example of a recorder serving as an information processing system to which the voice searching device has been applied.

FIG. 9 is a block diagram illustrating a configuration example of a recorder serving as an information processing system to which the voice searching devices in FIG. 1 through FIG. 4 have been applied.

In FIG. 9, the recorder has a voice searching device 50, recorder function unit 60, command determining unit 71, control unit 72, and output I/F (Interface) 73.

The voice searching device 50 is configured similar to the voice searching device in FIG. 1, for example, of the voice searching devices in FIG. 1 through FIG. 4.

That is to say, the voice searching device 50 has a voice recognition unit 51, pronunciation symbol converting unit 52, storage unit for search results 53, morpheme analyzing unit 54, pronunciation symbol converting unit 55, matching unit 56, and output unit 57.

The voice recognition unit 51 through output unit 57 are configured similar to the voice recognition unit 11 through output unit 17, respectively.

Note that the voice searching device 50 can be configured similar to one of the voice searching devices in FIG. 2 through FIG. 4, besides the voice searching device in FIG. 1.

The recorder function unit 60 has a recording/playing unit 62 and a recording medium 63, and performs recording (picture recording) and playing of television broadcast programs.

That is to say, television broadcast signals from a digital broadcast, for example, received with an unshown antenna, are supplied to the tuner 61.

The tuner 61 receives the television broadcast signal supplied thereto, and extracts the television broadcast signals of a predetermined channel from the television broadcast signal thereof, demodulates a bit stream, and supplies this to the recording/playing unit 62.

The recording/playing unit 62 extracts program and EPG data from the bit stream supplied from the tuner 61, and supplies this to the output I/F 73.

Also, the recording/playing unit 62 records the EPG and program data (records pictures) on a recording medium 63.

Further, the recording/playing unit 62 plays the program data from the recording medium 63, and supplies this to the output I/F 73.

The recording medium 63 is, for example, a HD (Hard Disk) or the like, and EPG and program data is recorded by the recording/playing unit 62 on the recording medium 63.

Voice recognition results of the input voice are supplied from the voice recognition unit 51 to the command determining unit 71.

The command determining unit 71 determines, based on the voice recognition results of the input voice from the voice recognition unit 51, as to whether or not the input voice thereof is a command to control the recorder, and supplies the determination results thereof to the control unit 72.

The control unit 72 performs processing according to commands from the command determining unit 72, based on determining results of whether or not the input voice is a command, and also, controls a block that makes up the recorder, such as a voice searching device 50 and recorder function unit 60 and the like. Additionally, the control unit 72 performs processing according to operations of an unshown remote commander and so forth.

EPG and program data is supplied to the output I/F 73 from the recording/playing unit 62. Also, (data of) a search result display screen on which the search result word string, which is the result of the voice searching with the voice searching device 50, is displayed, is supplied to the output I/F 73 from the output unit 57.

The output unit I/F 73 is an interface that is connected with a display device that can display at least an image of a TV or the like, for example, and supplies the EPG and program data from the recording/playing unit 62 and the search result display screen from the output unit 57 to an unshown TV, for example, that is connected to the output unit I/F 73.

With the recorder in FIG. 9 configured as above, the program title, entertainer name, detailed information and so forth which are configuration elements that make up the EPG recorded on the recording medium 63 are supplied to the storage unit for search results 53 and stored.

Further, with the recorder in FIG. 9, the program title, entertainer name, and detailed information and so forth which are metadata of the program (recorded program) that has been recorded (stored) on the recording medium 63 are supplied to the storage unit for search results 53 and stored.

Accordingly, with the voice searching device 50 in FIG. 9, voice searching is performed with the program title, entertainer name, and detailed information and so forth as word strings for search results.

Figure 10:
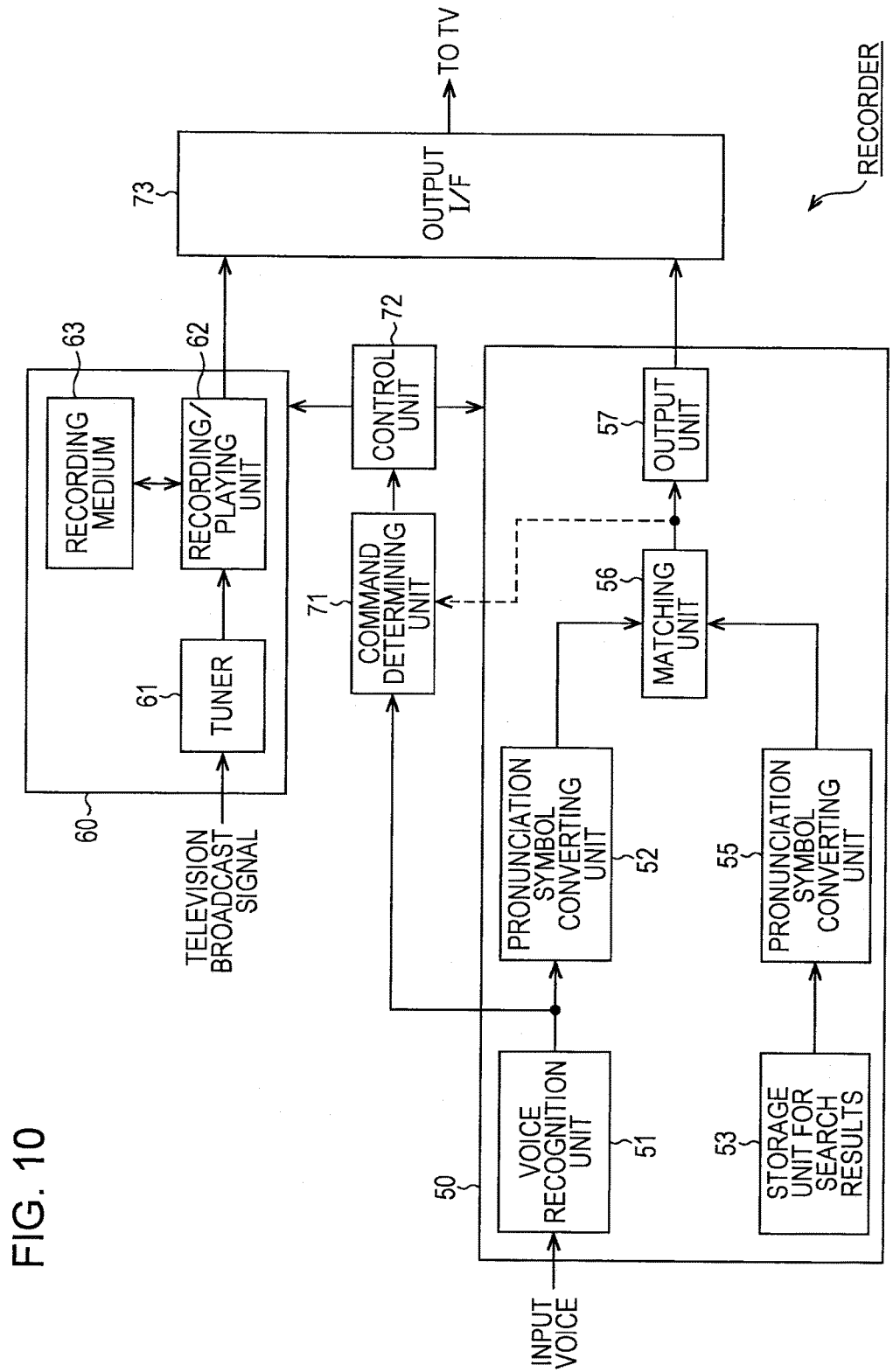
FIG. 10 is a block diagram illustrating another configuration example of a recorder serving as an information processing system to which the voice searching device has been applied.

FIG. 10 is a block diagram illustrating another configuration example of a recorder serving as an information processing system to which the voice searching devices in FIG. 1 through FIG. 4 are applied.

Note that in FIG. 10, portions corresponding to the case in FIG. 9 have the same reference numerals appended thereto, and hereafter the description thereof will be omitted as appropriate.

The recorder in FIG. 10 is configured similar to the recorder in FIG. 9, except that the voice searching device 50 does not have a morpheme analyzing unit 54.

Now, with the voice searching device 50 in FIG. 9 which has the morpheme analyzing unit 54, for example, voice searching is performed for the Japanese input voice, and with the voice searching device 50 in FIG. 10 which does not have the morpheme analyzing unit 54, for example, voice searching is performed for the English input voice which has no need for morpheme analysis.

Note that by providing a mode to function as a morpheme analyzing unit 54 and a mode to not function (allow bypass) to the voice searching device 50 in FIG. 9 which has the morpheme analyzing unit 54, with the voice searching device 50 in FIG. 9, voice searching can be performed for input voice in Japanese and English respectively, by switching the modes.

[Matching Using Pronunciation Symbols]

In the voice searching with the voice searching device 50 in FIG. 9 and FIG. 10, voice recognition of the input voice is performed with the voice recognition unit 51, and matching is performed between the voice recognition results thereof and the word string for search results that are stored in the storage unit for search results 53.

Figure 11:
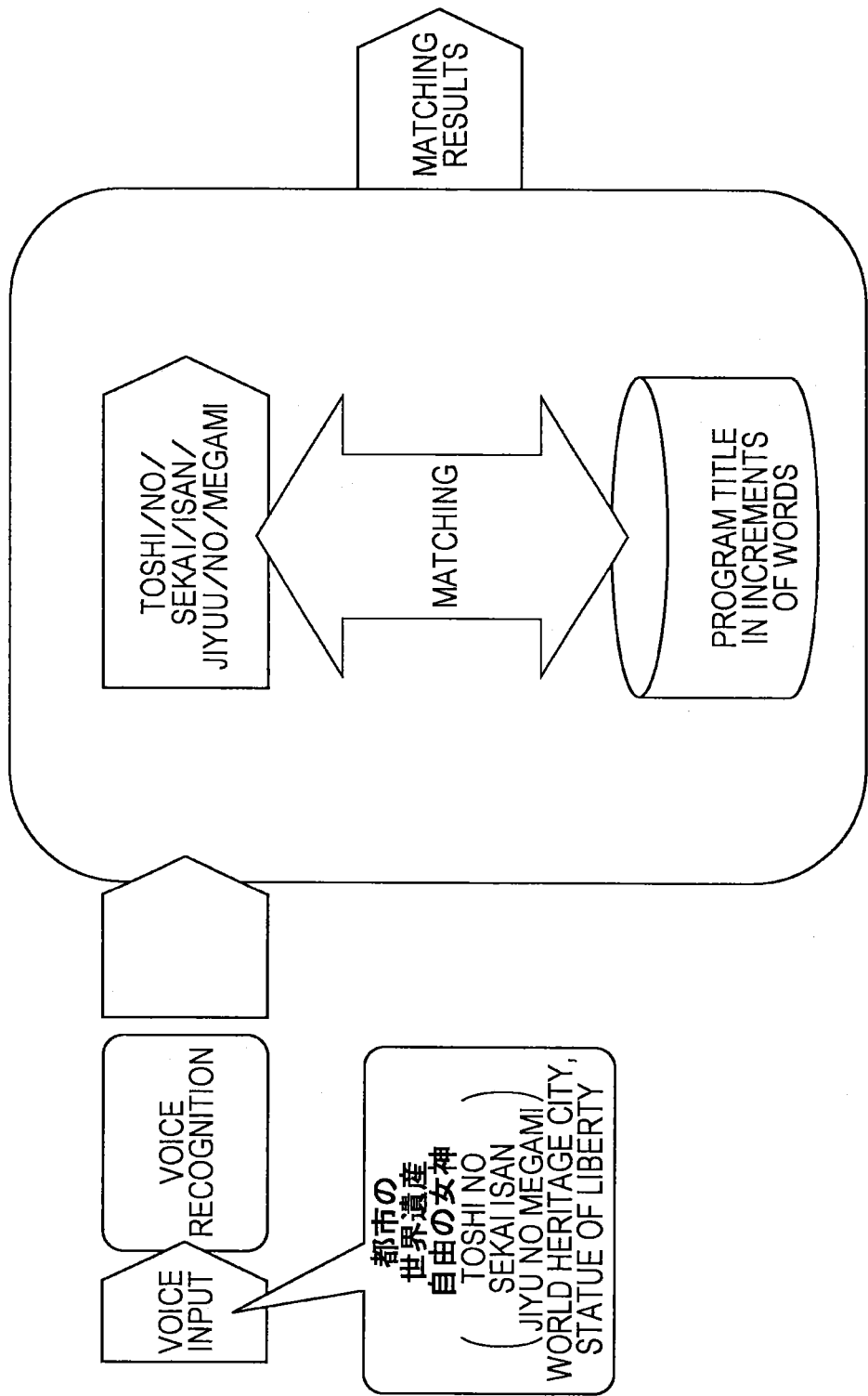
FIG. 11 is a diagram illustrating processing in the case of performing matching between voice recognition results and word strings for search results, using notation symbols for the voice recognition results and word strings for search results, respectively, in increments of words.

FIG. 11 is a diagram illustrating an example of processing in the case of using notation symbols for each of the voice recognition results and the word string for search results to perform matching between the voice recognition results thereof and the word string for search results in increments of words.

In FIG. 11, as to the Japanese input voice "toshi no sekai isan jiyu no megami" ("World Heritage City, Statue of Liberty" in English), the voice recognition result "toshi no sekai isan jiyu no megami" ("World Heritage City, Statue of Liberty" in English) is obtained, and the voice recognition result thereof "toshi no sekai isan jiyu no megami" is segmented in word increments, as "toshi/no/sekai/isan/jiyu/no/megami".

Also, the voice recognition result in increments of words "toshi/no/sekai/isan/jiyu/no/megami" ("World Heritage City, Statue of Liberty" in English) is matched with the program title for example, serving as a word string for search results in increments of words.

Figure 12:
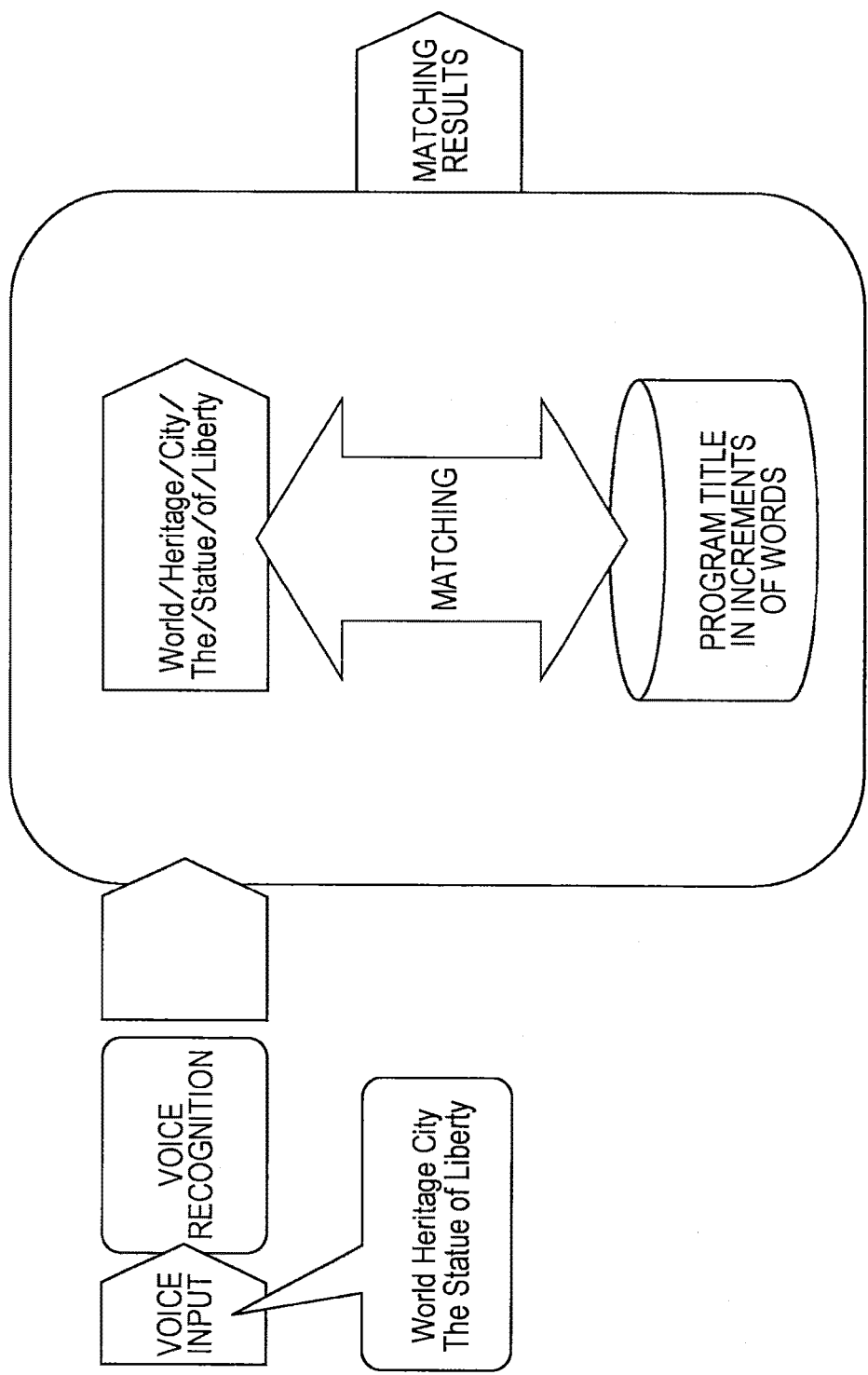
FIG. 12 is a diagram illustrating processing in the case of performing matching between voice recognition results and word strings for search results, using notation symbols for the voice recognition results and word strings for search results, respectively, in increments of words.

FIG. 12 is a diagram illustrating other processing in the case of using notation symbols for each of the voice recognition results and the word string for search results to perform matching between the voice recognition results thereof and the word string for search results in increments of words.

In FIG. 12, the voice recognition result of "World Heritage City The Statue of Liberty" is obtained as to the English input voice "World Heritage City The Statue of Liberty", and the voice recognition result of "World Heritage City The Statue of Liberty" is segmented into increments of words, as in "World/Heritage/City/The/Statue/of/Liberty".

Also, the voice recognition result in increments of words of "World/Heritage/City/The/Statue/of/Liberty" and the program title, for example, as the word string for search results in increments of words, are matched.

Figure 13:
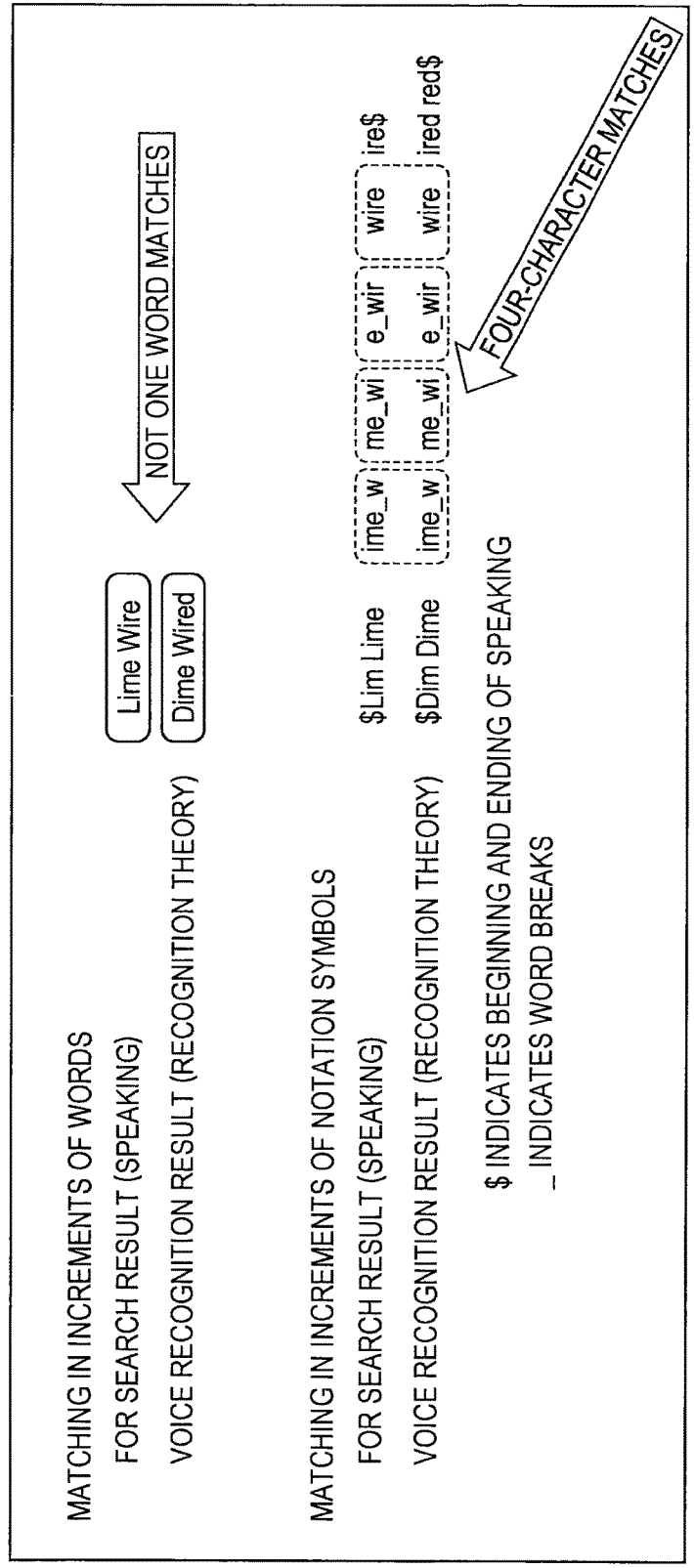
FIG. 13 is a diagram describing matching between voice recognition results and word strings for search results, using notation symbols for the voice recognition results and word strings for search results, respectively, in the case of performing in increments of words and in the case of performing in increments of one or more notation symbols.
Figure 14:
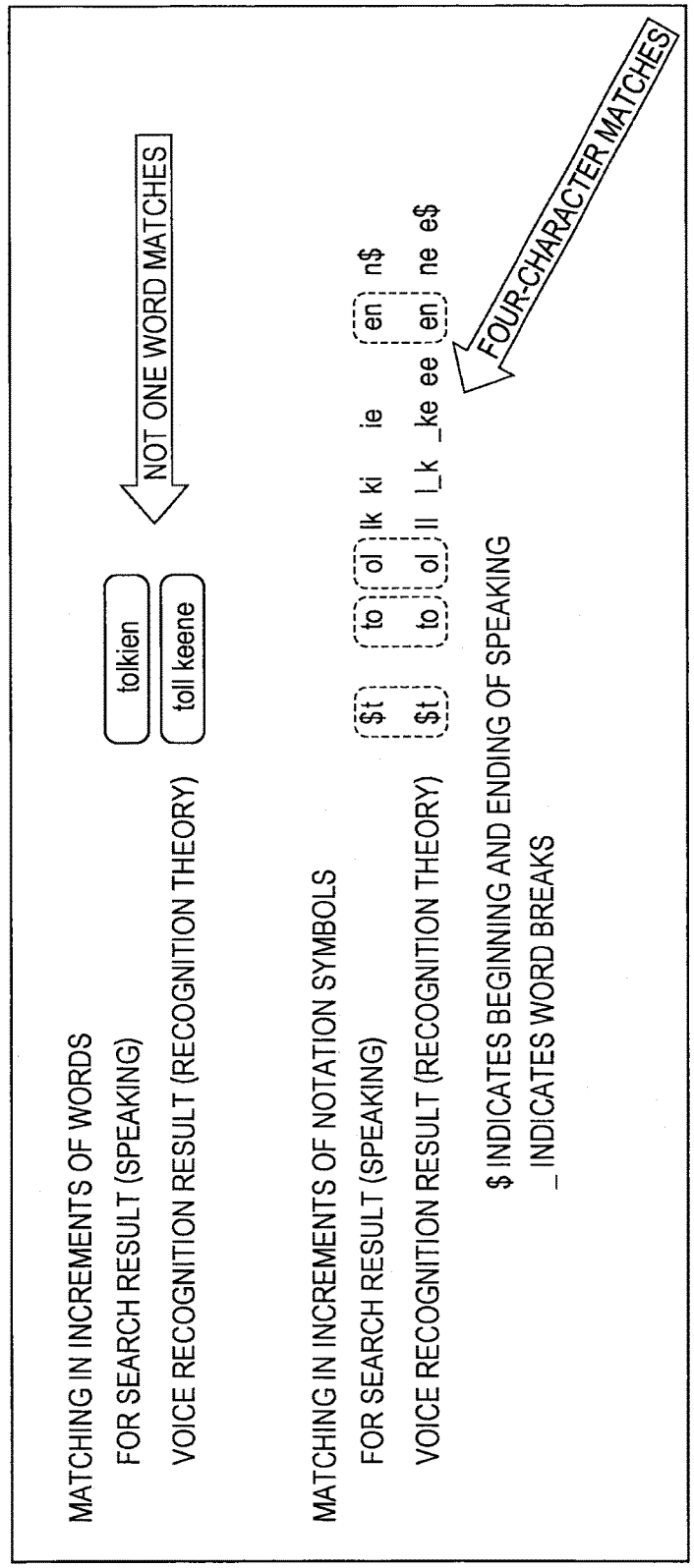
FIG. 14 is a diagram describing matching between voice recognition results and word strings for search results, using notation symbols for the voice recognition results and word strings for search results, respectively, in the case of performing in increments of words and in the case of performing in increments of one or more notation symbols.

FIG. 13 and FIG. 14 are diagrams describing a case wherein matching between the voice recognition results and the word string for search results is performed in increments of words, using notation symbols of each of the voice recognition results and the word string for search results, and a case of performing in increments of one or more notation symbols.

In FIG. 13, the voice recognition result "Dime Wired" is obtained as compared to the English input voice of "Lime Wire".

The input voice is "Lime Wire", whereby it is desirable for the word string for searching that best matches the voice recognition results of the input voice thereof to be the same "Lime Wire" as the input voice.

However, in this case, the voice recognition result obtained as compared to the input voice of "Lime Wire" is "Dime Wired", whereby, in the case of performing matching of the voice recognition result "Dime Wired" and the word string for searching "Lime Wire" in increments of words using notation symbols, not one word will match (match).

On the other hand, in the case of performing matching of the voice recognition result "Dime Wired" and the word string for searching "Lime Wire" using notation symbols, if performing in increments of 4-gram notation symbols, for example, four character strings (characters) match.

Now, in the matching in increments of the 4-gram notation symbols in FIG. 13, determination is made as to whether a match can be made, from the character string "$Dime Wired$" wherein $, which is a character expressing the beginning and ending of speech, is appended to each of the leading and end of the voice recognition result "Dime Wired", character strings (character) serving as four consecutive notation symbols that are extracted by shifting the leading position by one notation symbol at a time, which are "$Dim", "Dime", "ime_w", "me_wi", "e_wir", "wire", "ired", and "red$"; and from the character string "$Lime Wire$" wherein $, which is a character expressing the beginning and ending of speech, is appended to each of the leading and end of the word string for searching "Lime Wire", character strings serving as four consecutive notation symbols that are extracted by shifting the leading position by one notation symbol at a time, which are "$Lim", "Lime", "ime_w", "me_wi", "e_wir", "wire", and "ire$". Note that in the character strings "ime_w" and the like, the underscore (_) indicates word breaks.

Next, in FIG. 14, the voice recognition result "toll keene" is obtained as to the English input voice "tolkien".

The input voice is "tolkien", whereby it is desirable for the word string for searching that best matches the voice recognition results of the input voice thereof to be the same "tolkien" as the input voice.

However, in this case, the voice recognition result obtained as compared to the input voice of "tolkien" is "toll keene", whereby, in the case of performing matching of the voice recognition result "toll keene" and the word string for searching "tolkien" in increments of words using notation symbols, not one word will match.

On the other hand, in the case of performing matching of the voice recognition result "toll keene" and the word string for searching "tolkien" using notation symbols, if performing in increments of 2-gram notation symbols, for example, four character strings (characters) match.

Now, in the matching in increments of the 2-gram notation symbols in FIG. 14, determination is made as to whether a match can be made, from the character string "$toll keen$" wherein $, which is a character expressing the beginning and ending of speech, is appended to each of the leading and end of the voice recognition result "toll keen", character strings (character) serving as four consecutive notation symbols that are extracted by shifting the leading position by one notation symbol at a time, which are "$t", "to", "ol", "ll", "l_k", "_ke", "ee", "en", "ne" and "e$"; and from the character string "$tolkien$" wherein $, which is a character expressing the beginning and ending of speech, is appended to each of the leading and end of the word string for searching "tolkien", character strings serving as two consecutive notation symbols that are extracted by shifting the leading position by one notation symbol at a time, which are "$t", "to", "ol", "lk", "ki", "ie", "en", and "n$". Note that the underscore (_) in the character strings "l_k" and the like indicates word breaks, as described with FIG. 13.

From the above, with matching using notation symbols, more robust matching can be performed in increments of one or more notation symbols than in increments of words.

However, with matching using notation symbols, word strings corresponding to the input voice may not be output as the search result word string.

That is to say, the notation symbols may not match the pronunciation.

Specifically, in Japanese, for example, pronunciation (reading) of the a certain Hiragana character in some cases is "ha", and in some cases is "wa", but with notation symbols, the difference in pronunciation cannot be expressed.

Also, in Japanese, with notation symbols, Kanji (Chinese characters) of which may have multiple ways to read, cannot express whether a certain character for example, should be read (pronounced) as "shi" ("municipality" in English) or as "ichi" ("market" in English).

On the other hand, for example, the word string expressed with notation symbols "toshi no sekai isan" ("World Heritage City" in English)) and "toshi-no-se kaisan" ("End-of-the-year Dissolution" in English), have the same pronunciation but the notation symbols differ, except for the "no" ("of" in English).

Therefore, in the case that the voice recognition result is "toshi no sekai isan" ("World Heritage City" in English) and the case of "toshi-no-se kaisan" ("End-of-the-year Dissolution" in English), with matching using notation symbols, a different matching result is obtained, but this is not necessarily advantageous to the performance of voice searching.

Figure 15:
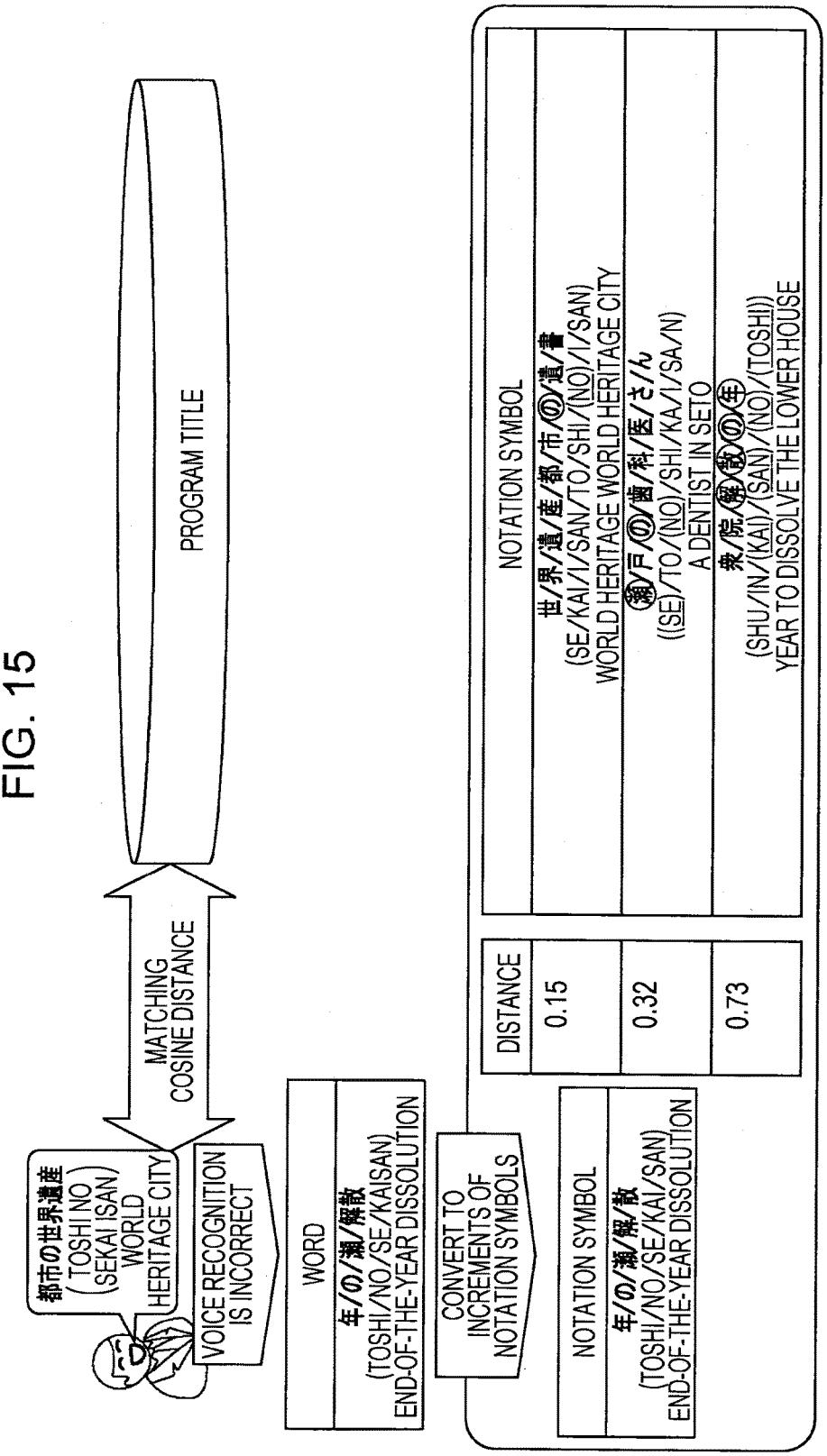
FIG. 15 is a diagram describing that, with matching using notation symbols, obtaining different matching results as to voice recognition results having different notations is not advantageous to voice searching performance.

That is to say, FIG. 15 is a diagram describing that, in Japanese, with the matching using notation symbols, obtaining matching results that differ as to the voice recognition results where pronunciation matches but the notation differs, is not advantageous to the performance of voice searching.

In FIG. 15, voice recognition of the Japanese input voice "toshi no sekai isan" ("World Heritage City" in English) is performed, and while the pronunciation matches the input voice thereof "toshi no sekai isan", an incorrect voice recognition result having different notations, "toshi-no-se kaisan" ("End-of-the-year Dissolution" in English), is obtained.

Also, in FIG. 15, the voice recognition result "toshi-no-se kaisan" is segmented into increments of notation symbols, as "toshi/no/se/kai/san", and matching is performed in increments of notation symbols (in increments of 1-gram (one character) notation symbols).

Further, in FIG. 15, for example, as the word string for search results to be matched to, three programs, "sekai isan toshi no isan" ("Heritage of World Heritage City" in English") "seto no haisha san" (a dentist in Seto), and "shuin kaisan no toshi" ("year to dissolve the Lower House") are prepared as program titles.

With the voice recognition result "toshino-se kaisan", and the word string for search results "sekai isan toshi no isan", with increments of notation symbols, only the one notation symbol "no" in the diagram, which is circled, matches.

Also, with the voice recognition result "toshi-no-se kaisan", and the word string for search results "seto no haisha san", with increments of notation symbols, two notation symbols "se" and "no" in the diagram, which are circled, match.

Further, with the voice recognition result "toshi-no-se kaisan"], and the word string for search results "shuin kaisan no toshi", with increments of notation symbols, four notation symbols "kai" "san", "no", and "toshi" in the diagram, which are circled, match.

Accordingly, as a degree of similarity between the voice recognition results and the word string for search results, found with matching in increments of notation symbols, the degree of similarity between the voice recognition result "toshi-no-se kaisan", and the word string for search results "shuin kaisan no toshi" is highest.

That is to say, as a degree of similarity found in matching in increments of notation symbols, for example cosine distance is employed.

Also, as a vector expressing a word string, for example, a vector is employed wherein a component corresponding to a notation symbol that exists in the word string is 1 and a component corresponding to a notation symbol not existing in the word string is 0, and the cosine distance as the degree of similarity between the two word strings is found using the vectors expressing the two word strings thereof.

In this case, with the matching in increments of notation symbols, as a degree of similarity between the voice recognition result "toshi-no-se kaisan" and the word string for search results "sekai isan toshi no isan", 0.15, as a degree of similarity between the voice recognition result "toshi-no-se kaisan" and the word string for search results "seto no haisha san", 0.32, and as a degree of similarity between the voice recognition result "toshi-no-se kaisan" and the word string for search results "shuin kaisan no toshi", 0.73, are found, respectively.

Accordingly, for example, by outputting the word string for search results having the highest similarity obtained as a result of the matching, for example, as the search result word string, the voice recognition of the input voice toshi no sekai isan" is incorrect, and in the case that the voice recognition result "toshi-no-se kaisan" is obtained, of the three program titles serving as the word string for search results "sekai isan toshi no isan", "seto no haisha san", and "shuin kaisan no toshi", the "shuin kaisan no toshi" is output as the search result word string.

As to the input voice toshi no sekai isan", of the three program titles described above, "sekai isan toshi no isan", "seto no haisha san", and "shuin kaisan no toshi", it is appropriate for the first program title "sekai isan toshi no isan" to be output as the search result word string.

However, while the input voice toshi no sekai isan" matches in pronunciation (reading), if voice recognition is made as "toshi-no-se kaisan" which has different notation, a program title such as "shuin kaisan no toshi" which has no relation to the "toshi no sekai isan" is output as the word string for search results, instead of a program title such as "sekai isan toshi no isan" which is appropriate as to the input voice "toshi no sekai isan".

Note that in the case that "toshi no sekai isan" which matches the notation as to the input voice "toshi no sekai isan" is obtained as the voice recognition result, the degree of similarity of "sekai isan toshi no isan" as to the input voice "toshi no sekai isan" is highest, and "sekai isan toshi no isan" is output as the word string for search results.

As in the above, in the case that the voice recognition result is "toshi no sekai isan", and in the case of "toshi-no-se kaisan", with matching using notation symbols, the matching results (similarity between the voice recognition result and the various word strings for search results) can differ, and consequently, there is a case wherein a program title such as "sekai isan toshi no isan" which is an appropriate program title as to the input voice "toshi no sekai isan" is output, and a case wherein a program title such as "shuin kaisan no toshi" which has no relation to the input voice "toshi no sekai isan" is output as the word string for search results.

Figure 16:
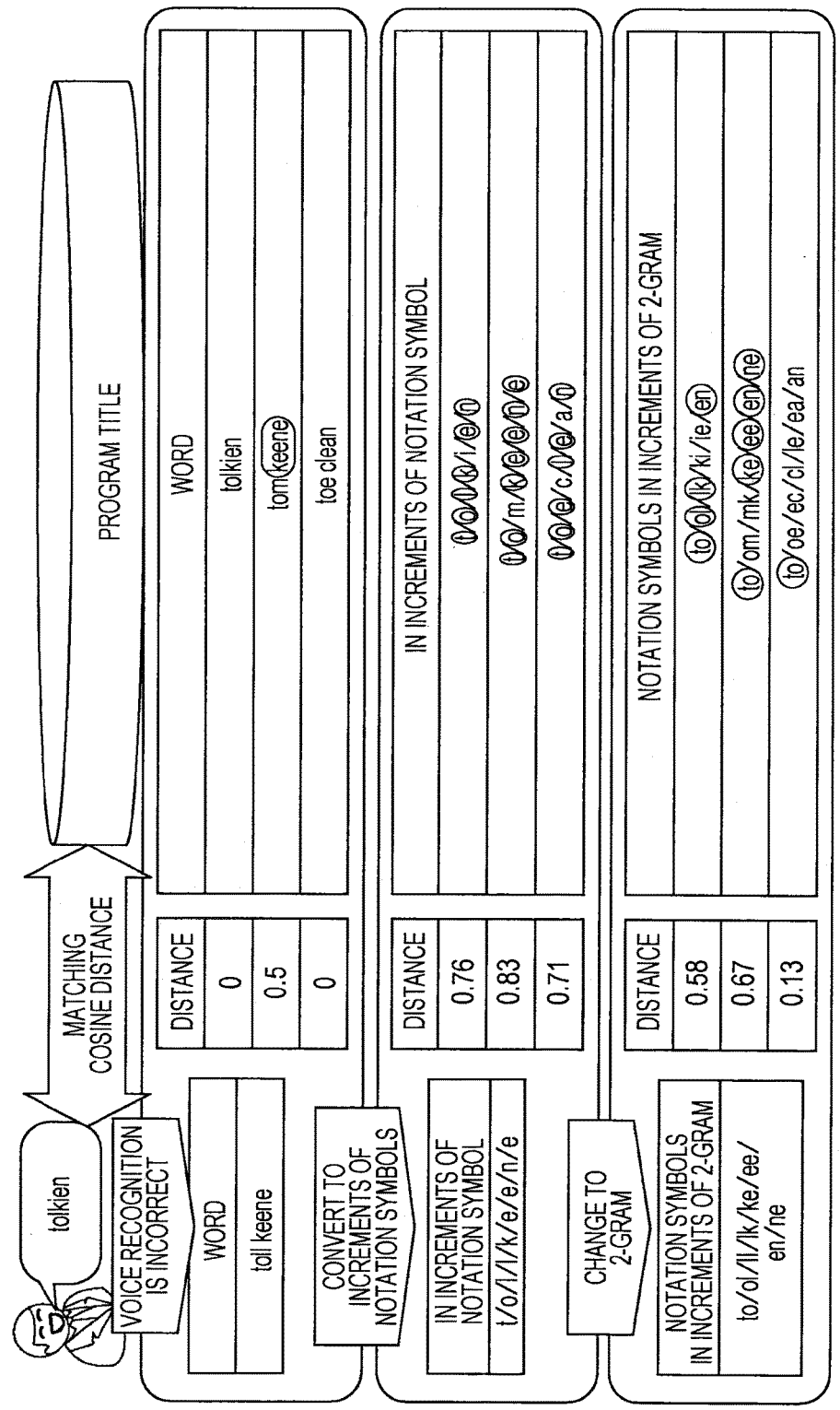
FIG. 16 is a diagram describing that, with matching using notation symbols, obtaining different matching results as to voice recognition results having different notations is not advantageous to voice searching performance.

FIG. 16 is a diagram describing that, in English, with matching using notation symbols, obtaining matching results that differ as to the voice recognition results where pronunciation matches but the notation differs, is not advantageous to the performance of voice searching.

In English, the notation symbol (alphabetic character) may differ but the pronunciation may match.

For example, the word strings "tolkien" and "toll keene" expressed in notation symbols match in pronunciation but differ in notation symbols.

Therefore, in the case that the voice recognition result is "tolkien" and in the case of "toll keene", with matching using notation symbols, different matching results are obtained, but this is not necessarily advantageous to the performance of voice searching.

That is to say, in FIG. 16, voice recognition of the input voice "tolkien" in English is performed, and while the pronunciation of the input voice "tolkien" thereof matches, a different voice recognition result "toll keene" which has different notations is obtained.

Also, in FIG. 16, as program titles, three are prepared as "tolkien", "tom keene", and "toe clean", for example, as word strings for search results to be matched with.

Also, in FIG. 16, as the matching using display symbols, matching is performed in increments of words, 1-gram increments (one-character increments) (notation symbols increments), and 2-gram increments.

Now, as a degree of similarity to be found in the matching using notation symbols, for example, similar to the case in FIG. 15, if cosine distance is employed, the degree of similarity of the program titles "tolkien", "tom keene", and "toe clean" serving as the word strings for search results are as follows.

That is to say, in increments of words, between the voice recognition results "toll keene" and the word string for search results "tolkien", not one word matches.

Also, in increments of words, between the voice recognition results "toll keene" and the word string for search results "tom keene", the one word that is circled in the diagram matches.

Further, in increments of words, between the voice recognition results "toll keene" and the word string for search results "toe clean", not one word matches.

Accordingly, as to the degree of similarity between the voice recognition results and word string for searching results, which is found with the matching in increments of words using notation symbols, the degree of similarity between the voice recognition results "toll keene" and the word string for search results "tom keene" is highest.

That is to say, with the matching in increments of words (Word) using notation symbols, as to the degree of similarity of the voice recognition result "toll keene" and the word string for search result "tolkien", 0.0 is found; as to the degree of similarity of the voice recognition result "toll keene" and the word string for search result "tom keene", 0.5 is found; and as to the degree of similarity of the voice recognition result "toll keene" and the word string for search result "toe clean", 0.0 is found, respectively.

Accordingly, for example, if the word string for search results having the highest degree of similarity obtained as a result of the matching is output as a search result word string, the voice recognition of the input voice "tolkien" makes an error and the voice recognition result "toll keene" is obtained, in which case, of the three program titles "tolkien", "tom keene", and "toe clean" as the word strings for search results, "tom keene" is output as the search result word string.

As to the input voice "tolkien", of the above-described three program titles "tolkien", "tom keene", and "toe clean", it is appropriate for the first program title "tolkien" to be output as the search result word string.

However, if voice recognition is made of the input voice "tolkien", which matches in pronunciation (reading) but differs in notation as "toll keene", with matching in increments of words using notation symbols, instead of the program title "tolkien" which is appropriate as to the input voice "tolkien", a program title such as "tom keene" which has no relation to "tolkien" is output as the search result word string.

Also, in increments of notation symbols (Alphabetic Character), between the voice recognition result "toll keene" and the word string for search result "tolkien", six notation symbols match, which are circled in the diagram.

Further, in increments of notation symbols, between the voice recognition result "toll keene" and the word string for search result "tom keene", seven notation symbols match, which are circled in the diagram.

Also, in increments of notation symbols, between the voice recognition result "toll keene" and the word string for search result "toe clean", six notation symbols match, which are circled in the diagram.

Accordingly, as to the degree of similarity between the voice recognition results and word string for searching results, which is found with the matching in increments of notation symbols, the degree of similarity between the voice recognition results "toll keene" and the word string for search results "tom keene" is highest.

That is to say, with the matching in increments of notation symbols, as to the degree of similarity of the voice recognition result "toll keene" and the word string for search result "tolkien", 0.76 is found; as to the degree of similarity of the voice recognition result "toll keene" and the word string for search result "tom keene", 0.83 is found; and as to the degree of similarity of the voice recognition result "toll keene" and the word string for search result "toe clean", 0.71 is found, respectively.

Accordingly, for example, if the word string for search results having the highest degree of similarity obtained as a result of the matching is output as a search result word string, the voice recognition of the input voice "tolkien" makes an error and the voice recognition result "toll keene" is obtained, in which case, of the three program titles "tolkien", "tom keene", and "toe clean" as the word strings for search results, "tom keene" is output as the search result word string.

As to the input voice "tolkien", of the above-described three program titles "tolkien", "tom keene", and "toe clean", it is appropriate for the first program title "tolkien" to be output as the search result word string.

However, if voice recognition is made of the input voice "tolkien", which matches in pronunciation (reading) but differs in notation as "toll keene", with matching in increments of notation symbols, similar to the matching in increments of words described above, instead of the program title "tolkien" which is appropriate as to the input voice "tolkien", a program title such as "tom keene" which has no relation to "tolkien" is output as the search result word string.

Also, in increments of 2-gram notation symbols (Alphabetic Bigram), between the voice recognition result "toll keene" and the word string for search result "tolkien", four instances of 2-gram notation symbols match, which are circled in the diagram.

Further, in increments of 2-gram notation symbols, between the voice recognition result "toll keene" and the word string for search result "tom keene", five instances of 2-gram notation symbols match, which are circled in the diagram.

Also, in increments of 2-gram notation symbols, between the voice recognition result "toll keene" and the word string for search result "toe clean", one instance of 2-gram notation symbols match, which is circled in the diagram.

Accordingly, as to the degree of similarity between the voice recognition results and word string for searching results, which is found with the matching in increments of 2-gram notation symbols, the degree of similarity between the voice recognition results "toll keene" and the word string for search results "tom keene" is highest.

That is to say, with the matching in increments of 2-gram notation symbols, as to the degree of similarity of the voice recognition result "toll keene" and the word string for search result "tolkien", 0.58 is found; as to the degree of similarity of the voice recognition result "toll keene" and the word string for search result "tom keene", 0.67 is found; and as to the degree of similarity of the voice recognition result "toll keene" and the word string for search result "toe clean", 0.13 is found, respectively.

Accordingly, for example, if the word string for search results having the highest degree of similarity obtained as a result of the matching is output as a search result word string, the voice recognition of the input voice "tolkien" makes an error and the voice recognition result "toll keene" is obtained, in which case, of the three program titles "tolkien", "tom keene", and "toe clean" as the word strings for search results, "tom keene" is output as the search result word string.

As to the input voice "tolkien", of the above-described three program titles "tolkien", "tom keene", and "toe clean", it is appropriate for the first program title "tolkien" to be output as the search result word string.

However, if voice recognition is made of the input voice "tolkien", which matches in pronunciation (reading) but differs in notation as "toll keene", with matching in increments of 2-gram notation symbols, similar to the matching in increments of words and in increments of notation symbols described above, instead of the program title "tolkien" which is appropriate as to the input voice "tolkien", a program title such as "tom keene" which has no relation to "tolkien" is output as the search result word string.

Note that in the case that "tolkien" of which the notation matches the input voice "tolkien" is obtained as the voice recognition result, the degree of similarity is highest between an appropriate program title "tolkien" as to the input voice "tolkien", with any of the matching in increments of words, increments of notation symbol units, and increments of 2-gram notation symbols, and "tolkien" is output as the search result word string.

As in the above, in the case that the voice recognition result is "tolkien", and in the case of "toll keene", with matching using notation symbols, the matching results (degree of similarity between the voice recognition result and each word string for search result) differ, and consequently, there are cases wherein an appropriate program title "tolkien" as to the input voice "tolkien" is output as the search result word string and a cases wherein such an appropriate title is not output and a program title such as "tom keene" which has not relation to the input voice "tolkien" is output as the search result word string.

Now, with the matching unit 56 of the voice searching device 50 (FIG. 9 and FIG. 10), in order to prevent an appropriate program title as to the input voice from not being output as the search result word string, matching using pronunciation symbols is performed.

Now, pronunciation symbols are symbols expressing the pronunciation of syllables or phonemes, for example, and for Japanese, hiragana which expresses the reading is employed.

With matching that uses pronunciation symbols, as increments for matching, (one) syllable, syllables of 2-gram or more, (one) phoneme, phonemes of 2-gram or more, or the like can be employed.

Note that with matching that uses pronunciation symbols, the matching results or the performance of voice searching differs depending on what sort of increments for matching are employed.

Figure 17:
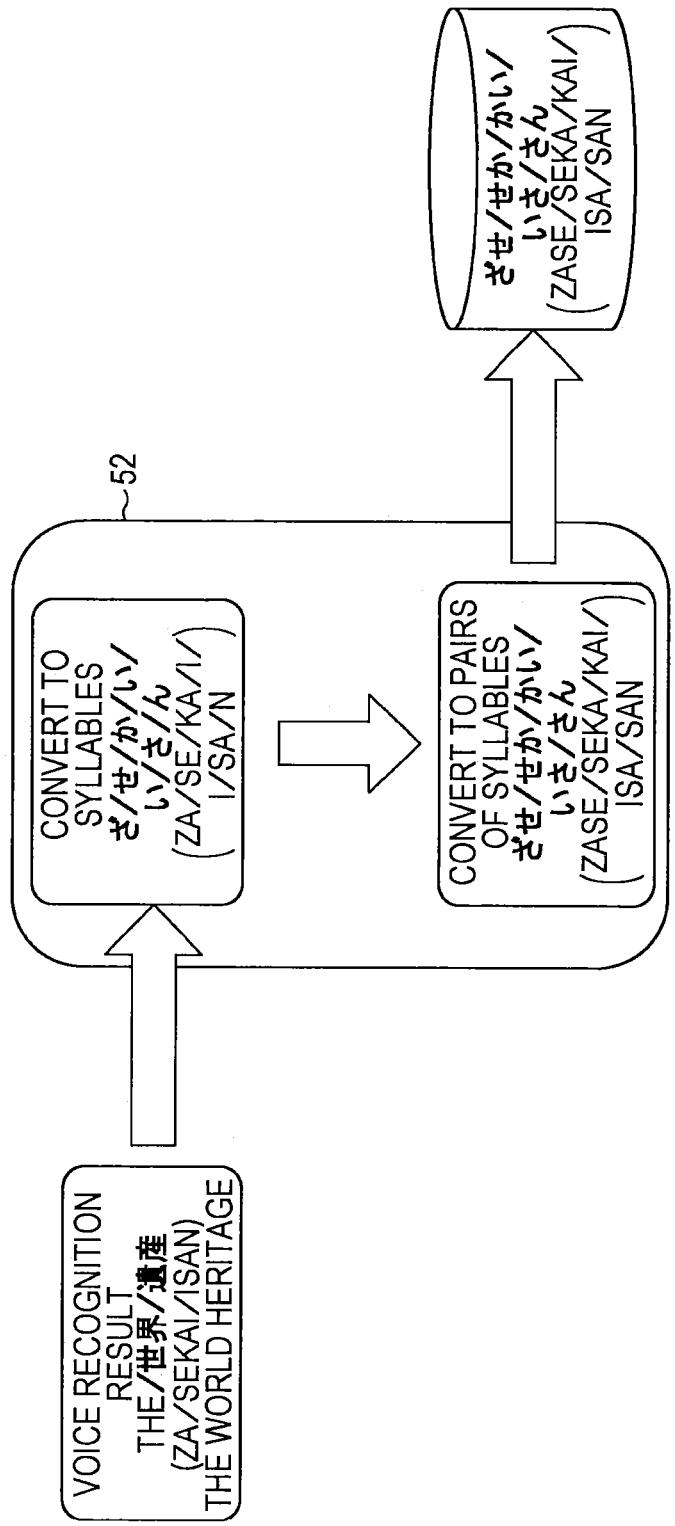
FIG. 17 is a diagram describing the processing in the pronunciation symbol converting unit 52 in the case of employing 2-gram syllables as increments for matching.

FIG. 17 is a diagram describing processing of the pronunciation symbol converting unit 52 in FIG. 9, in the case that voice recognition of Japanese input voice is performed, and that two consecutive syllables (two syllables that are consecutive) are employed as the increments for matching with the matching unit 56 (FIG. 9).

(Notation symbols, for example, of) the voice recognition result of Japanese input voice is supplied to the pronunciation symbol converting unit 52 from the voice recognition unit 51.

The pronunciation symbol converting unit 52 converts the voice recognition results supplied from the voice recognition unit 51 into an array of syllables.

Further, the pronunciation symbol converting unit 52 shifts the focus syllable to be focused from the lead of the array of syllables in the voice recognition results toward the back, while shifting one syllable at a time, and extracts 2-gram syllables which are the two syllables of the focus syllable and the syllable immediately following the focus syllable, and supplies the array of the 2-gram syllables thereof to the matching unit 56 (FIG. 9) as a recognition result pronunciation symbol string.

Figure 18:
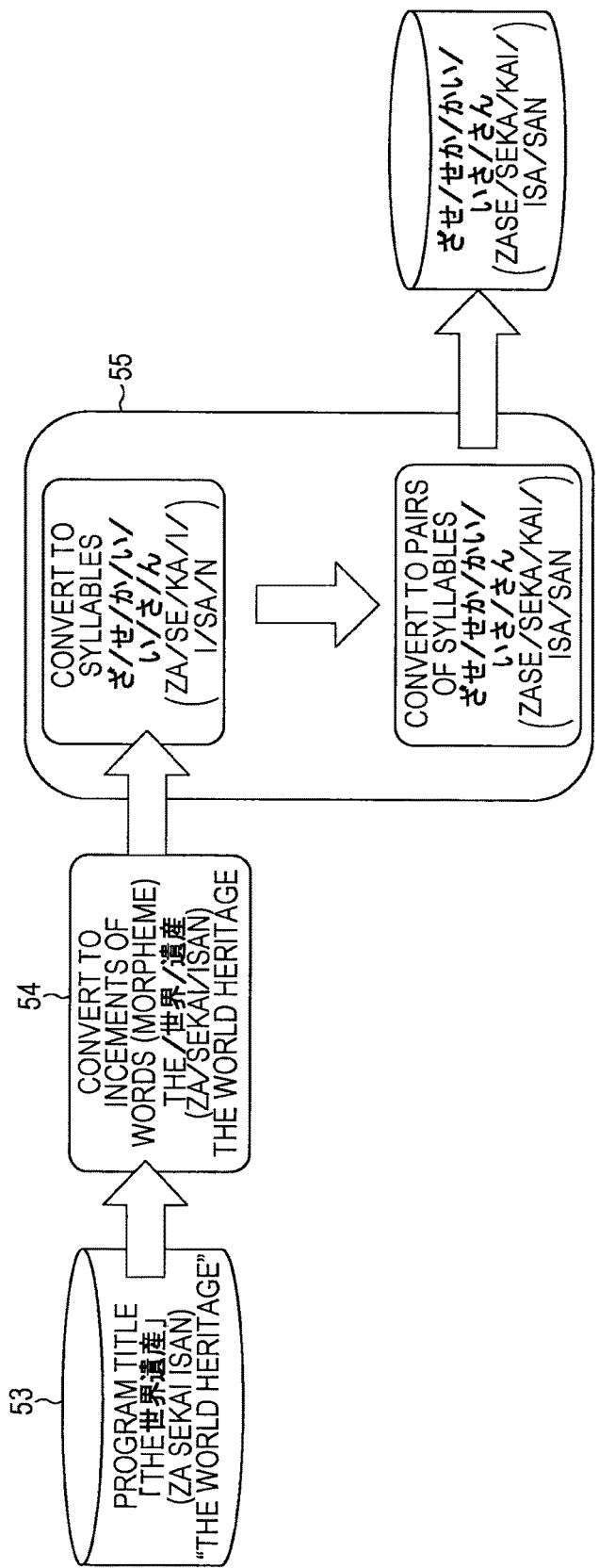
FIG. 18 is a diagram describing the processing in the pronunciation symbol converting unit 55 in the case of employing 2-gram syllables as increments for matching.

FIG. 18 is a diagram describing processing of the pronunciation symbol converting unit 55 in FIG. 9 in the case of employing 2-gram syllables as increments for matching with the matching unit 56 (FIG. 9).

A program title or the like serving as the word string for search results stored in the storage unit for search results 53 is subjected to morpheme analysis with the morpheme analyzing unit 54 and supplied to the pronunciation symbol converting unit 55.

The pronunciation symbol converting unit 55 converts the word string for search results supplied from the morpheme analyzing unit 54 into an array of syllables.

Further, the pronunciation symbol converting unit 55 shifts the focus syllable to be focused from the lead of the array of syllables in the word string for search results toward the back, while shifting one syllable at a time, and extracts 2-gram syllables which are the two syllables of the focus syllable and the syllable immediately following the focus syllable, and supplies the array of the 2-gram syllables thereof to the matching unit 56 (FIG. 9) as a pronunciation symbol string for search results.

Figure 19:
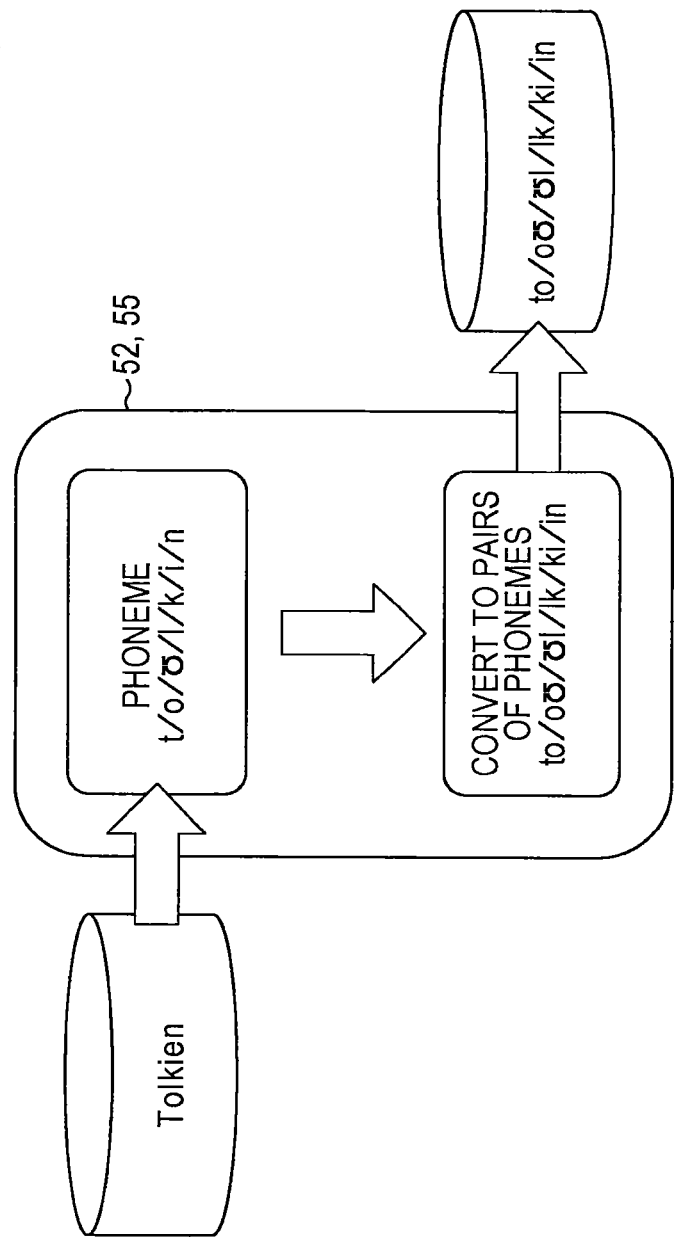
FIG. 19 is a diagram describing the processing in the pronunciation symbol converting units 52 and 55 in the case of employing 2-gram phonemes as increments for matching.

FIG. 19 is a diagram describing processing of the pronunciation symbol converting units 52 and 55 in the case that voice recognition of English input voice is performed, and that two consecutive phonemes (two phonemes that are consecutive) are employed as increments for matching with the matching unit 56 (FIG. 10).

(Notation symbols, for example, of) the voice recognition result of English input voice is supplied to the pronunciation symbol converting unit 52 from the voice recognition unit 51.

Also, a program title or the like, as the word string for search results stored in the storage unit for search result 53 is supplied to the pronunciation symbol converting unit 55.

The pronunciation symbol converting unit 52 converts (each word of) the voice recognition result supplied from the voice recognition unit 51 into an array of phonemes (pronunciation symbols expressing phonemes). Then the pronunciation symbol converting unit 52 shifts the focus syllable to be focused from the lead of the array of phonemes in the voice recognition results toward the back, while shifting one phoneme at a time, and extracts 2-gram phonemes which are the two phonemes of the focus phoneme and the phoneme immediately following the focus phoneme, and supplies the array of the 2-gram phonemes thereof to the matching unit 56 (FIG. 10) as a recognition result pronunciation symbol string.

Similarly, the pronunciation symbol converting unit 55 converts the word string for search result supplied from storage unit for search results 53 into an array of phonemes. Then the pronunciation symbol converting unit 55 shifts the focus phoneme to be focused from the lead of the array of phonemes in the word string for search results toward the back, while shifting one phoneme at a time, and extracts 2-gram phonemes which are the two phonemes of the focus phoneme and the phoneme immediately following the focus phoneme, and supplies the array of the 2-gram phonemes thereof to the matching unit 56 (FIG. 10) as a recognition result pronunciation symbol string.

Figure 21:
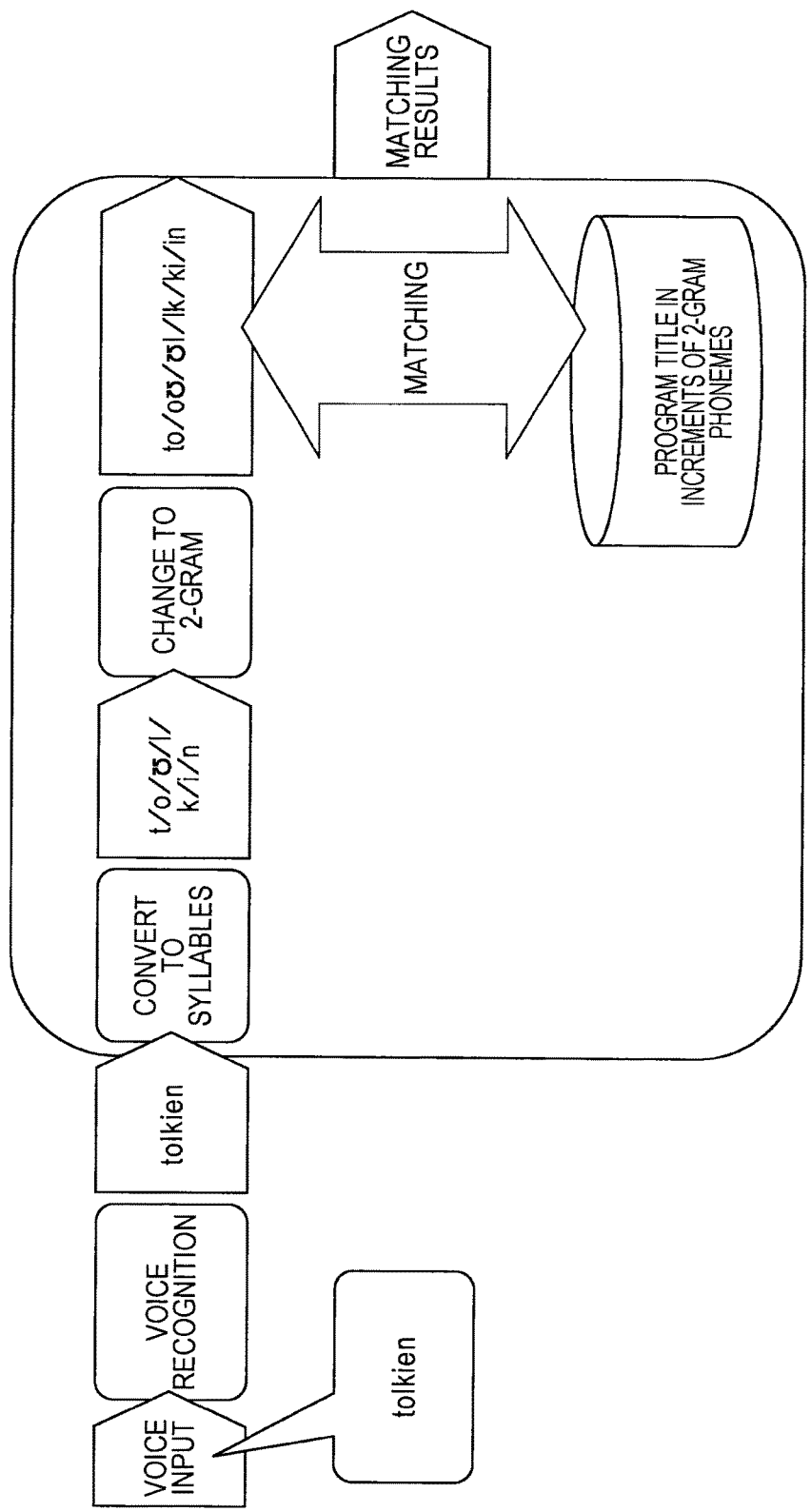
FIG. 21 is a diagram describing matching that the matching unit 56 performs in increments of 2-gram phonemes.
Figure 23:
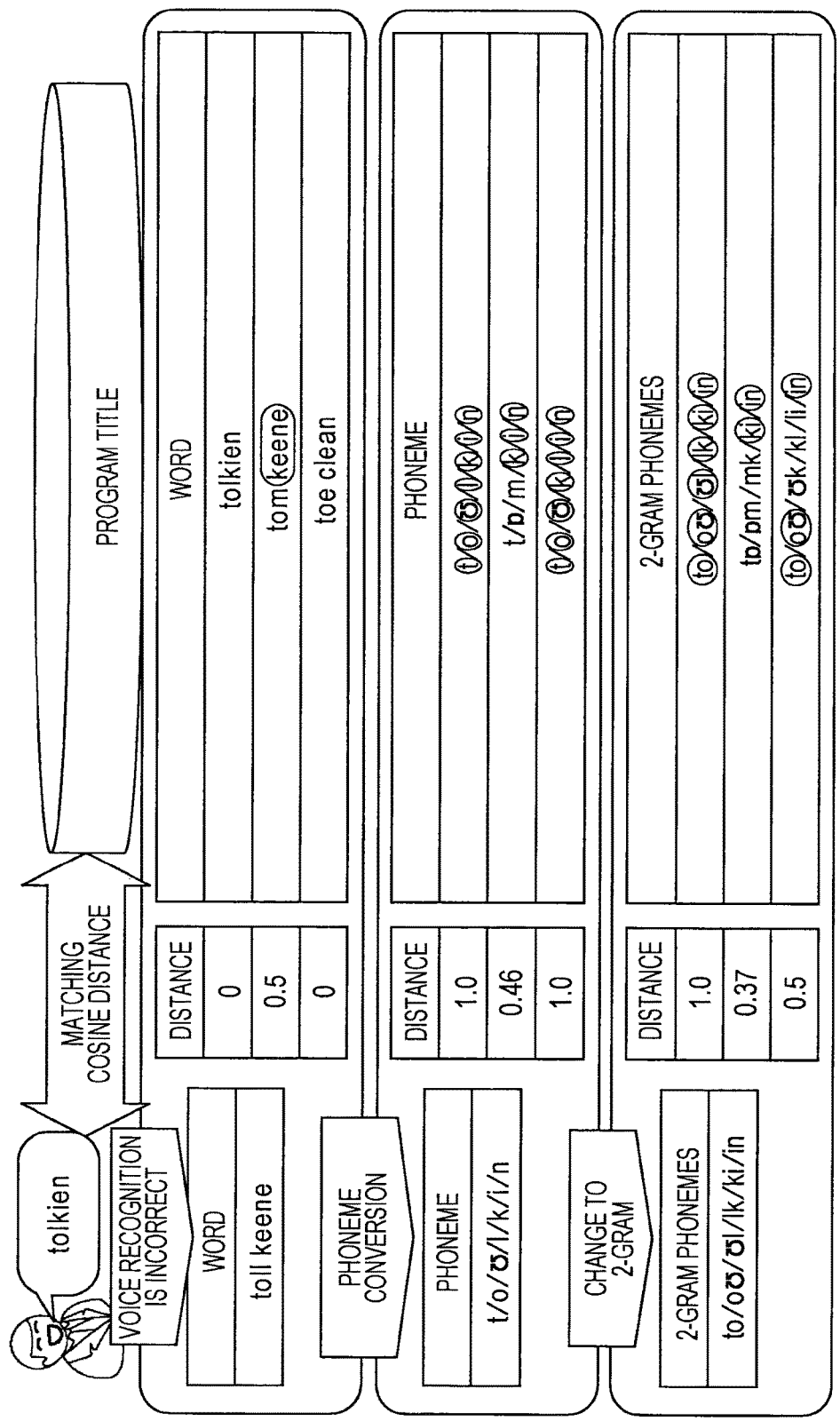
FIG. 23 is a diagram illustrating results of matching in increments of words, matching in increments of syllables, and matching in increments of 2-gram syllables.

Now, in FIG. 19, the characters segments with a slash (/) indicate phonemes as pronunciation symbols, and are voice symbols which are the IPA (International Phonetic Alphabet) determined by the International Phonetic Association. FIG. 21 and FIG. 23 to be described later are also the same.

Figure 20:
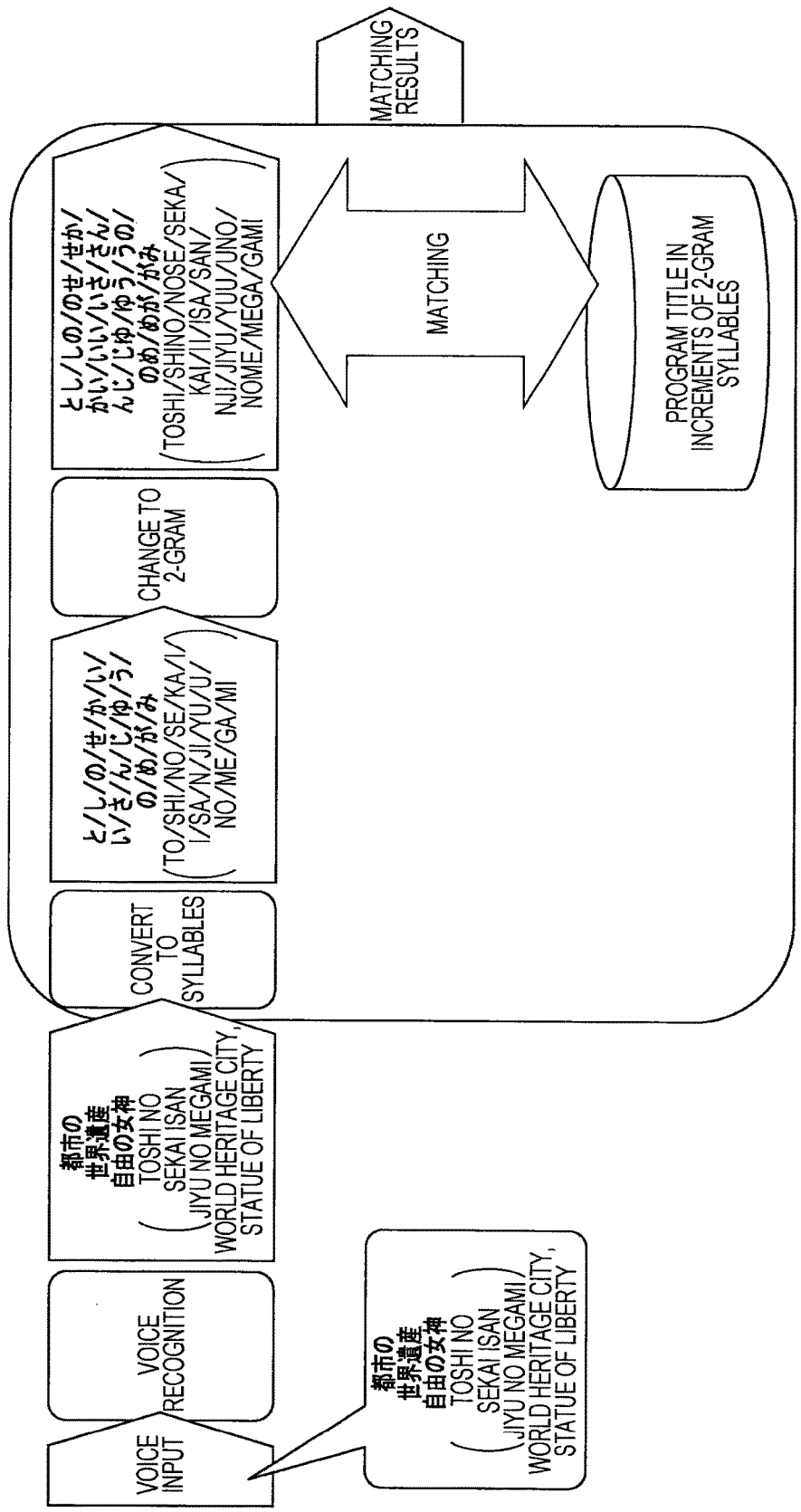
FIG. 20 is a diagram describing matching that the matching unit 56 performs in increments of 2-gram syllables.

FIG. 20 is a diagram describing matching in the case of the matching unit 56 in FIG. 9 performing matching in increments of 2-gram syllables.

For example, in the case that voice recognition is performed on Japanese input voice with the voice recognition unit 51, matching in increments of 2-gram syllables is performed with the matching unit 56.

Also, in the case that the matching unit 56 is to find a cosine distance, for example, as the degree of similarity between the recognition result pronunciation symbol string and pronunciation symbol string for search results serving as the matching in increments of 2-gram syllables between the recognition result pronunciation symbol string and pronunciation symbol string for search result, the matching unit 56 finds the recognition result vector which is a vector that expresses the recognition result pronunciation symbol string based on the 2-gram syllables that make up the recognition result pronunciation symbol string.

That is to say, the matching unit 56 finds a vector wherein a component corresponding to 2-gram syllables that exist in the recognition result pronunciation symbol string is 1 and a component corresponding to 2-gram syllables not existing in the recognition result pronunciation symbol string is 0, as a recognition result vector expressing the recognition result pronunciation symbol string.

Further, also for a program title or the like, for example, as each word string for search results that have been stored in the storage unit for search results 53, the matching unit 56 similarly finds a vector for search result, which is a vector that expresses the pronunciation symbol string for search result based on the 2-gram syllables making up the pronunciation symbol string for search result of the word string for search result.

Also, the matching unit 56 performs matching in increments of 2-gram syllables, wherein a cosine distance, which is a value found by dividing the inner product of the recognition result vector and the vector for search result by a value derived from multiplying the size of the recognition result vector and the size of the vector for search results, is found as a degree of similarity between the voice recognition result and the word string for search result corresponding to the vector for search results.

FIG. 21 is a diagram describing matching in the case that the matching unit 56 in FIG. 10 performs matching in increments of 2-gram phonemes.

For example, in the case that voice recognition of English input voice is performed with the voice recognition unit 51, matching in increments of 2-gram phonemes, for example, is performed with the matching unit 56.

Also, in the case that the matching unit 56 is to find a cosine distance, for example, as the degree of similarity between the recognition result pronunciation symbol string and pronunciation symbol string for search results serving as the matching in increments of 2-gram phonemes between the recognition result pronunciation symbol string and pronunciation symbol string for search result, the matching unit 56 finds the recognition result vector which is a vector that expresses the recognition result pronunciation symbol string based on the 2-gram phonemes that make up the recognition result pronunciation symbol string.

That is to say, the matching unit 56 finds a vector, wherein a component corresponding to 2-gram phonemes that exist in the recognition result pronunciation symbol string is 1 and a component corresponding to 2-gram phonemes not existing in the recognition result pronunciation symbol string is 0, as a recognition result vector expressing the recognition result pronunciation symbol string.

Further, also for a program title or the like, for example, as each word string for search results that have been stored in the storage unit for search results 53, the matching unit 56 similarly finds a vector for search result, which is a vector that expresses the pronunciation symbol string for search result based on the 2-gram phonemes making up the pronunciation symbol string for search result of the word string for search result.

Also, the matching unit 56 performs matching in units of 2-gram phonemes, wherein a cosine distance, which is a value found by dividing the inner product of the recognition result vector and the vector for search result by a value derived from multiplying the size of the recognition result vector and the size of the vector for search results, is found as a degree of similarity between the voice recognition result and the word string for search result corresponding to the vector for search result.

Figure 22:
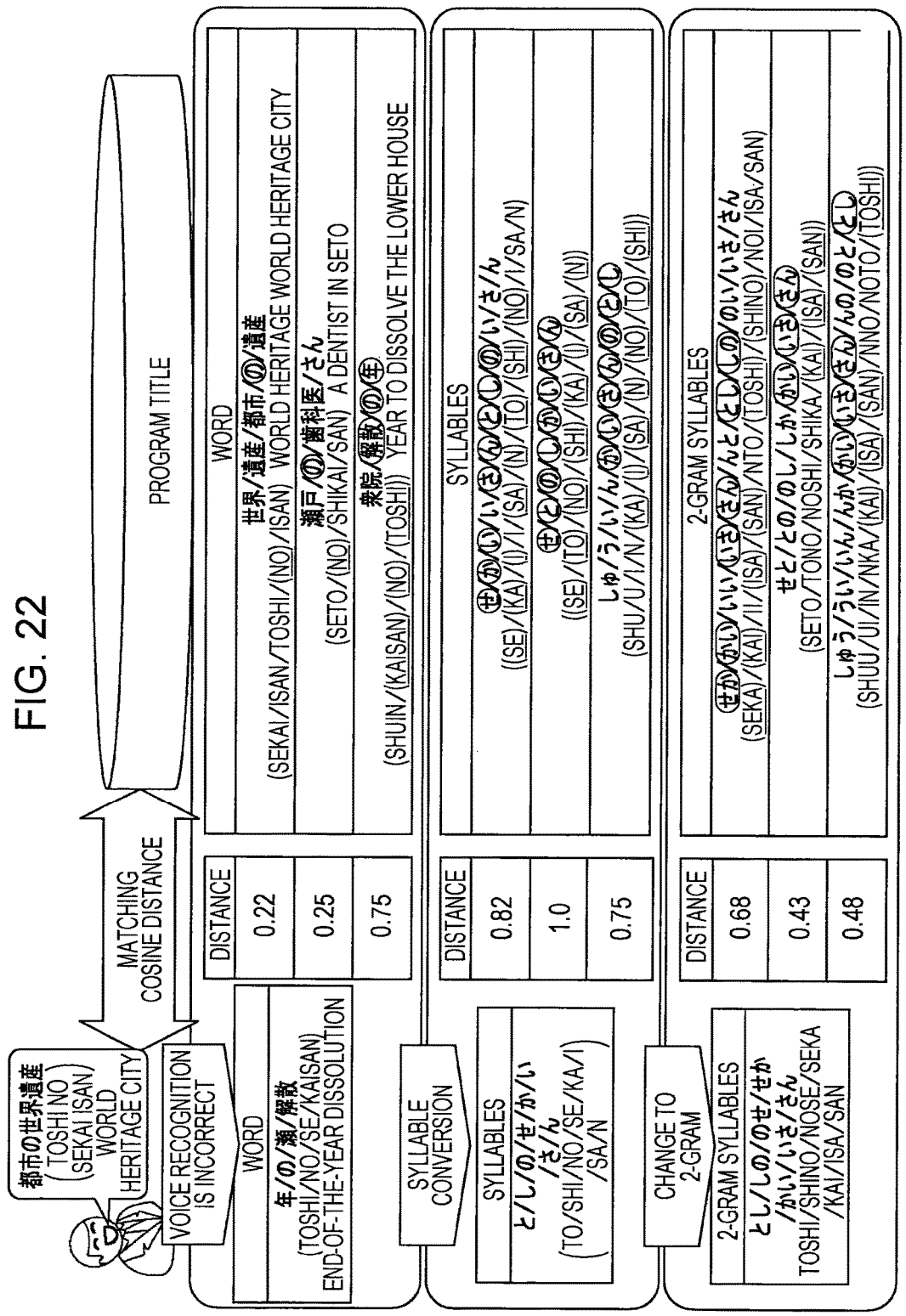
FIG. 22 is a diagram illustrating results of matching in increments of words, matching in increments of syllables, and matching in increments of 2-gram syllables.

FIG. 22 is a diagram illustrating results of matching in increments of words, matching in increments of (one) syllable, and matching in increments of 2-gram syllables, in Japanese.

Note that in FIG. 22, similar to FIG. 15, the incorrect voice recognition result "toshi no se kaisan" ("End-of-year Dissolution" in English) is obtained as to the Japanese input voice "toshi no sekai isan" ("world heritage city" in English), and as the word string for search results, three programs, "sekai isan toshi no isan" ("Heritage of World Heritage City" in English") "seto no haisha san" (a dentist in Seto), and "shuin kaisan no toshi" ("year to dissolve the Lower House") are prepared as program titles.

Also, in FIG. 22, matching in increments of words using notation symbols, matching in increments of syllables using pronunciation symbols, and matching in increments of 2-gram syllables using pronunciation symbols is performed.

Further, in FIG. 22, the words or pronunciation symbols of the word strings for search results that match the words of pronunciation symbols of the voice recognition result "toshi-no-se kaisan" are circled.

With matching in increments of words, the degrees of similarity (cosine distance) between the voice recognition result "toshi no se kaisan" and the word strings for search results "sekai isan toshi no isan" "seto no haisha san", and "shuin kaisan no toshi" are found as 0.22, 0.25, and 0.75, respectively.

Accordingly, for example, by outputting the word string for search results having the highest similarity obtained as a result of the matching, for example, as the search result word string, the voice recognition of the input voice "toshi no sekai isan" is incorrect, and in the case that the voice recognition result "toshi-no-se kaisan" is obtained, of the three program titles serving as the word string for search results "sekai isan toshi no isan", "seto no haisha san", and "shuin kaisan no toshi", with matching in increments of words, the word string for search results "shuin kaisan no toshi" having the highest similarity of 0.75 to the voice recognition result "toshi-no-se kaisan" is output as the search result word string.

As to the input voice "toshi no sekai isan", of the three program titles described above, "sekai isan toshi no isan", "seto no haisha san", and "shuin kaisan no toshi", it is appropriate for the first program title "sekai isan toshi no isan" to be output as the search result word string.

However, while the input voice "toshi no sekai isan" matches in pronunciation (reading), if voice recognition is made as "toshi-no-se kaisan" which has different notation, with matching in increments of words, a program title such as "shuin kaisan no toshi" which has no relation to the "toshi no sekai isan" is output as the word string for search results, instead of a program title such as "sekai isan toshi no isan" which is appropriate as to the input voice "toshi no sekai isan".

In the case of matching using notation symbols also in increments of notation symbols instead of increments of words, as described in FIG. 15, as to the incorrect voice recognition result "toshi-no-se kaisan" of the input voice "toshi no sekai isan", a program title "shuin kaisan no toshi" which has no relation to the input voice "toshi no sekai isan" is output as the search result word string.

With matching in increments of syllables, using the pronunciation symbols, the degrees of similarity of the voice recognition result "toshi-no-se kaisan" and the word strings for search results "sekai isan toshi no isan", "seto no haisha san", and "shuin kaisan no toshi", are found to be 0.82, 1.0, and 0.75, respectively.

Accordingly, for example, if the word string for search results having the highest similarity obtained as a result of the matching is output as the search result word string, in the case that the voice recognition of the input voice "toshi no sekai isan" is incorrect, and the voice recognition result "toshi-no-se kaisan" is obtained, with the matching in increments of syllables, using pronunciation symbols, of three program titles serving as the word strings for search results, "sekai isan toshi no isan", "seto no haisha san", and "shuin kaisan no toshi", the word string for search results having the highest similarity of 1.0 with the voice recognition result "toshi-no-se kaisan" is output as the search result word string.

That is to say, if the input voice "toshi no sekai isan" matches in pronunciation but the voice recognition becomes "toshi-no-se kaisan" which has a different notation, with the matching in increments of syllables using the pronunciation symbols, a program title such as "seto no haisha san" which has no relation to the toshi no sekai isan" is output as the word string for search results, instead of a program title such as "sekai isan toshi no isan" which is appropriate as to the input voice "toshi no sekai isan".

Note that with the matching in increments of words using notation symbols, the similarity of the title "sekai isan "toshi no isan" which is appropriate as to the input voice toshi no sekai isan" is 0.22 which is the third (lowest) value in the three word strings for search results, but with the matching in increments of syllable, using pronunciation symbols, the similarity of the title "sekai isan toshi no isan" which is appropriate as to the input voice toshi no sekai isan" is 0.82 which is the second value in the three word strings for search results.

Accordingly, matching in increments of syllables, using pronunciation symbols, is more effective than matching in increments of words, using notation symbols, from the point that the similarity of a program title "sekai isan toshi no isan" appropriate as to the input voice toshi no sekai isan" is higher than the case of matching in increments of words, using notation symbols.

In this case, with the matching in increments of 2-gram syllables, using pronunciation symbols, as a degree of similarity between the voice recognition result "toshi-no-se kaisan" and the word strings for search results "sekai isan toshi no isan", "seto no haisha san", and "shuin kaisan no toshi", 0.68, 0.43, and 0.48, are found, respectively.

Accordingly, for example, by outputting the word string for search results having the highest degree of similarity obtained as a result of the matching, for example, as the search result word string, the voice recognition of the input voice "toshi no sekai isan" is incorrect, and even in the case that the voice recognition result "toshi-no-se kaisan" is obtained, with matching in increments of 2-gram syllables, using pronunciation symbols, of the three program titles serving as the word strings for search results "sekai isan toshi no isan", "seto no haisha san", and "shuin kaisan no toshi", the word string for search results having the highest degree of similarity of 0.68 with the voice recognition result "toshi-no-se kaisan", i.e., the program title "sekai isan toshi no isan", which is appropriate as to the input voice"toshi no sekai isan", is output as the search result word string.

FIG. 23 is a diagram illustrating results of matching in increments of words, matching in increments of (one) phoneme, and matching in increments of 2-gram phonemes, in English.

Note that in FIG. 23, similar to FIG. 16, the incorrect voice recognition result "toll keene" is obtained as to the English input voice "tolkien", and for example, as program titles, the three of "tolkien", "tom keene", and "toe clean" have been provided as the word string for search results.

Also, in FIG. 23, matching in increments of words using notation symbols, matching in increments of phonemes using pronunciation symbols, and matching in increments of 2-gram phonemes using pronunciation symbols is performed.

Further, in FIG. 23, the word or pronunciation symbol of the word string for search result that matches the word or pronunciation symbol (phoneme) of the voice recognition result "toll keene" is circled.

With matching in increments of words, the similarities (cosine distance) between the voice recognition result "toll keene" and the word strings for search result "tolkien", "tom keene", and "toe clean", are found as 0.0, 0.5, and 0.0, respectively.

Accordingly, for example, in the case that the word string for search result having the highest degree of similarity obtained as a result of the matching is output as the search result word string, the voice recognition of the input voice "tolkien" is incorrect, and the voice recognition result "toll keene" is obtained, with the matching in increments of words, of the three program titles "tolkien", "tom keene", and "toe clean" serving as the word strings for search results, the word string "tom keene" for search result having the highest degree of similarity with the voice recognition result "toll keene" of 0.5 is output as the search result word string.

As to the input voice "tolkien", of the above-described three program titles "tolkien", "tom keene", and "toe clean", it is appropriate for the first program title "tolkien" to be output as the search result word string.

However, if voice recognition is made of the input voice "tolkien", which matches in pronunciation (reading) but differs in notation as "toll keene", with matching in increments of words using notation symbols, instead of the program title "tolkien" which is appropriate as to the input voice "tolkien", a program title such as "tom keene" which has no relation to "tolkien" is output as the search result word string.

Note that in the case that matching using notation symbols are performed in increments of notation symbols instead of increments of words, as described with FIG. 16, a program title such as "tom keene" which has no relation to the incorrect voice recognition result "toll keene" of the input voice "tolkien" is output as the search result word string.

With matching in increments of phonemes using pronunciation symbols, the similarities between the voice recognition result "toll keene" and the word strings for search result "tolkien", "tom keene", and "toe clean", are found as 1.0, 0.46, and 1.0, respectively.

Accordingly, for example, in the case that the word string for search result having the highest degree of similarity obtained as a result of the matching is output as the search result word string, the voice recognition of the input voice "tolkien" is incorrect, and the voice recognition result "toll keene" is obtained, with the matching in increments of phones using pronunciation symbols, of the three program titles "tolkien", "tom keene", and "toe clean" serving as the word strings for search results, the word strings "tolkien" and "toe clean" for search result having the highest degree of similarity with the voice recognition result "toll keene" of 1.0 are output as the search result word string.

That is to say, if the input voice "tolkien" is voice-recognized as "toll keene" which matches in pronunciation but differs in notation, with the matching in increments of phoneme using pronunciation symbols, a program title such as "tom keene" which has no relation to the program title "tolkien" which is appropriate as to the input voice "tolkien" is output as a search result word string, but the program title "tolkien" which is appropriate to the input voice "tolkien" is also output as a search result word string.

As in the above, with matching in increments of phonemes using pronunciation symbols, even in the case wherein the input voice "tolkien" is voice-recognized as "toll keene" which matches in pronunciation but differs in notation, the program title "tolkien" which is appropriate as to the input voice "tolkien" is also output as a search result word string.

With the matching in 2-gram phoneme increments using pronunciation symbols, as degree of similarity between the voice recognition result "toll keene" and the word string for each of the search results "tolkien", "tom keene", and "toe clean", 1.0, 0.37, and 0.5 are found, respectively.

Accordingly, for example, in the case that the word string for search result having the highest degree of similarity obtained as a result of the matching is output as the search result word string, the voice recognition of the input voice "tolkien" is incorrect, and the voice recognition result "toll keene" is obtained, with the matching in 2-gram phoneme increments using pronunciation symbols, of the three program titles "tolkien", "tom keene", and "toe clean" serving as the word strings for search results, the word string for search result having the highest degree of similarity with the voice recognition result "toll keene" of 1.0, i.e. the program title "tolkien" which is appropriate as to the input voice "tolkien" is output as the search result word string.

As in the above, according to the matching using pronunciation symbols, word string searching corresponding to the input voice can be performed in a more robust manner as compared to the case of performing matching using notation symbols.

That is to say, according to the matching using pronunciation symbols, even in the case that voice recognition is incorrect, word string searching corresponding to the input voice can be prevented (reduced) from being output as a search result word string.

[Correction Distance that is Corrected Cosine Distance]

In the matching unit 56 (FIG. 9 and FIG. 10), in the case of employing cosine distance as the degree of similarity between the (recognition result pronunciation string of the) voice recognition results and the (pronunciation symbol string for search results of the) word string for search results), for example, as described above, a vector is to be found wherein a component corresponding to (2-gram) syllables that exist in the recognition result pronunciation symbol string is 1 and a component corresponding to syllables not existing in the recognition result pronunciation symbol string is 0, as a recognition result vector expressing the recognition result pronunciation symbol string.

Further, with the matching unit 56, similarly, a vector for search results expressing the pronunciation symbol string for search results of the word string for search results is to be found.

Now, according to the present embodiment, by setting the component value of the recognition result vector to be 1 or 0, depending on whether a syllable corresponding to the component thereof exists in the recognition result pronunciation symbol string, regarding the component value of the recognition result vector, tf (Term Frequency), which is the frequency of the syllable corresponding to the component thereof appearing in the recognition result pronunciation symbol string, can be employed.

Also, the component value of the recognition result vector, additionally, for example, can employ an idf (Invert Document Frequency) which becomes larger as to syllables that appear disproportionately in a certain word string for search results, and becomes smaller as to a syllable that appears distributed throughout many word strings for search results, or can employ a TF-IDF which couples both the tf and idf.

The vector for search results is also similar.

Now, if the recognition result vector is expressed as $V_{UTR}$, and the vector for search results of the i'th word string for search results stored in the storage unit for search results 53 (FIG. 9 and FIG. 10) is expressed as $V_{TITLE}(i)$, the cosine distance D serving as the degree of similarity between the voice recognition results and the i'th word string for search results is calculated according to Expression (1).

$$D = V_{UTR} \cdot V_{TITLE}(i)/(|V_{UTR}||V_{TITLE}(i)|) \quad (1)$$

In Expression (1), · indicates the inner product, and |x| indicates the size of vector x (norm). Accordingly, the cosine distance D can be found by dividing the inner product $V_{UTR} \cdot V_{TITLE}(i)$ of the recognition result vector $V_{UTR}$ and the vector for search results $V_{TITLE}(i)$ by the value $|V_{UTR}||V_{TITLE}(i)|$ which is derived by multiplying the size $|V_{UTR}|$ of the recognition result vector $V_{UTR}$ and the size $|V_{TITLE}(i)|$ of the vector for search results $V_{TITLE}(i)$.

The cosine distance D takes a value in the range of 0.0 through 1.0, indicating that the greater the value, the more the recognition result pronunciation symbol string expressed by the recognition result vector $V_{UTR}$ and the pronunciation symbol string for search results expressed by the vector for search results $V_{TITLE}(i)$ are similar.

As described above, the cosine distance D is found by dividing the inner product $V_{UTR} \cdot V_{TITLE}(i)$ of the recognition result vector $V_{UTR}$ and the vector for search results $V_{TITLE}(i)$ by the value $|V_{UTR}||V_{TITLE}(i)|$ which is derived by multiplying the size $|V_{UTR}|$ of the recognition result vector $V_{UTR}$ and the size $|V_{TITLE}(i)|$ of the vector for search results $V_{TITLE}(i)$, whereby differences in the lengths between the voice recognition results and word strings for search results influences the cosine distance D.

Now, as to the lengths between the voice recognition results and word strings for search results, when performing matching between the voice recognition results and word strings for search results, i.e., in the case of calculating the cosine distance as a degree of similarity using notation symbols, the number of notation symbols in the voice recognition result and the word string for search results is indicated, in the case of performing in increments of words using notation symbols to calculate the degree of similarity, the number of words in the voice recognition result and the word string for search results is indicated, in the case of performing in increments of phonemes using pronunciation symbols to calculate the degree of similarity, the number of phonemes in the voice recognition result and the word string for search results is indicated, in the case of performing in increments of 2-gram phonemes using pronunciation symbols to calculate the degree of similarity, the number of 2-gram phonemes in the voice recognition result and the word string for search results is indicated, in the case of performing in increments of phonemes using pronunciation symbols to calculate the degree of similarity, the number of phonemes in the voice recognition result and the word string for search results is indicated, and in the case of performing in increments of 2-gram phonemes using pronunciation symbols to calculate the degree of similarity, the number of 2-gram phonemes in the voice recognition result and the word string for search results is indicated.

Now, in order to simplify the description, if the calculations of the cosine distance D serving as the matching between the voice recognition results and word string for search results in increments of words using notation symbols, the computation of the cosine distance D in Expression (1) serving as degree of similarity includes the division of the vector for search results $V_{TITLE}(i)$ by the size $|V_{TITLE}(i)|$, whereby, for example, although the same word string is included as the voice recognition results, of a word string for search results that the length (here, the number of words) is long and a words string for search results that the length that is short, there is a tendency wherein degree of similarity with the short word string for search results is high (cosine distance D is greater), and degree of similarity with the long word string for search results is low (cosine distance D is smaller).

Accordingly, even if a portion of the word string for search results having a long length is obtained as the word recognition results, the degree of similarity between the word recognition results thereof and the word string for search results having a long length will not be ranked highly, and such a word string for search results is not output as the search result word string, whereby the search accuracy of the word string corresponding to the input voice may deteriorate.

That is to say, for example, in the case that a portion of the long title is spoken, the degree of similarity of the long title thereof will not be ranked highly, and the long title thereof may not be output as the search result word string.

Also, for a similar reason, although the same word string is included as a predetermined word string for search results, of a voice recognition result having a length that is long and a voice recognition result that is short, there is a tendency wherein degree of similarity with the long voice recognition result and the predetermined word string for search results is lower and the degree of similarity with the short voice recognition result and the predetermined word string for search results is higher.

Accordingly, when the same word string is included as a predetermined word string for search results but the length of the voice recognition result is long, the degree of similarity of the predetermined word string for search results thereof will not be ranked highly, and the predetermined word string for search results thereof is not output as the search result word string, whereby the accuracy of the search for the word string corresponding to the input voice may deteriorate.

That is to say, for example, in the case that a long speech is performed which includes a short title, the degree of similarity of the short title thereof will not be ranked highly, and the short title thereof may not be output as the search result word string.

Now, with the matching unit 56 (FIG. 9 and FIG. 10), so as to reduce the influence of the difference in lengths between the voice recognition result and the word string for search results, a correction distance wherein the cosine distance D has been corrected can be employed as the degree of similarity between the voice recognition result and the word string for search results.

In the case of employing correction distance as the degree of similarity between the voice recognition result and the word string for search results, the above-described degree of similarity between the voice recognition result and long word string for search results, and the degree of similarity between the long voice recognition result and the word string for search results can be prevented from becoming lower, and consequently, searching for the word string corresponding to the input voice can be performed in a robust manner, and deterioration in accuracy of the searching for the word string corresponding to the input voice can be prevented.

As correction distances, there is a first correction distance and a second correction distance.

The first correction distance is found, in the computation in Expression (1) to find the cosine distance D, instead of the size $|V_{TITLE}(i)|$ of the vector for search results $V_{TITLE}(i)$ which is proportional to the length of the word string for search results, a value $|V_{UTR}| \times \sqrt{(|V_{TITLE}(i)|/|V_{UTR}|)}$ which is not proportional to the length of the word string for search results, i.e., a square root $\sqrt{(|V_{TITLE}(i)| \|V_{UTR}|)}$ of a multiplication of the size $|V_{UTR}|$ of the recognition result vector $V_{UTR}$ and the size $|V_{TITLE}(i)|$ of the vector for search results $V_{TITLE}(i)$, is used In the computation in Expression (1) to find the cosine distance D, the value that is used instead of the size $|V_{TITLE}(i)|$ of the vector for search results $V_{TITLE}(i)$ will also be called a substitution size S(i) hereafter.

The first correction distance D1 is found according to Expression (2).

$$D1 = V_{UTR} \cdot V_{TITLE}(i) / (|V_{UTR}|S(i)) = \qquad (2)$$
$$V_{UTR} \cdot V_{TITLE}(i) / (|V_{UTR}||V_{UTR}| \times \sqrt{(|V_{TITLE}(i)|/|V_{UTR}|)}) =$$
$$V_{UTR} \cdot V_{TITLE}(i) / (|V_{UTR}|\sqrt{(|V_{TITLE}(i)||V_{UTR}|)})$$

Figure 24:
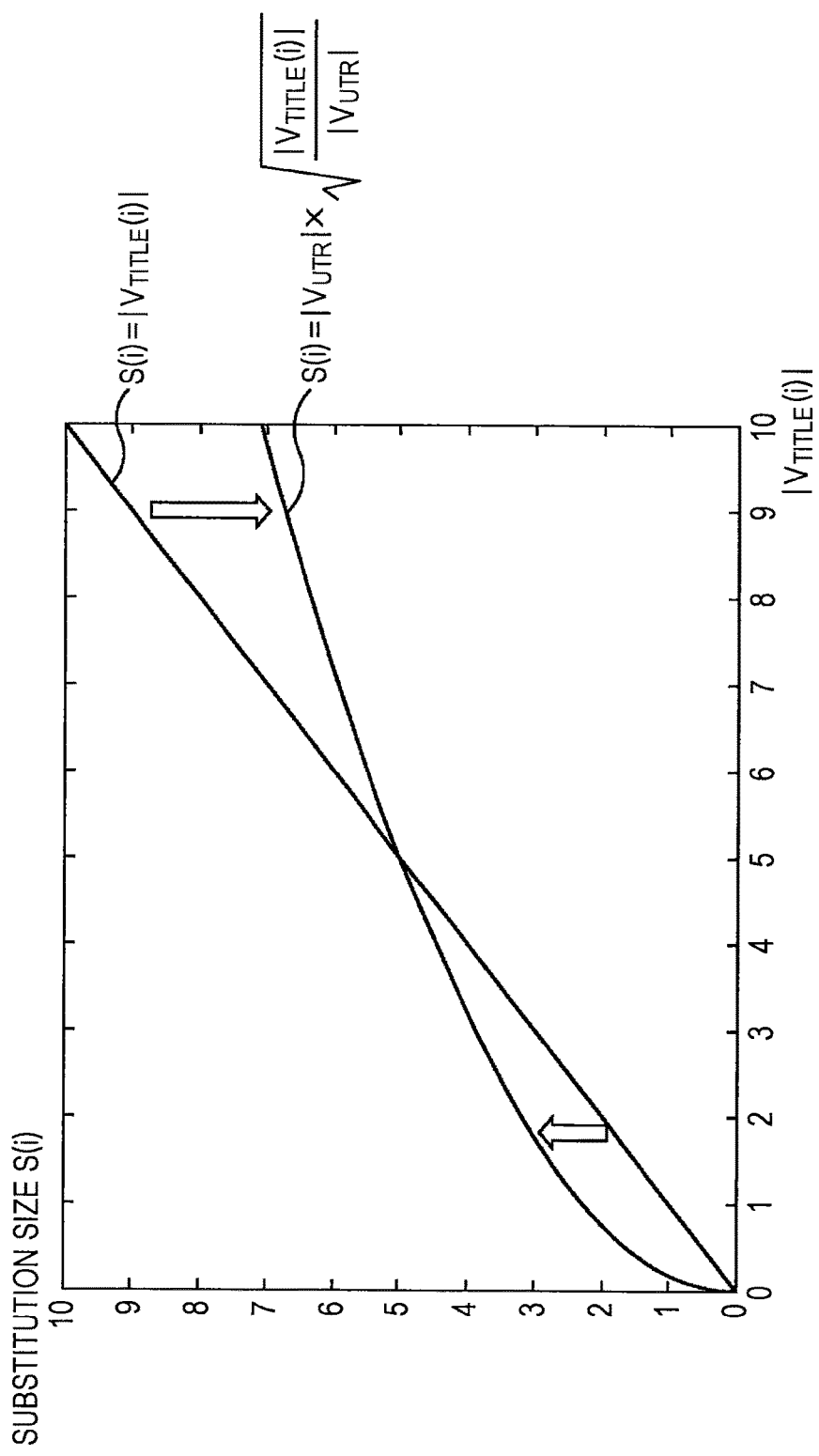
FIG. 24 is a diagram illustrating the relation of the size $|V_{TITLE}(i)|$ of the vector for search results $V_{TITLE}(i)$ and a substitution size S(i).

FIG. 24 is a diagram illustrating the relation between the size $|V_{TITLE}(i)|$ of the vector for search results $V_{TITLE}(i)$ in the case of using the square root $\sqrt{(|V_{TITLE}(i)| \|V_{UTR}|)}$ of a value derived by multiplying the size $|V_{UTR}|$ of the recognition result vector $V_{UTR}$ and the size $|V_{TITLE}(i)|$ of the vector for search results $V_{TITLE}(i)$, as the substitution size S(i), and the substitution size S(i).

Note that in FIG. 24, the size $|V_{UTR}|$ of the recognition result vector $V_{UTR}$ is set at 5.

Also, in FIG. 24, in the case of using the size $|V_{TITLE}(i)|$ of the vector for search results $V_{TITLE}(i)$ as the substitution size S(i), i.e. in the case of using the size $|V_{TITLE}(i)|$ of the vector for search results $V_{TITLE}(i)$ in the computation of the cosine distance D in Expression (1), without change, the relation between the size $|V_{TITLE}(i)|$ of the vector for search results $V_{TITLE}(i)$ and the substitution size S(i) is also illustrated.

In the case that $|V_{TITLE}(i)|$ is small, i.e., in the case that the length of the word string for search results is short, the square root $\sqrt{(|V_{TITLE}(i)| \|V_{UTR}|)}$ of a value derived by multiplying the size $|V_{UTR}|$ of the recognition result vector $V_{UTR}$ and the size $|V_{TITLE}(i)|$ of the vector for search results $V_{TITLE}(i)$ becomes greater than $|V_{TITLE}(i)|$, and in the case that $|V_{TITLE}(i)|$ is greater, i.e., in the case that the length of the word string for search results is long, becomes smaller than $|V_{TITLE}(i)|$.

As a result, the first correction distance D1 found according to Expression (2) becomes a value of which the influence from differences in the size $|V_{TITLE}(i)|$ of the vector for search results $V_{TITLE}(i)$ serving as the length of the word string for search results as to the length of the voice recognition results is small, i.e. the influence from the difference in lengths between the voice recognition results and word string for search results is reduced, as compared to the cosine distance D found according to the Expression (1).

In the computation of Expression (1) to find the cosine distance D, the second correction distance is found by using the size $|V_{UTR}|$ of the recognition result vector $V_{UTR}$ as the substitution size S(i), instead of the size $|V_{TITLE}(i)|$ of the vector for search results $V_{TITLE}(i)$, which is proportional to the length of the word string for search results.

Accordingly, the second correction distance D2 is found according to Expression (3)

$$D2 = V_{UTR} \cdot V_{TITLE}(i) / (|V_{UTR}|S(i)) = V_{UTR} \cdot V_{TITLE}(i) / |V_{UTR}|^2 \qquad (3)$$

The second correction distance D2 is a value without using the size $|V_{TITLE}(i)|$ of the vector for search results $V_{TITLE}$ and thereby becomes a value that is not influenced by the difference in the size $|V_{TITLE}(i)|$ of the vector for search results $V_{TITLE}(i)$ serving as the length of the word strong for search results as to the length of the voice recognition results, i.e., becomes a value of which the influence from differences in the lengths of the voice recognition result and word string for search result is reduced (removed).

Figure 25:
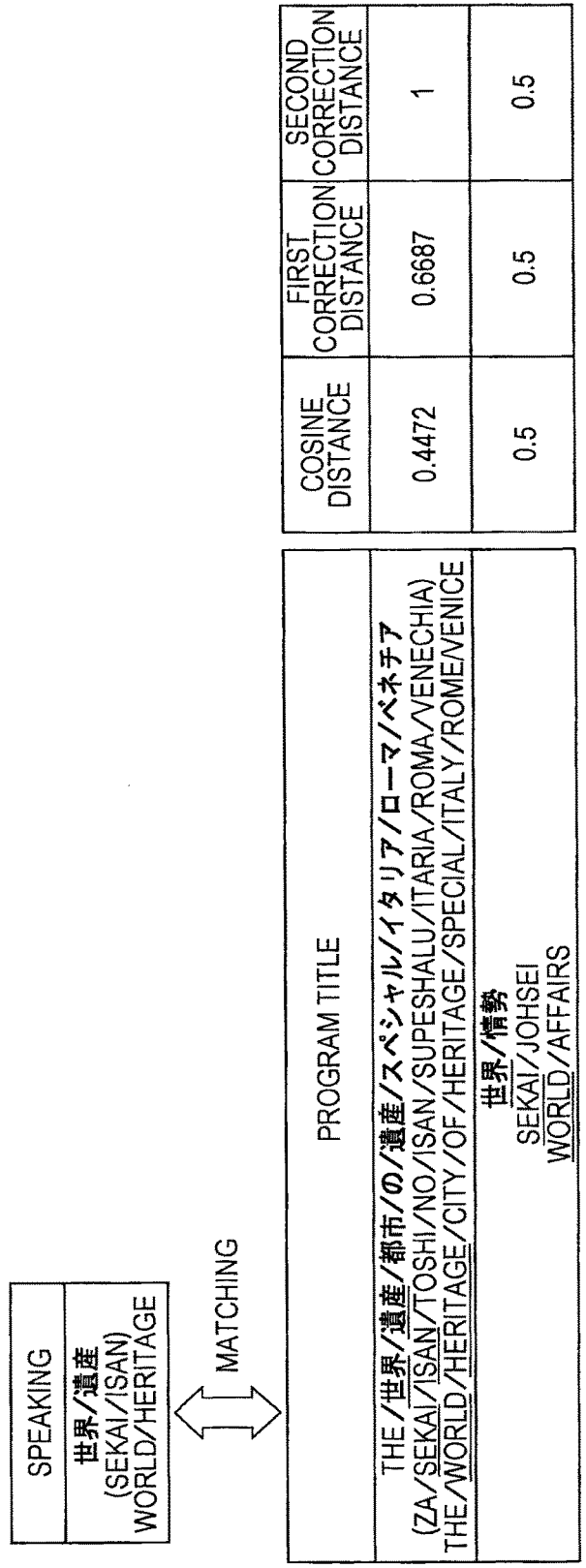
FIG. 25 is a diagram illustrating an example of matching simulation results in the case of employing a cosine distance D, first correction distance D1, and second correction distance D2, as a degree of similarity between the voice recognition results and the word string for search results.

FIG. 25 is a diagram illustrating a first example of the result of a matching simulation in the case of employing the cosine distance D, first correction distance D1, and second correction distance D2 as the degree of similarity between the voice recognition result and word string for search result.

Note that in the simulation in FIG. 25, the correct voice recognition result "sekai isan" ("world heritage" in English) is obtained as to the short Japanese speech "sekai isan", whereupon a long title "za sekai isan toshi no isan supesharu itaria roma venechia" ("The world heritage city, heritage special Italy Rome Venice" in English) and a short title "sekai jousei" ("world affairs" in English) are employed as word strings for search results.

Further, the matching is performed in increments of words using notation symbols.

Also, the words of the program title serving as the word string for search results that matches the words "sekai/isan" of the voice recognition result "sekai isan" are underlined.

With the title "za sekai isan toshi no isan supesharu itaria roma venechia", two words "sekai" and "isan" match the voice recognition result "sekai isan".

On the other hand, with the title "sekai jousei", only one word "sekai" matches the voice recognition result "sekai isan".

Accordingly, with the title "za sekai isan toshi no isan supesharu itaria roma venechia" and the title "sekai jousei", the title "za sekai isan toshi no isan supesharu itaria roma venechia" having a greater number of words that match the voice recognition result "sekai isan" is appropriate to have a higher rank than the similarity of the title "sekai jousei".

However, in the case of employing the cosine distance D as a degree of similarity, as to the voice recognition result "sekai isan" which matches "sekai isan" which is a portion of the long title "za sekai isan toshi no isan supesharu itaria roma venechia", the degree of similarity of the short title "sekai jousei" is 0.5, and the similarity of the long title "za sekai isan toshi no isan supesharu itaria roma venechia", is 0.4472, whereby the similarity of the short title "sekai jousei" ranks higher than the long title "za sekai isan toshi no isan supesharu itaria roma venechia".

That is to say, in the case of employing the cosine distance D as a degree of similarity, from influence of the difference in lengths of the short voice recognition result "sekai isan" that matches a portion "sekai isan" of the long title "za sekai isan toshi no isan supesharu itaria roma venechia"], and the length of the long title thereof "za sekai isan toshi no isan supesharu itaria roma venechia"], the degree of similarity of the long title za sekai isan toshi no isan supesharu itaria roma venechia" that is appropriate as to the voice recognition result "sekai isan" will not be ranked highly.

On the other hand, in the case of employing a correction distance as a similarity, the similarity of the long title "za sekai isan toshi no isan supesharu itaria roma venechia" will be ranked higher than the similarity of the short title "sekai jousei".

That is to say, in the case of employing a first correction distance D1, as to the voice recognition result "sekai isan", the similarity of the short title "sekai jousei" is 0.5, and the similarity of the long title "za sekai isan toshi no isan supesharu itaria roma venechia" is 0.6687, whereby the similarity of the long title "za sekai isan toshi no isan supesharu itaria roma venechia" will be ranked higher than the similarity of the short title "sekai jousei".

Also, in the case of employing a first correction distance D1, as to the voice recognition result "sekai isan", the similarity of the short title "sekai jousei" is 0.5, and the similarity of the long title "za sekai isan toshi no isan supesharu itaria roma venechia" is 1.0, whereby the similarity of the long title "za sekai isan toshi no isan supesharu itaria roma venechia" will be ranked higher than the similarity of the short title "sekai jousei".

As in the above, in the case of employing correction distance, influence from the difference in lengths between the voice recognition result that matches a portion of the long word string for search results and the length of the long word string for search results thereof is reduced, whereby the similarity of the long title "za sekai isan toshi no isan supesharu itaria roma venechia" which is appropriate as to the voice recognition result "sekai isan" is ranked highly.

FIG. 26 is a diagram illustrating a second example of the matching simulation in the case of employing the cosine distance D, first correction distance D1, and second correction distance D2 as the degree of similarity between the voice recognition result and word string for search result.

Note that in the simulation in FIG. 26, as to the long Japanese speech "sekai isan toshi no isan itaria roma venchia napori firenze" ("world heritage city of heritage Italy Rome Venice Naples Florence" in English), the correct voice recognition result "sekai isan toshi no isan itaria roma venchia napori firenze" is obtained, and as the program title serving as the word string for search results, a short title, "sekai isan" ("world heritage" in English)] and a long title, "tanken roman sekai isan itaria firenze rekishi chiku" ("explore romanticism world heritage Italy Florence historical district" in English) are employed.

Further, the matching is performed in increments of words using notation symbols.

Also, in FIG. 26, words in the program title serving as the word string for search results that match the words "sekai/isan/toshi/no/isan/itaria/roma/venchia/napori/firenze" ("world/heritage/city/of/heritage/Italy/Rome/Venice/Naples/Florence" in English) of the voice recognition result "sekai isan toshi no isan itaria roma venchia napori firenze" are underlined.

In the title "sekai isan" ("world heritage" in English), two words "sekai" ("world" in English) and "isan" ("heritage" in English) match the voice recognition result "sekai isan toshi no isan itaria roma venchia napori firenze".

On the other hand, with the title "tanken roman sekai isan itaria firenze rekishi chiku" ("explore romanticism world heritage Italy Florence historical district" in English), four words, "sekai" ("world" in English), "isan" ("heritage" in English), "itaria" ("Italy" in English), and "firenze" ("Florence" in English) match the voice recognition result "sekai isan toshi no isan itaria roma venchia napori firenze".

Accordingly, of the title "sekai isan" and the title "tanken roman sekai isan itaria firenze rekishi chiku", it is appropriate that the degree of similarity of the title "tanken roman sekai isan itaria firenze rekishi chiku" which has a greater number of words that match the voice recognition result "sekai isan toshi no isan itaria roma venchia napori firenze" is higher ranking than the degree of similarity of the title "sekai isan".

However, in the case of employing the cosine distance D as the degree of similarity, with the long voice recognition result "sekai isan toshi no isan itaria roma venchia napori firenze", the degree of similarity of the long title "tanken roman sekai isan itaria firenze rekishi chiku" is 0.4472, and the degree of similarity of the short title "sekai isan" is 0.4772, whereby the degree of similarity of the long title "tanken roman sekai isan itaria firenze rekishi chiku" will not be ranked higher than the degree of similarity of the short title "sekai isan".

That is to say, in the case of employing the cosine distance D as the degree of similarity, because of influence from the difference in length of the long voice recognition result "sekai isan toshi no isan itaria roma venchia napori firenze" and the length of the short word string for search results "sekai isan", the degree of similarity of the long title "tanken roman sekai isan itaria firenze rekishi chiku" which is appropriate to the voice recognition result "sekai isan toshi no isan itaria roma venchia napori firenze" will not be ranked highly.

On the other hand, in the case that correction distance is employed as degree of similarity, the degree of similarity of the long title "tanken roman sekai isan itaria firenze rekishi chiku" is ranked higher than the short title "sekai isan".

That is to say, in the case of employing the first correction distance D1 as the degree of similarity, for the long voice recognition result "sekai isan toshi no isan itaria roma venchia napori firenze", the degree of similarity of the long title "tanken roman sekai isan itaria firenze rekishi chiku" is 0.4229, and the degree of similarity of the short title "sekai isan" is 0.2991, whereby the long title "tanken roman sekai isan itaria firenze rekishi chiku" is ranked higher than the degree of similarity of the short title "sekai isan".

Also, in the case of employing the second correction distance D2 as the degree of similarity, for the long voice recognition result "sekai isan toshi no isan itaria roma venchia napori firenze", the degree of similarity of the long title "tanken roman sekai isan itaria firenze rekishi chiku" is 0.4, and the degree of similarity of the short title "sekai isan" is 0.2, whereby the long title "tanken roman sekai isan itaria firenze rekishi chiku" is ranked higher than the degree of similarity of the short title "sekai isan".

As in the above, in the case of employing correction distance as the degree of similarity, influence from the difference in lengths of the long voice recognition result and the short word string for search results thereof are reduced, and the degree of similarity of the long title "tanken roman sekai isan itaria firenze rekishi chiku" ("explore romanticism world heritage Italy Florence historical district" in English) which is appropriate as to the voice recognition result "sekai isan toshi no isan itaria roma venchia napori firenze" ("world heritage city of heritage Italy Rome Venice Naples Florence" in English), is ranked higher.

FIG. 27 is a diagram illustrating a third example of the matching simulation in the case of employing the cosine distance D, first correction distance D1, and second correction distance D2 as the degree of similarity between the voice recognition result and word string for search result.

Note that in the simulation in FIG. 27, as to the short English speech "World Heritage", the correct voice recognition result "World Heritage" is obtained, and as the program title serving as the word string for search results, a long title, "The World Heritage Special Program on Italian Cities Rome Venice" and a short title, "World Affairs" are employed.

Further, matching is performed in increments of words using notation symbols.

Also, in FIG. 27, words in the program title serving as the word string for search results that match the words "World/Heritage" of the voice recognition result "World Heritage" are underlined.

In the title "The World Heritage Special Program on Italian Cities Rome Venice", two words "World" and "Heritage" match the voice recognition result "World Heritage".

On the other hand, with the title "World Affairs", only one word "World" matches the voice recognition result "World Heritage".

Accordingly, of the title "The World Heritage Special Program on Italian Cities Rome Venice" and the title "World Affairs", it is appropriate that the degree of similarity of the title "The World Heritage Special Program on Italian Cities Rome Venice" which has a greater number of words that match the voice recognition result "World Heritage" is higher ranking than the degree of similarity of the title "World Affairs".

However, in the case of employing the cosine distance D as the degree of similarity, the voice recognition result "World Heritage" that matches a portion "World Heritage" of the long title "The World Heritage Special Program on Italian Cities Rome Venice", the degree of similarity of the short title "World Affairs" is 0.5, the degree of similarity of the long title "The World Heritage Special Program on Italian Cities Rome Venice" is 0.4472, whereby the degree of similarity of the short title "World Affairs" becomes higher ranking than the degree of similarity of the long title "The World Heritage Special Program on Italian Cities Rome Venice".

That is to say, in the case of employing the cosine distance D as the degree of similarity, because of influence from the difference in length of the short voice recognition result "World Heritage" that matching a portion "World Heritage" of the long title "The World Heritage Special Program on Italian Cities Rome Venice", and the length of the title "The World Heritage Special Program on Italian Cities Rome Venice", the degree of similarity of the long title "The World Heritage Special Program on Italian Cities Rome Venice" which is appropriate to the voice recognition result "World Heritage" will not be ranked highly.

On the other hand, in the case that correction distance is employed as degree of similarity, the degree of similarity of the long title "The World Heritage Special Program on Italian Cities Rome Venice" is ranked higher than the short title "World Affairs".

That is to say, in the case of employing the first correction distance D1 as the degree of similarity, for the voice recognition result "World Heritage", the degree of similarity of the short title "World Affairs" is 0.5, and the degree of similarity of the long title "The World Heritage Special Program on Italian Cities Rome Venice" is 0.6687, whereby the long title "The World Heritage Special Program on Italian Cities Rome Venice" is ranked higher than the degree of similarity of the short title "World Affairs".

Also, in the case of employing the second correction distance D2 as the degree of similarity, for the voice recognition result "World Heritage", the degree of similarity of the short title "World Affairs" is 0.5, and the degree of similarity of the long title "The World Heritage Special Program on Italian Cities Rome Venice" is 1.0, whereby the long title "The World Heritage Special Program on Italian Cities Rome Venice" is ranked higher than the degree of similarity of the short title "World Affairs".

As in the above, in the case of employing correction distance as the degree of similarity, influence from the difference in lengths of the voice recognition result which matches a portion of the long word string for search results and the length of the long word string for search results thereof are reduced, and the degree of similarity of the long title "The World Heritage Special Program on Italian Cities Rome Venice" which is appropriate as to the voice recognition result "World Heritage" is ranked higher.

Figure 28:
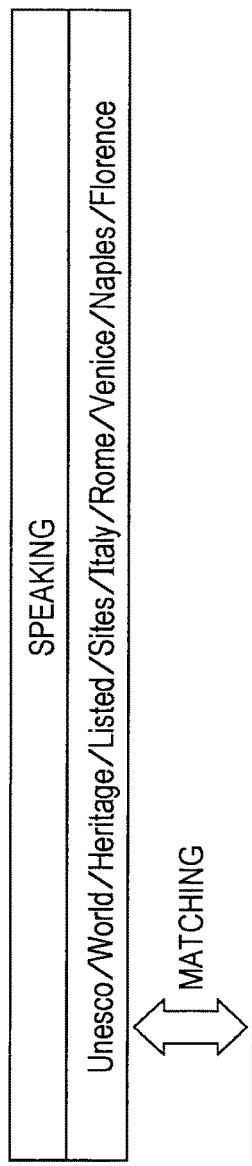
FIG. 28 is a diagram illustrating an example of matching simulation results in the case of employing a cosine distance D, first correction distance D1, and second correction distance D2, as a degree of similarity between the voice recognition results and the word string for search results.

FIG. 28 is a diagram illustrating a fourth example of the matching simulation in the case of employing the cosine distance D, first correction distance D1, and second correction distance D2 as the degree of similarity between the voice recognition result and word string for search result.

Note that in the simulation in FIG. 28, as to the long English speech "Unesco World Heritage Sites Italy Rome Venice Naples Florence", the correct voice recognition result "Unesco World Heritage Sites Italy Rome Venice Naples Florence" is obtained, and as the program title serving as the word string for search results, a short title, "World Heritage" and a long title, "World Heritage Sites in Italy, Florence, Historic District" are employed.

Further, matching is performed in increments of words using notation symbols.

Also, in FIG. 28, words in the program title serving as the word string for search results that match the words "Unesco/World/Heritage/Listed/Sites/Italy/Rome/Venice/Naples/Florence" of the voice recognition result "Unesco World Heritage Sites Italy Rome Venice Naples Florence" are underlined.

In the title "World Heritage", two words "World" and "Heritage" match the voice recognition result "Unesco World Heritage Listed Sites Italy Rome Venice Naples Florence".

On the other hand, with the title "World Heritage Sites in Italy, Florence, Historic District", four words "World", "Heritage", "Italy", and "Florence" match the voice recognition result "Unesco World Heritage Listed Sites Italy Rome Venice Naples Florence".

Accordingly, of the title "World Heritage" and the tile "World Heritage Sites in Italy, Florence, Historic District", it is appropriate that the degree of similarity of the title "World Heritage Sites in Italy, Florence, Historic District", which has a greater number of words that match the voice recognition result "Unesco World Heritage Listed Sites Italy Rome Venice Naples Florence", is higher ranking than the degree of similarity of the title "World Heritage".

However, in the case of employing the cosine distance D as the degree of similarity, the degree of similarity of the long title "World Heritage Sites in Italy, Florence, Historic District" to the long voice recognition result "Unesco World Heritage Listed Sites Italy Rome Venice Naples Florence" is 0.4472, and the degree of similarity of the short title "World Heritage" is 0.4772, whereby the degree of similarity of the long title "World Heritage Sites in Italy, Florence, Historic District" will not be ranked higher than the short title "World Heritage".

That is to say, in the case of employing the cosine distance D as the degree of similarity, because of influence from the difference in lengths of the long voice recognition result "World Heritage Listed Sites Italy Rome Venice Naples Florence" and the short word string for search results "World Heritage", the degree of similarity of the long title "World Heritage Sites in Italy, Florence, Historic District" which is appropriate as to the voice recognition result "Unesco World Heritage Listed Sites Italy Rome Venice Naples Florence" will not be ranked highly.

On the other hand, in the case of employing correction distance as the degree of similarity, the degree of similarity of the long title "World Heritage Sites in Italy, Florence, Historic District" will be ranked higher than the degree of similarity of the short title "World Heritage".

That is to say, in the case of employing the first correction distance D1 as the degree of similarity, for the long voice recognition result "Unesco World Heritage Listed Sites Italy Rome Venice Naples Florence", the degree of similarity of the long title "World Heritage Sites in Italy, Florence, Historic District" is 0.4229, and the degree of similarity of the short title "World Heritage" is 0.2991, whereby the degree of similarity of the long title "World Heritage Sites in Italy, Florence, Historic District" is ranked higher than the short title "World Heritage".

Also, in the case of employing the second correction distance D2 as the degree of similarity, for the long voice recognition result "Unesco World Heritage Listed Sites Italy Rome Venice Naples Florence", the degree of similarity of the long title "World Heritage Sites in Italy, Florence, Historic District" is 0.4, and the degree of similarity of the short title "World Heritage" is 0.2, whereby the degree of similarity of the long title "World Heritage Sites in Italy, Florence, Historic District" is ranked higher than the short title "World Heritage".

As in the above, in the case of employing a correction distance, the influence from the difference in lengths between the long voice recognition result and short word string for search results is reduced, and the degree of similarity of the long title "World Heritage Sites in Italy, Florence, Historic District" which is appropriate as to the voice recognition result "Unesco World Heritage Listed Sites Italy Rome Venice Naples Florence" is ranked high.

Accordingly, according to correction distance, the influence from the difference in lengths of the voice recognition result and the word string for search results is reduced, whereby searching for a word string corresponding to the input voice can be performed in a robust manner, and deterioration of accuracy in searching for the word string corresponding to the input voice can be prevented.

[Configuration of Voice Recognition Unit 51]

Figure 29:
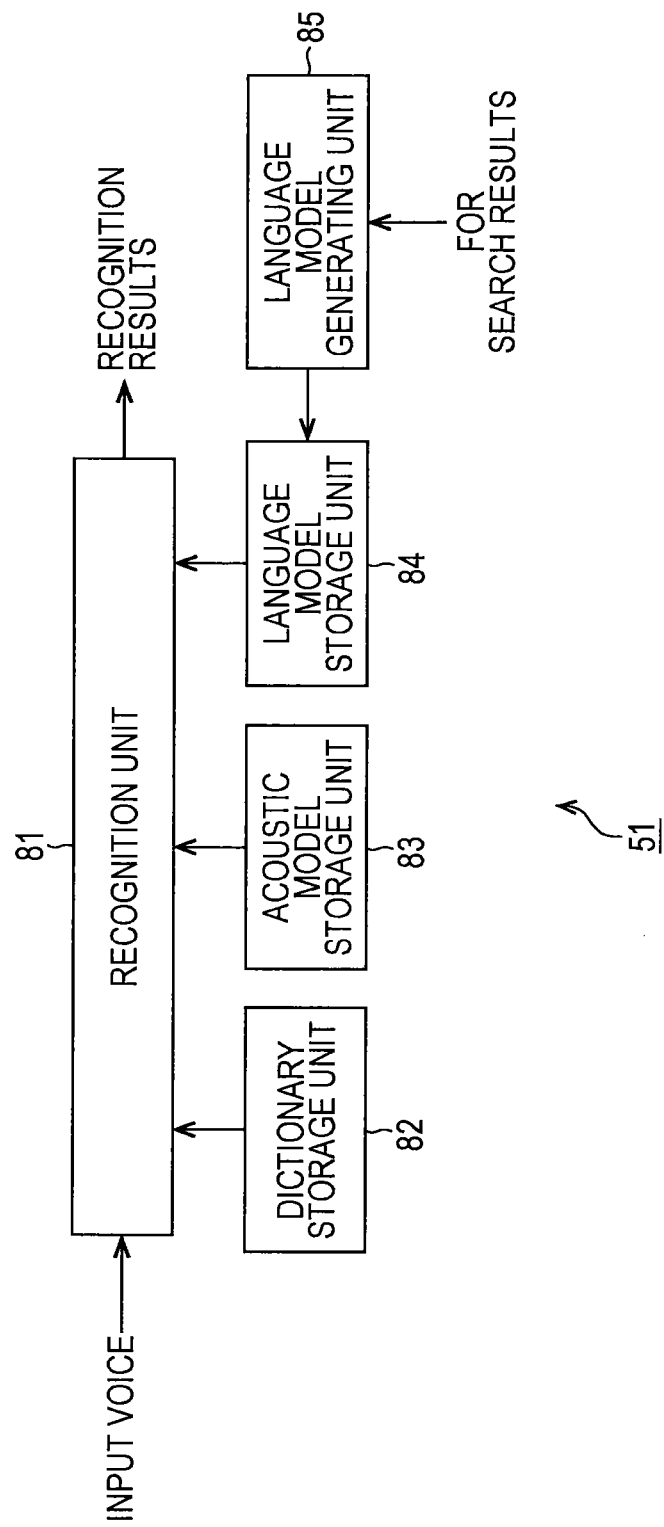
FIG. 29 is a block diagram illustrating a configuration example of a voice recognition unit 51.

FIG. 29 is a block diagram illustrating a configuration example of the voice recognition unit 51 in FIG. 9 and FIG. 10.

In FIG. 29, the voice recognition unit 51 has a recognition unit 81, dictionary storage unit 82, acoustic model storage unit 83, language model storage unit 84, and language model generating unit 85.

The input voice is supplied to the recognition unit 81.

The recognition unit 81 performs voice recognition of an input voice supplied thereto based on an HMM method or the like, for example, while referencing the dictionary storage unit 82, acoustic model storage unit 83, and language model storage unit 84, as needed.

That is to say, the dictionary storage unit 82 stores a word dictionary for each word (vocabulary) that will be for the result of voice recognition, wherein information relating to the pronunciation thereof (phoneme information) and so forth is described.

The acoustic model storage unit 83 stores the acoustic model that shows acoustic features of the individual phonemes and syllables in the words of the voice for which voice recognition is performed. Here, voice recognition is performed based on the HMM method, whereby the HMM method is used as an acoustic model, for example, and the voice recognition results of the input voice are output.

The language model storage unit 84 stores a language model which is grammar rules describing how each word registered in the word dictionary of the dictionary storage unit 82 links (connects). Now, as a language model, for example, grammar rules such as context-free grammar (CFG) or a statistical word concatenation probability (N-gram) can be used.

The recognition unit 81 configures a word acoustic model (word model) by referencing the word dictionary in the dictionary storage unit 82 to connect the acoustic model stored in the acoustic model storage unit 83.

Further, the recognition unit 81 connects several word models by referencing the language model stored in the language model storage unit 84, and recognizes the input voice with the HMM model using the word models thus connected.

That is to say, the recognition unit 81 detects a series of word models wherein the likelihood of the feature amount (e.g., cepstrum or the like) of the input voice supplied thereto is highest, and outputs the word string corresponding to the word model series thereof as voice recognition results.

Specifically, the recognition unit 81 accumulates the appearance probability of the input voice feature amount for the word string corresponding to the connected word model, and with the cumulative value thereof as a recognition score with is the likelihood of the input voice feature amount being measured, outputs the word string having the highest recognition score as the voice recognition result.

The recognition score is found by summarily evaluating the acoustic likelihood provided by the acoustic model stored in the acoustic model storage unit 83 (hereafter, also called acoustic score) and the linguistic frequency provided by the language model stored in the language model storage unit 84 (hereafter, also called language score).

That is to say, for an acoustic score, for example, in the case of using the HMM method, the probability of the input voice feature amount being measured from the acoustic model making up the word model is calculated for each word. Also, for a language score, for example, in the case of using a bi-gram, the probability of the focus word and the word immediately prior to the word thereof is concatenated (conjunctive) is found.

Also, a recognition score is found by summarily evaluating the acoustic score and language score for each word, and the voice recognition result is confirmed based on the recognition score thereof.

Now, when the k'th word in a word string made up of K words is expressed as $w_k$, the acoustic score of the word $w_k$ thereof as $A(w_k)$, and the language score as $L(w_k)$, respectively, the recognition score S of the word string thereof is calculated according to Expression (4), for example.

$$S = \Sigma(A(w_k) + C_k \times L(w_k)) \qquad (4)$$

In Expression (4), $\Sigma$ expresses a summation being taken where k is changed from 1 to K. Also, $C_k$ indicates the weighting of the word $w_k$ placed on the language score $L(w_k)$.

With the recognition unit 81, word string $w_1, w_2, \ldots, w_k$ within the top M places (M is an integer that is 1 or greater) are found, and the recognition score shown in Expression (4), for example, having the word string $w_1, w_2, \ldots, w_k$ is output as the voice recognition result.

Now, if the probability of the input voice X being word string W (with conditions) is expressed as P(W|X), the probability P(W|X) is expressed with the Expression P(W|X)=P(W)P(X|W)/P(X), using the probability of input voice X being emitted P(X), the probability of the word string W being emitted P(W), and the probability of the input voice X being measured when the word string W is spoken (P(X|W), according to Bayes' theorem.

In the Expression P(W|X)=P(W)P(X|W)/P(X), the probability P(W|X) indicates the recognition score, the probability P(W) the language score, and (P(X|W) the acoustic score.

Note that if T words are registered in the word dictionary in the dictionary storage unit 82, $T_T$ ways exist that T word arrays can be configured using the T words thereof. Accordingly, to put it simply, with the recognition unit 81, the TT ways of word strings are evaluated (recognition scores are calculated), and from these that which is most applicable to the input voice (the recognition score is ranked within the top M places) has to be determined.

Then, if the number of words T registered in the word dictionary increases, the number of arrays worth the number of words thereof becomes the number of words times the number of words, whereby the word strings that have to be evaluated become an enormous number.

Further, in general, the number of words included in the input voice is unknown, whereby not only the word string made up of an array of T words, but word strings made up of one word, two words, . . . , T–1 words also have to be evaluated. Accordingly, the number of word strings to be evaluated is even more enormous, whereby, in order to quickly perform voice recognition, it is necessary to effectively determine that which is likely to be accurate as the voice recognition result of such enormous word strings.

Thus, with the recognition unit 81, for example, in the process of finding an acoustic score for the word string serving as a certain recognition hypothesis, in the case that the acoustic score obtained during the process is a predetermined threshold or below, acoustic pruning which terminates the calculation of the recognition score of the recognition hypothesis thereof, or linguistic pruning which narrows down the recognition hypothesis to be subjected to recognition score calculation based on the language score, is performed.

Now, with the recorder in FIG. 9 and FIG. 10, as described above, in the case that the user searches for and plays a desired program from among recorded programs according to the input voice spoken by the user, or in the case that the user searches for and reserves a recording of a desired program from the EPG, it is presumed that the user will speak program metadata (also configuration elements of the EPG) such as program title, entertainer name, descriptions included in detailed information, and so forth.

Also, coined terms, names of entertainers (stage names, etc.), and unique expressions are often used in program metadata, i.e., for example program titles, and accordingly, words strings that are not word strings generally used in articles written in the newspaper are not often included.

If the voice recognition of the speech of such a program title is performed using a general-use language model generated using the word strings written in newspapers, a high value is not obtained on a language score of the recognition hypothesis matching the program title.

Consequently, the recognition hypothesis matching the program title is not obtained as the voice recognition results, and the accuracy of the voice recognition deteriorates.

Now, the voice recognition unit 51 in FIG. 29 has a language model generating unit 85.

The language model generating unit 85 generates a language model, using the word string for search results stored in the storage unit for search results 53 of the voice searching device 50 in FIG. 9 and FIG. 10.

Now, as described above, the program title, entertainer names, detailed information, which are configuration elements configuring the EPG recorded on the recording medium 63 and the program title, entertainer names, detailed information and so forth which are metadata of the recorded program recorded on the recording medium 63 are stored as word string for search results in the storage unit for search results 53.

FIG. 30 is a diagram illustrating an example of metadata of a program serving as word strings for search results stored in the storage unit for search results 53.

Program titles, entertainer names, and detailed information and the like can be given as program metadata.

With the language model generating unit 85, the program title, entertainer names, and detailed information and the like serving as word strings for search results, (a portion of) which are presumed to be spoken by the user as input voice, are used to generate a language model dedicated to the search for the program, so to speak.

Note that in the case that the word string for search results is a word string such as a program title, entertainer name, detailed information or the like, which are configuration elements making of the EPG (metadata of the program), the word string for search results can be said to be divided into fields such as program title, entertainer name, and detailed information or the like, but in generating a dedicated language model using the word string for search results divided into such fields, one dedicated language model can be generated without distinguishing to which field the word string for search results belongs, or a language model for each field can be generated using the word strings for search results of each field, and the language models for each field thereof can be interpolated to generate one dedicated language model.

The dedicated language model generated with the language model generating unit 85 is supplied to the language model storage unit 84 and stored.

Accordingly, with the recognition unit 81, the language score is to be found using such a dedicated language model, so compared to a case of using a general-use language model, the accuracy of the voice recognition can be improved.

Note that in FIG. 29, the language model generating unit 85 is provided on the interior of the voice recognition unit 51, but the language model generating unit 85 can be provided on the exterior of the voice recognition unit 51.

Also, separate from the language model generated by the language model generating unit 85, a general-use language model can be stored in the language model storage unit 84.

Figure 31:
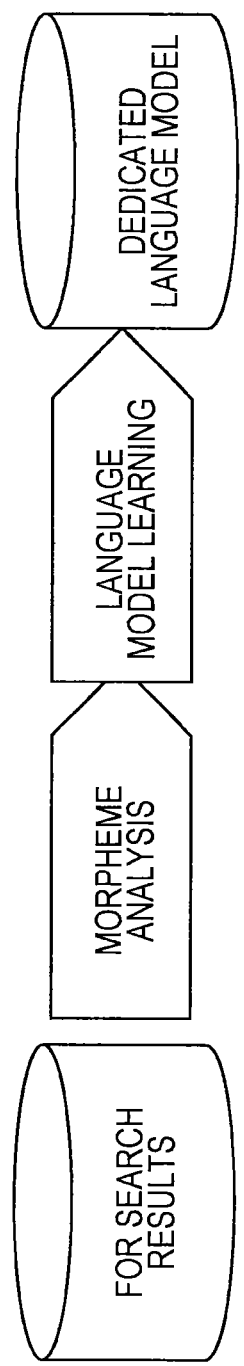
FIG. 31 is a diagram describing processing of generating a language model with a language model generating unit 85.

FIG. 31 is a diagram describing processing to generate the language model with the language model generating unit 85 in FIG. 29.

The language model generating unit 85 subjects each word string for search results stored in the storage unit for search results 53 (FIG. 9) to morpheme analysis. Further, the language model generating unit 85 uses the morpheme analyzing results of the word string for search results to learn a language model such as a bi-gram or the like expressing the probability that word B will follow after word A, for example, and supplies this to, and stores in, the language model storage unit 84 as a dedicated language model.

Note that in the language model generating unit 85, in the case of generating a dedicated language model, using the configuration elements of the EPG as the word string for search results, for example, the EPG of a predetermined period that the broadcast thereafter is planned, such as a predetermined day of week or the latest week or the like, can be used to generate the dedicated language model.

With the recorder in FIG. 9, in the case of searching a program desired by the user from the EPG to reserve a recording according to the input voice spoken by the user, when the user knows that a program broadcast on a certain day of week is one of interest, a dedicated language model can be generated using the EPG of the predetermined day of week, thereby improving accuracy of the voice recognition for the programs broadcast on a predetermined day of week, and therefore, the programs broadcast on the predetermined day of week thereof can be more readily output as the word string for search results.

Also, with the recorder in FIG. 9, in the case of searching a program desired by the user from the EPG to reserve a recording according to the input voice spoken by the user, using an EPG of the latest week, a dedicated language model can be generated, thereby improving accuracy of the voice recognition for the programs broadcast during the latest week, and therefore, the programs broadcast during the latest week thereof can be more readily output as the word string for search results.

Further, with the language model generating unit 85, in the case of using the configuration elements of the EPG as word strings for search results to generate a dedicated language model, a dedicated language model can be generated so that a higher language score is given for the latest EPG, i.e. for the greater array of words in the word string for search results which are the configuration elements of the EPG of a program having the closest broadcast time.

In this case, the accuracy of voice recognition for the program having the closest broadcast time can be improved, and therefore the program having the closest broadcast time can be more readily output as the word string for search results.

Now, in the case that the word string for search results is divided into multiple fields as described above, one dedicated language model is generated from the word string for search results thereof, and when voice recognition using the one dedicated language model thereof is performed, the language score of the recognition hypothesis arraying one part each of the word string for search result of the different fields can become higher.

That is to say, for example, as described above, when voice recognition is performed using the one dedicated language model generated using the word string for search result that is divided into fields of program title, entertainer name, and detailed information, for example, when a word string wherein a portion of the title of a certain program A and a portion of an entertainer name of an entertainer in another program B are arrayed becomes a recognition hypothesis, the language score of the recognition hypothesis thereof can become higher.

However, a word string wherein a portion of the title of program A and a portion of an entertainer name in program B does not exist in the configuration elements of the EPG which is the word string for search results, whereby it is not favorable for such a word string to becomes a recognition hypothesis with a high language score that can be become the voice recognition result.

Also, for example, as described above, in the case of performing matching with the matching unit 56 (FIG. 9), using the word string for search results that is divided into the fields of program title, entertainer name, and detailed information without distinguishing in particular, even when the user speaks the program title, for example, matching is performed not only for the word string for search results of the program title field, but for the word strings for search results for all the fields and the voice recognition result of the user speed, whereby the word string for search results that match the voice recognition result is output as the word string for search results.

Accordingly, in this case, a program unrelated to the program of which the user has spoken the title, i.e., for example, a program, which has a title not similar to the program title spoken by the user but is a program that includes a word string similar to (including the case of matching) a word string included in the program title spoken by the user which is included in the entertainer name or detailed information as a word string for search results, may be output as the search result word string.

As in the above, for a program unrelated to the program of which the user has spoken the title to be output as the search result word string can give the user who is trying to search for and select a program to perform recording reservations from among the programs serving as the search result word strings thereof, a sense of uneasiness.

Now, with the matching unit 56 (FIG. 9), in the case that the word string for search result is divided into multiple fields, the matching with the voice recognition result can be arranged to be performed only for the word string for search results of a predetermined field such as a field that the user desires.

However, in the case of performing matching with the voice recognition result only for the word string for search results of a predetermined field, with the voice recognition using the dedicated language model in FIG. 31, for example, as described above, a word string wherein a portion of the title of a certain program A and a portion of the entertainer name of an entertainer in another program B is arrayed becomes the recognition hypothesis, and the language score of the recognition hypothesis thereof becomes high, and therefore the recognition hypothesis thereof can become the voice recognition results.

Also, even if matching with such voice recognition results is performed for only the word string for search results for a predetermined field, it cannot be said that the probability that the program that the user desires for recording reservations will be searched.

Thus, with the voice recognition unit 51 in FIG. 29, the language model generating unit 85 uses the word string for search results for each field, for the field thereof, and can generate a language model, and the recognition unit 81 can perform voice recognition using the language model of the field thereof to find voice recognition results for each field.

Further, in this case, with the matching unit 56 (FIG. 9), matching of the voice recognition results and the word string for search results can be performed for each field, and can be performed without distinguishing the fields.

Figure 32:
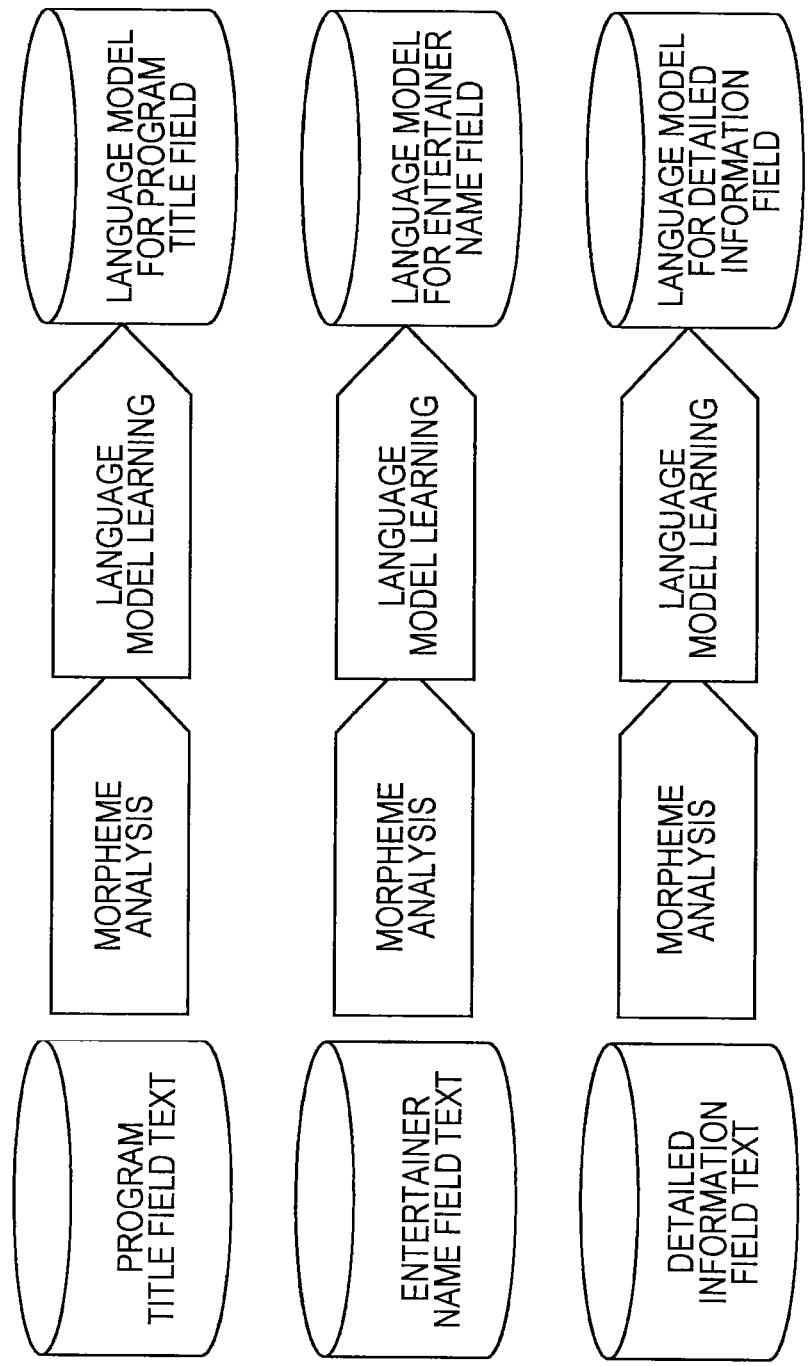
FIG. 32 is a diagram describing processing of generating a language model for each field with the language model generating unit 85.

FIG. 32 is a diagram describing processing to generate a language model for each filed with the language model generating unit 85 in FIG. 29.

Now, if the word string for search results stored in the storage unit for search results 53 (FIG. 9) is divided into fields of program title, entertainer names, and detailed information, respectively, the language model generating unit 85 subjects the word strings for search results of the field of the program title (hereafter also called program title field) stored in the storage unit for search results 53 to morpheme analysis.

Further, the language model generating unit 85 uses the morpheme analysis results of the word string for search results of the program title field to generate a language model for the program title field, by learning the language model such as a bi-gram, for example, and supplies this to, and stores in, the language model storage unit 84.

Also, the language model generating unit 85 subjects the word string for search results of the field of the entertainer name (hereafter, also called entertainer name field) stored in the storage unit for search results 53 to morpheme analysis.

Further, the language model generating unit 85 uses the morpheme analysis results of the word string for search results of the entertainer name field to generate a language model for the entertainer name field, by learning the language model such as a bi-gram, for example, and supplies this to, and stores in, the language model storage unit 84.

Similarly, the language model generating unit 85 uses the word string for search results of the field of the detailed information (hereafter, also called detailed information field) stored in the storage unit for search results 53 to morpheme analysis, generates a language model for the detailed information field, and supplies this to, and stores in, the language model storage unit 84.

Figure 33:
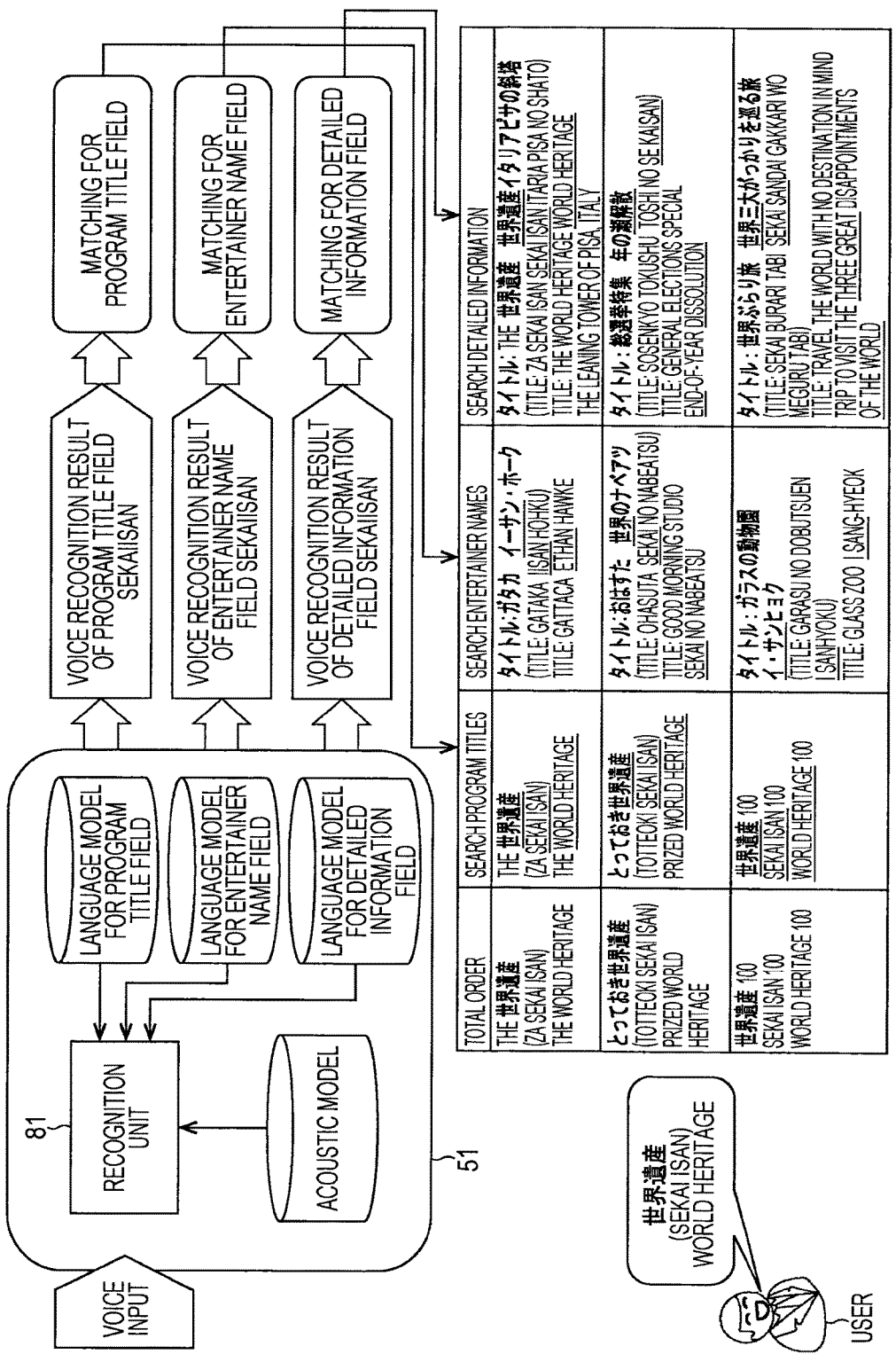
FIG. 33 is a diagram describing processing of the voice searching device 50 in the case of performing voice recognition using a language model for each field, finding the voice recognition results for each field, and performing matching between the voice recognition results and the word string for search results for each field.

FIG. 33 is a diagram describing processing of the voice searching device 50 in FIG. 9 (and FIG. 10) in the case of performing voice recognition using the language model for each field to find voice recognition results for each field, and performing matching between the voice recognition results and word strings for search results for each field.

The recognition unit 81 performs voice recognition of the input voice, independently, using each of the language model for the program title field, language model for the entertainer name field, and language model for the detailed information field.

The recognition unit 81 finds a recognition hypothesis wherein, of the voice recognition using the language model for the program title field, the recognition score is the highest rank or more, and causes this to be the voice recognition result of the program title field.

Further, the recognition unit 81 finds a recognition hypothesis wherein, of the voice recognition using the language model for the entertainer name field, the recognition score is the highest rank or more, and causes this to be the voice recognition result of the entertainer name field.

Similarly, the recognition unit 81 finds a recognition hypothesis wherein, of the voice recognition using the language model for the detailed information field, the recognition score is the highest rank or more, and causes this to be the voice recognition result of the detailed information field.

The matching unit 56 (FIG. 9) then performs matching with the voice recognition result of the program title field for only the word string for search results of the program title field of the word strings for search results stored in the storage unit for search results 53 (FIG. 9).

Further, the matching unit 56 then performs matching with the voice recognition result of the entertainer name field for only the word string for search results of the entertainer name field of the word strings for search results stored in the storage unit for search results 53.

Similarly, the matching unit 56 then performs matching with the voice recognition result of the detailed information field for only the word string for search results of the detailed information field of the word strings for search results stored in the storage unit for search results 53.

The output unit 57 (FIG. 9) then outputs the word string for search results wherein the degree of similarity (e.g., cosine distance or correction distance or the like) with the voice recognition result is within the top N places, for each field, based on matching results, as the word string for search results.

In FIG. 33, as to the input voice "sekai isan" ("world heritage" in English), "sekai isan" (in Japanese) is to be found as the voice recognition results for each of the program title field, entertainer name field, and detailed information field.

Also, the matching between the voice recognition result and word string for search results is performed for each field, and the word string for search results wherein the degree of similarity is within three of the top places is output as the search result word string for each of the program title field, entertainer name field, and detailed information field.

Note that in FIG. 33, the portions where the pronunciation symbol of the word string for search results, serving as the search result word string, matches the voice recognition results are underlined.

With the output unit 57 (FIG. 9), the word strings for search results are ordered according to the degree of similarity with the voice recognition results, for each field, and outputs the word strings for search results within the top N places as the search result word strings, while performing ordering that is total ordering, so to speak, wherein the word strings for search results are ordered regardless of field (covering all of the fields), and the word strings for search results that have a total order that is within the top N places can be output as the search result word strings.

Figure 34:
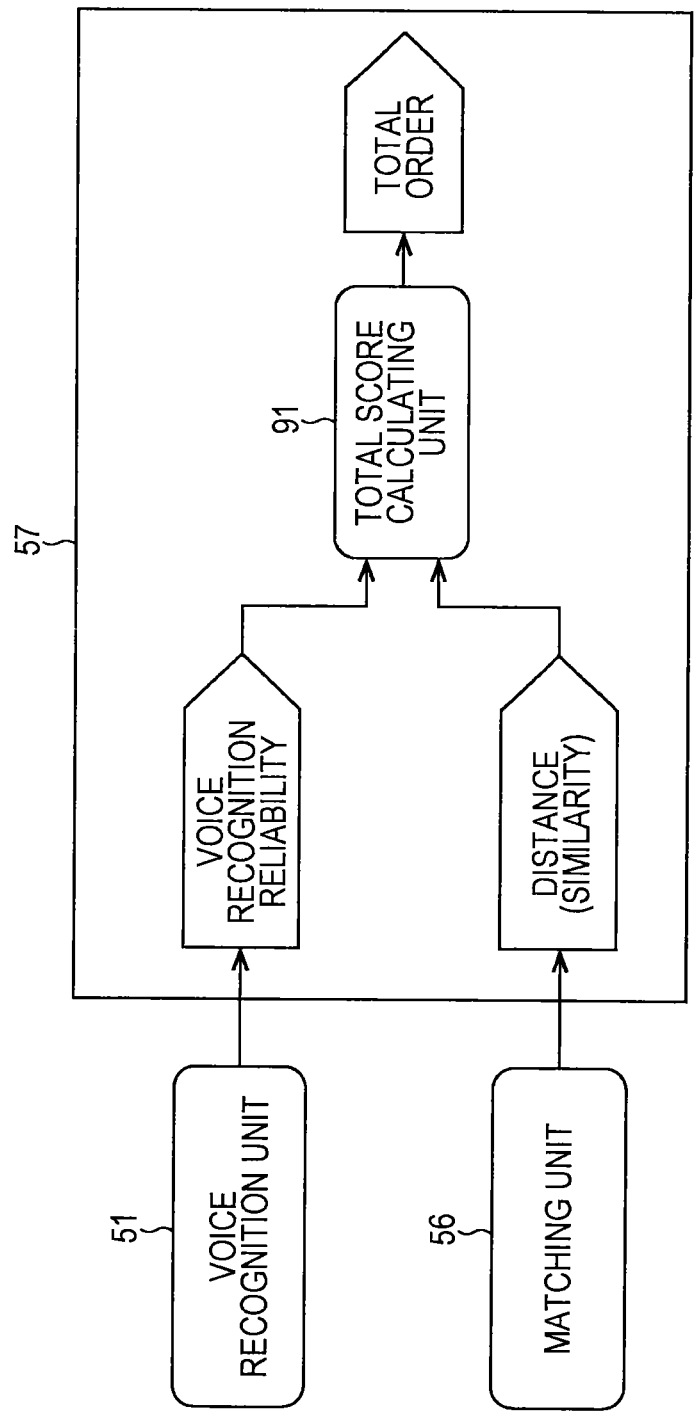
FIG. 34 is a block diagram illustrating a configuration example of a portion of an output unit 57 that finds the total order.

FIG. 34 is a block diagram illustrating a configuration example of a portion of the output unit 57 that finds the total order.

In FIG. 34, the output unit 57 has a total score calculating unit 91.

A voice recognition reliability that expresses the reliability of the voice recognition results for each field, which is found with the voice recognition unit 51, is supplied to the total score calculating unit 91.

Now, as voice recognition reliability, for example a recognition score can be employed.

Also, the degree of similarity of the word strings for search results for each field, which are found with the matching unit 56, are supplied to the total score calculating unit 91.

The total score calculating unit 91 evaluates the voice recognition reliability of the voice recognition results and the similarity of the word string for search results, summarily, and finds a total score that expresses the degree to which the word string for search results matches the word string corresponding to the input voice.

That is to say, if a certain word string for search results is set as a focus word string, and the focus word string thereof is focused upon, the total score calculating unit 91 normalizes each of the voice recognition reliability of the voice recognition results and the similarity between the voice recognition results thereof and focus word string, as needed, for example to a value within a range of 0.0 through 1.0.

Further, the total score calculating unit 91 finds the voice recognition reliability of the voice recognition results, and a weighted average and geometric mean and so forth of the similarity between the voice recognition results thereof and focus word string, as a total score of the focus word string.

Also, the total score calculating unit 91 orders the word strings for search results in the order of highest total scores.

Figure 35:
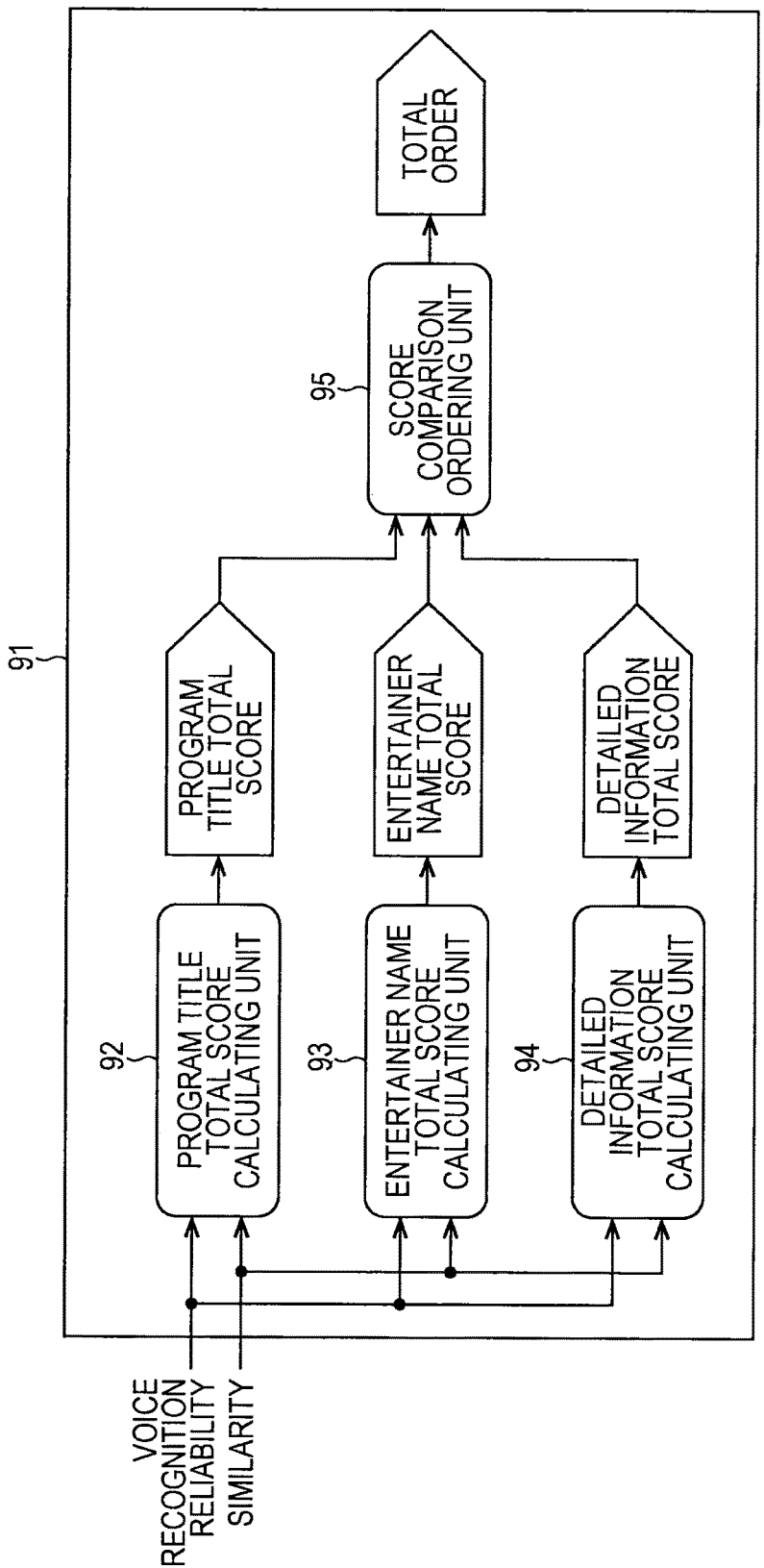
FIG. 35 is a block diagram illustrating a configuration example of a total score calculating unit 91.

FIG. 35 is a block diagram illustrating a configuration example of the total score calculating unit 91 in FIG. 34.

In FIG. 35, the total score calculating unit 91 has a program title total score calculating unit 92, entertainer name total score calculating unit 93, detailed information total score calculating unit 94, and score comparison ordering unit 95.

The voice recognition reliability of the voice recognition results of the program title field found with the voice recognition unit 51, and the similarity between the voice recognition results of the program title field and the word string for search results of the program title field found with the matching unit 56, are supplied to the program title total score calculating unit 92.

The program title total score calculating unit 92 uses the voice recognition reliability of the voice recognition results of the program title field and the similarity between the voice recognition results and focus word string, having the word strings for search results of the program title field, in order, as the focus word strings, to find a total score for the focus word strings, and supplies this to the score comparison ordering unit 95.

The voice recognition reliability of the voice recognition results of the entertainer name field found with the voice recognition unit 51, and the similarity between the voice recognition results of the entertainer name field and the word string for search results of the entertainer name field found with the matching unit 56, are supplied to the entertainer name total score calculating unit 93.

The entertainer name total score calculating unit 93 uses the voice recognition reliability of the voice recognition results of the entertainer name field and the similarity between the voice recognition results and focus word string, having the word strings for search results of the entertainer name field, in order, as the focus word strings, to find a total score for the focus word strings, and supplies this to the score comparison ordering unit 95.

The voice recognition reliability of the voice recognition results of the detailed information field found with the voice recognition unit 51, and the similarity between the voice recognition results of the detailed information field and the word string for search results of the detailed information field found with the matching unit 56, are supplied to the detailed information total score calculating unit 94.

The detailed information total score calculating unit 94 uses the voice recognition reliability of the voice recognition results of the detailed information field and the similarity between the voice recognition results and focus word string, having the word strings for search results of the detailed information field, in order, as the focus word strings, to find a total score for the focus word strings, and supplies this to the score comparison ordering unit 95.

The score comparison ordering unit 95 compares the total scores from each of the program title total score calculating unit 92, entertainer name total score calculating unit 93, and detailed information total score calculating unit 94, arranges these in ascending order, and places a total order on the word string for search results in the highest order of the total scores.

Also, the output unit 57 outputs the word string for search results having a total order of within the top N places as the word string for search results.

In FIG. 33, with the recognition unit 81, voice recognition is performed using the language model for each field and finds the voice recognition results for each field, but with the recognition unit 81, a total voice recognition result, so to speak, that covers all of the fields, can be found.

Figure 36:
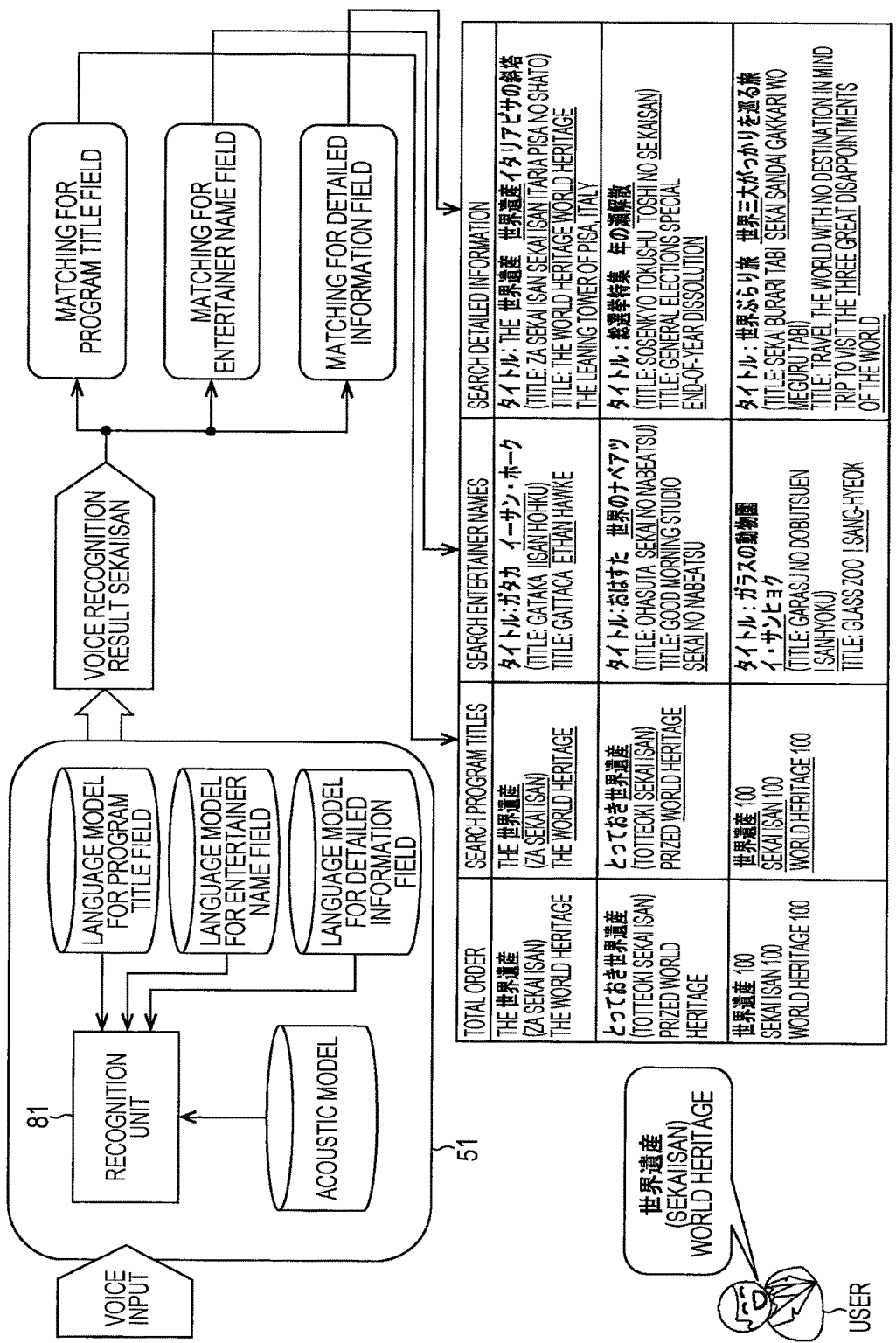
FIG. 36 is a diagram describing processing of the voice searching device 50 in the case of performing voice recognition using a language model for each field, finding the total voice recognition results for all fields, and performing matching between the voice recognition results and the word string for search results for each field.

FIG. 36 is a diagram describing processing of the voice searching device 50 in FIG. 9 in the case of using language models for each field to perform voice recognition of the Japanese input voice, finding a total voice recognition result covering all of the fields, and performing matching between the voice recognition results and word string for search results for each of the fields.

In FIG. 36 also, similar to the case in FIG. 33, the recognition unit 81 performs voice recognition of the Japanese input voice, independently, using each of the language model for the program title field, language model for the entertainer name field, and language model for the detailed information field, and finds voice recognition results for each of the program title field, entertainer name field, and detailed information field.

Further, the recognition unit 81 detects voice recognition results wherein the recognition score is the highest rank or more, from among all of the voice recognition results of each of the program title field, entertainer name field, and detailed information field, and sets the voice recognition results thereof as total voice recognition results, so to speak, that are used for matching with the matching unit 56.

The matching unit 56 (FIG. 9) performs matching with the total voice recognition results with the word string for search results of the program title field, word string for search results of the entertainer name field, and word string for search results of the detailed information field, of the word strings for search results stored in the storage unit for search results unit 53 (FIG. 9).

The output unit 57 (FIG. 9) then outputs the word string for search results wherein the degree of similarity with the voice recognition result is within the top N places, for each field, based on matching results, as the word string for search results.

In FIG. 36, as to the Japanese input voice "sekai isan" ("world heritage" in English), "sekai isan" is to be found as the total voice recognition result.

Also, the matching between the voice recognition results and the word string for search results is performed by field, and the word strings for search results having a similarity of within the top three places are output as the search result word strings for each of the program title field, entertainer name field, and detailed information field.

Note that in FIG. 36, similar to FIG. 33, the portions where the pronunciation symbol of the word string for search results, serving as the search result word string, matches the voice recognition results are underlined.

Figure 37:
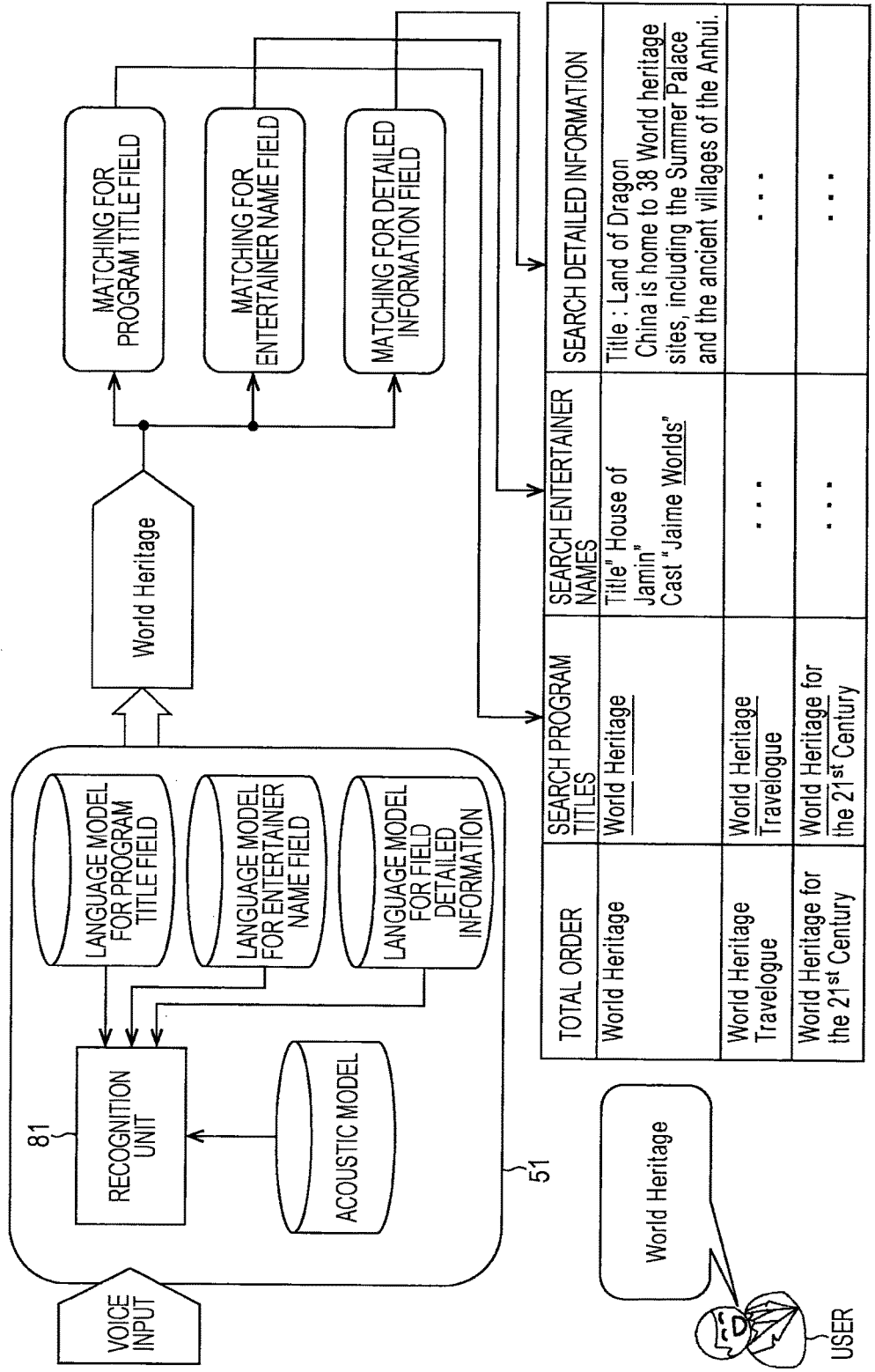
FIG. 37 is a diagram describing processing of the voice searching device 50 in the case of performing voice recognition using a language model for each field, finding the total voice recognition results for all fields, and performing matching between the voice recognition results and the word string for search results for each field.

FIG. 37 is a diagram describing processing of the voice searching device 50 in FIG. 10, in the case of using language models for each field to perform voice recognition of the English input voice, finding a total voice recognition result covering all of the fields, and performing matching between the voice recognition results and word string for search results for each of the fields.

Even if the input voice is English, similar processing is performed as in the case described in FIG. 36 wherein the input voice is Japanese.

That is to say, the recognition unit 81 performs voice recognition of the English input voice, independently, using each of the language model for the program title field, language model for the entertainer name field, and language model for the detailed information field, and finds voice recognition results for each of the program title field, entertainer name field, and detailed information field.

Further, the recognition unit 81 detects voice recognition results wherein the recognition score is the highest rank or more, from among all of the voice recognition results of each of the program title field, entertainer name field, and detailed information field, and sets the voice recognition results thereof as total voice recognition results, so to speak, that are used for matching with the matching unit 56.

The matching unit 56 (FIG. 10) performs matching with the total voice recognition results with the word string for search results of the program title field, word string for search results of the entertainer name field, and word string for search results of the detailed information field, of the word strings for search results stored in the storage unit for search results unit 53 (FIG. 10).

The output unit 57 (FIG. 10) then outputs the word string for search results wherein the degree of similarity with the voice recognition result is within the top N places, for each field, based on matching results, as the word string for search results.

In FIG. 37, as to the English input voice "World Heritage", "World Heritage" is to be found as the total voice recognition result.

Also, the matching between the voice recognition results and the word string for search results is performed by field, and the word strings for search results having a similarity of within the top three places are output as the search result word strings for each of the program title field, entertainer name field, and detailed information field.

Note that in FIG. 37, similar to FIG. 36, the portions where the pronunciation symbol of the word string for search results, serving as the search result word string, matches the voice recognition results are underlined.

As in the above, even in the case that the recognition unit 81 is to find the total voice recognition results, not the voice recognition results for each field, with the output unit 57 (FIG. 10), ordering is performed for a total order, wherein the word strings for search results are ordered regardless of field (covering all of the fields), and the word strings for search results that have a total order that is within the top N places can be output as the search result word strings.

Figure 38:
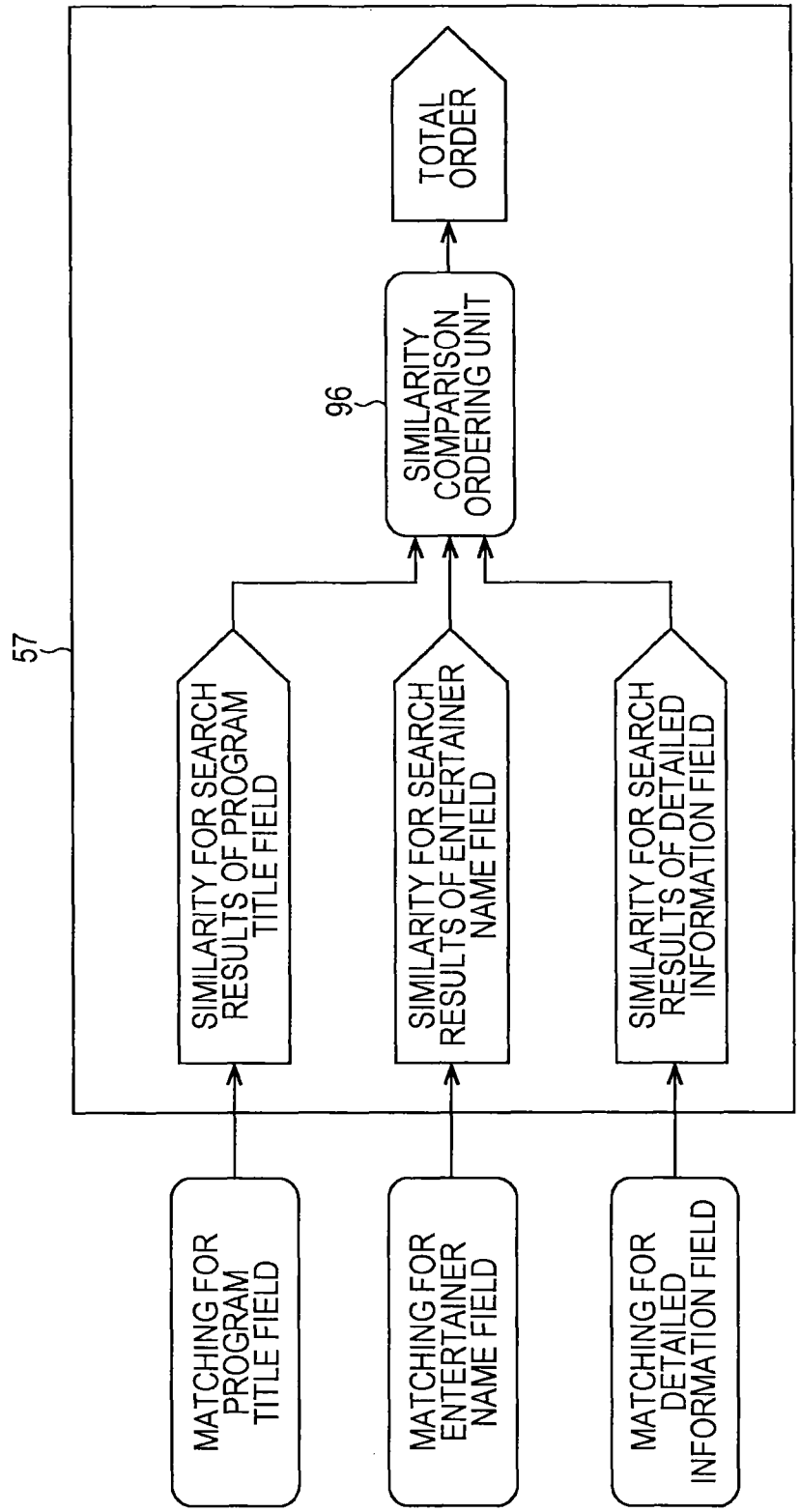
FIG. 38 is a block diagram illustrating a configuration example of a portion of the output unit 57 to find the total order, in the case that the recognition unit 81 finds the total voice recognition results.

FIG. 38 is a block diagram illustrating a configuration of a portion of the output unit 57 to find the total order, in the case of the recognition unit 81 finding total voice recognition results.

In FIG. 38, the output unit 57 has a similarity comparison ordering unit 96.

The degrees of similarities of the word strings for search results in each field, which are found with the matching unit 56, are supplied to the similarity comparison ordering unit 96.

Note that in FIG. 36, the recognition score serving as the voice recognition reliability found with the recognition unit 81 is a recognition score of the total voice recognition results, and is not a value that exists for each field, whereby this is not supplied to the similarity comparison ordering unit 96.

The similarity comparison ordering unit 96 compares all of the similarities for each of the word string for search results of the program title field, word string for search results of the entertainer name field, and word string for search results of the detailed information field, arranges these in ascending order, and places a total order on the word string for search results in the highest order of the total scores.

The output unit 57 then outputs the word string for search results having a total order that is within the top N places as the search result word string.

[Display of Search Result Word String]

Figure 39:
FIG. 39 is a diagram illustrating an example of a display screen of the search result word string output by the output unit 57.

FIG. 39 is a diagram illustrating an example of a display screen of the search result word string that the output unit 57 (FIG. 9 and FIG. 10) outputs.

A portion of a word or syllable or the like (hereafter, also called speech corresponding portion) that matches the voice recognition results of the input voice (similar or matching) from among the word strings for search results can be displayed with emphasis on a display screen of the search result word string (hereafter, also called search result display screen).

FIG. 39 indicates a search result display screen displaying the speech corresponding portion without emphasis, and a search result display screen displaying the speech corresponding portion with emphasis.

In FIG. 39, the speech corresponding portions are emphasized with underlining.

Note that as methods to emphasize the speech corresponding portions, there are other methods such as a method to display the speech corresponding portions by blinking (blink), a method to display by changing color, a method to display changing the font type or size, and so forth, for example.

Also, the speech corresponding portions are not to all be emphasized, but displaying only a portion, such as only the portion having high reliability of the voice recognition results (voice recognition reliability) of the speech corresponding portions, with emphasis can be performed.

Further, in the case that the word string for search results is long, displaying only the speech corresponding portion and the portions before and after thereof, of the word strings for search results, can be performed on the search result display screen.

With the search result display screen, by displaying the speech corresponding portions (or a portion thereof) of the search result word string with emphasis, the user can understand whether the voice recognition is being performed correctly, and further, can determine whether to perform speaking again.

[Voice Searching with Input Voice Including Identified Phrases]

FIG. 40 and FIG. 41 are diagrams illustrating an example of voice searching by input voice, including identified phrases.

In the recorder in FIG. 9 (and FIG. 10), the command determining unit 71 determines whether or not the input voice from the user is a command to control the recorder, based on the voice recognition results supplied from the voice recognition unit 51.

That is to say, the command determining unit 71 stores text strings that are defined as commands to control the recorder (hereafter, also called command text strings), and determines whether or not the input voice from the user is a command to control the recorder, based on whether the voice recognition results from the voice recognition unit 51 matches a command text string.

In the case that the command determining unit 71 determines that the input voice is not a command, i.e., in the case that the voice recognition results from the voice recognition unit 51 does not match a command text string, the determination result to the effect that the input voice is not a command is supplied to the control unit 72.

In this case, the control unit 72 controls the matching unit 56 to execute matching, for example. Accordingly, with the voice searching device 50, matching is performed between the voice recognition results and the word string for search results with the matching unit 56, and the search result word string is output with the output unit 57, based on the matching results thereof.

On the other hand, in the case that the command determining unit 71 determines that the input voice is a command, i.e., in the case that the voice recognition results from the voice recognition unit 51 matches a command text string, the determination result to the effect that the input voice is a command is supplied to the control unit 72, along with the command text string that matches the voice recognition results.

In this case, the control unit 72 performs control to restrict the processing with the voice searching device 50. Accordingly, with the voice searching device 50, matching is not executed with the matching unit 56, and a search result word string is not output.

Further, in this case, the control unit 72 performs processing such as controlling the recorder function unit 60, according to the command interpreted from the command text string from the command determining unit 71.

Accordingly, with the command determining unit 71, as a command text string, for example, in the case that the command text string "select" which is interpreted as a command to select a program to perform playing from the recorded programs, or the command text string "play" which is interpreted as a command to play a program, and so forth, are stored, when the voice recognition unit 50 outputs the voice recognition result "play" that matches the command text string "play", for example, with the control unit 72 the recorder function unit 60 is controlled to play a program for example, according to the command interpreted from the command text string "play".

Now, as in the above, in the case that the voice recognition result matches the command text string, when the processing of the voice searching device 50 is restricted, voice searching cannot be performed for the word string matching the command text string as a keyword.

Thus, in the case of performing voice searching with the recorder in FIG. 9, by having the user speak the identified phrase indicating the intent thereof with an input voice including "with voice searching" or the like for example, voice searching can be performed for the word string matching the command text string as a keyword.

Note that the identified phrase can be included at the beginning or at the end of the input voice, for example, but below will be included at the beginning of the input voice.

Using the word "play" as a keyword, in the case that the user desired to perform a program search including the keyword "play" with voice searching, an identified phase to indicate the voice searching such as "with voice searching", for example, and the keyword "play" are spoken consecutively.

In this case, the input voice "with voice searching, play" is supplied to the voice recognition unit 51, and voice recognition of the input voice "with voice searching, play" is performed with the voice recognition unit 51.

Now, with the voice recognition of the input voice "with voice searching, play", in the case that the language score of a recognition hypothesis matching the input voice "with voice searching, play" is low, a voice recognition result matching the input voice "with voice searching, play" may not be output.

Now, by having the user speak the input voice "with voice searching, play" that includes the identified phrase "with voice searching", voice searching of programs including the keyword "play" is performed, whereby it is not favorable that, as to the input voice including the identified phrase, a word string including the identified phrase will not be output as the voice recognition result.

That is to say, with the voice recognition unit 51, as to the input voice "with voice searching, play" which includes the identified phrase, obtaining voice recognition results including the identified phrase thereof is necessary, and in order to do so, for example preventing the language score of the recognition hypothesis including the identified phrase is necessary.

Thus, with the voice recognition unit 51 (FIG. 29), a language model is generated with the language model generating unit 85, using the identified phrase together with the word strings for search results stored in the storage unit for search results 53 (FIG. 9).

Thus, as a language model, for example, in the case of employing a bi-gram, in the case that an identified phrase and a word making up the word string for search results are next to each other, a language model providing a high value language score (hereafter, also called identified phrase language model) is generated.

Note that the command text strings are to be included in the word strings for search results stored in the storage unit for search results 53 (FIG. 9).

Also, with the voice recognition unit 51, a no-phrase language model is generated at the language model generating unit 85, which is another language model from the identified phrase language model, using only word strings for search results that are stored in the storage unit for search result 53 (FIG. 9) without using identified phrases, i.e. using word strings not including the identified phrases.

According to the identified phase language model, as a recognition hypothesis including the identified phrases (word string), a value higher is placed on the recognition hypothesis not including the identified phrase.

Also, according to the no-phrase language model, as a recognition hypothesis not including the identified phrases, a value higher is placed on the recognition hypothesis that include the identified phrase.

With the voice recognition unit 51, voice recognition is performed using an identified phrase language model and a no-phrase language model.

With voice recognition that uses an identified phrase language model and a no-phrase language model, as compared to voice recognition that uses a no-phrase language model but does not use an identified phrase language model, a high value language score is given to a recognition hypothesis wherein an identified phrase and a word making up the word string for search results are next to each other.

Accordingly, for an input voice that includes an identified phrase, the language score (and acoustic score) of a recognition hypothesis wherein an identified phrase and a word making up the word string for search results are next to each other, and therefore a recognition score, becomes higher as compared to the case of voice recognition not using the identified phrase language model, and the language score of the recognition hypothesis including the identified hypothesis thereof as to the input voice including the identified phrase becomes lower, and therefore can be prevented from not being output as the voice recognition result.

FIG. 40 illustrates an example of voice searching in the case that voice recognition of Japanese input voice is performed using an identified phrase language model and a no-phrase language model with the voice recognition unit 51 in FIG. 9.

As shown in FIG. 40, in the case that the user speaks the Japanese input voice "with voice searching, play", which includes the identified phrase in Japanese "with voice searching" that requests voice searching for a program, the input voice thereof "with voice searching, play" is subjected to voice recognition with the voice recognition unit 51.

As described above, with the voice recognition unit 51, voice recognition is performed using the identified phrase language model, whereby for input voice including the identified phrase "with voice searching", the language score (and acoustic score), and therefore the recognition score, of the recognition hypothesis "with voice searching, play" which includes the identified phrase, becomes sufficiently higher than the case of not using the identified phrase language model.

As a result, for the input voice including the identified phrase "with voice searching", the recognition hypothesis "with voice searching, play" which includes the identified phrase is output as the voice recognition result.

The voice recognition result "with voice searching, play" that is output by the voice recognition result 51 is supplied to the pronunciation symbol converting unit 52 and command determining unit 71.

The voice recognition result "with voice searching, play" includes the identified phrase "with voice searching", whereby this does not match the command text string, and therefore the command determining unit 71 determines that the input voice is not a command.

Accordingly, the control unit 72 does not perform control to restrict the processing of the voice searching device 50.

On the other hand, with the pronunciation symbol converting unit 52, the voice recognition result "with voice searching, play" from the voice recognition unit 51 is converted to a recognition result pronunciation symbol string, and is supplied to the matching unit 56.

Also, the pronunciation symbol string for search results of the word string for search results is supplied to the matching unit 56 from the storage unit for search results 53, via the morpheme analyzing unit 54 and the pronunciation symbol converting unit 55.

In the case that (pronunciation symbols of) an identified phrase is included in the recognition result pronunciation symbol string, the matching unit 56 deletes the identified phrase from the recognition result pronunciation symbol string, and performs matching between the recognition result pronunciation symbol string after deletion thereof and the pronunciation symbol string for search results.

The matching unit 56 then supplies the degree of similarity serving as the matching result between the recognition result pronunciation symbol string and the pronunciation symbol string for search results to the output unit 57.

Based on the degree of similarity serving as the matching result from the matching unit 56, the output unit 57 outputs the word string for search results having a degree of similarity within the top N places as a search result word string.

In FIG. 40, the program title serving as the word string for search results that is within the top two places as to the input voice "with voice searching, play" which includes the identified phrase is output as the search result word string.

Now, in the present case, matching is performed between the recognition result pronunciation symbol string with the identified phrase deleted and the pronunciation symbol string for search results, i.e. the voice recognition result with the identified phrase deleted and the word string for search results, is performed with the matching unit 56, and based on the matching results thereof, the word string for search results that matches the voice recognition result with the identified phrase deleted is output as the search result word string.

Accordingly, in this case, the word string for search results can be said to be the word string which is for the search results of the word string corresponding to the voice having the identified phrase removed (deleted) from the input voice.

On the other hand, for example as shown in FIG. 40, in the case that the Japanese input voice "play" which matches the command text string is spoken without including the identified phrase, with the voice recognition unit 51 the input voice thereof "play" is subjected to voice recognition, and the voice recognition result "play" is supplied to the pronunciation symbol converting unit 52 and the command determining unit 71.

The voice recognition result "play" matches the command text string "play", whereby the command determining unit 71 determines that the input voice is a command, and supplies the determination results to the effect that the input voice is a command, together with the command text string "play" which matches the voice recognition result, to the control unit 72.

Upon the determination results to the effect that the input voice is a command being supplied from the command determining unit 71, the control unit 72 performs control to restrict the processing of the voice searching unit 50. Accordingly, with the voice searching device 50, voice searching is not performed, and a search result word string is not output.

Further, the control unit 72 controls the recorder function unit 60 so as to perform playing of the program, according to the command interpreted from the command text string "play" from the command determining unit 71.

FIG. 41 illustrates an example of voice searching with the voice recognition unit 51 in FIG. 10, in the case that voice recognition of English input voice is performed using the identified phrase language model and the no-phrase language model.

As shown in FIG. 41, for example, in the case that the user speaks the English input voice "Program Search, Play", which includes the identified phrase in English "Program Search" that requests voice searching for a program, the input voice thereof "Program Search, Play" is subjected to voice recognition with the voice recognition unit 51.

As described above, with the voice recognition unit 51, voice recognition is performed using the identified phrase language model, whereby for input voice including the identified phrase "Program Search", the language score (and acoustic score), and therefore the recognition score, of the recognition hypothesis "Program Search, Play" which includes the identified phrase, becomes sufficiently higher than the case of not using the identified phrase language model.

As a result, for the input voice including the identified phrase "Program Search", the recognition hypothesis "Program Search, Play" which includes the identified phrase is output as the voice recognition result.

The voice recognition result "Program Search, Play" that is output by the voice recognition result 51 is supplied to the pronunciation symbol converting unit 52 and command determining unit 71.

The voice recognition result "Program Search, Play" includes the identified phrase "Program Search", whereby this does not match the command text string, and therefore the command determining unit 71 determines that the input voice is not a command.

Accordingly, the control unit 72 does not perform control to restrict the processing of the voice searching device 50.

On the other hand, with the pronunciation symbol converting unit 52, the voice recognition result "Program Search, Play" from the voice recognition unit 51 is converted to a recognition result pronunciation symbol string, and is supplied to the matching unit 56.

Also, the pronunciation symbol string for search results of the word string for search results is supplied to the matching unit 56 from the storage unit for search results 53, via the pronunciation symbol converting unit 55.

In the case that (pronunciation symbols of) an identified phrase is included in the recognition result pronunciation symbol string, the matching unit 56 deletes the identified phrase from the recognition result pronunciation symbol string, and performs matching between the recognition result pronunciation symbol string after deletion thereof and the pronunciation symbol string for search results.

The matching unit 56 then supplies the degree of similarity serving as the matching result between the recognition result pronunciation symbol string and the pronunciation symbol string for search results to the output unit 57.

Based on the degree of similarity serving as the matching result from the matching unit 56, the output unit 57 outputs the word string for search results having a degree of similarity within the top N places as a search result word string.

In FIG. 41, the program title serving as the word string for search results that is within the top two places as to the input voice "Program Search, Play" which includes the identified phrase is output as the search result word string.

On the other hand, for example, as shown in FIG. 41, in the case that the user speaks the English input voice "Play" which matches the command text string without including the identified phrase, with the voice recognition unit 51 the input voice thereof "Play" is subjected to voice recognition, and the voice recognition result "Play" is supplied to the pronunciation symbol converting unit 52 and the command determining unit 71.

The voice recognition result "Play" matches the command text string "Play", whereby the command determining unit 71 determines that the input voice is a command, and supplies the determination results to the effect that the input voice is a command, together with the command text string "Play" which matches the voice recognition result, to the control unit 72.

Upon the determination results to the effect that the input voice is a command being supplied from the command determining unit 71, the control unit 72 performs control to restrict the processing of the voice searching unit 50. Accordingly, with the voice searching device 50, voice searching is not performed, and a search result word string is not output.

Further, the control unit 72 controls the recorder function unit 60 to perform playing of the program, according to the command interpreted from the command text string "Play" from the command determining unit 71.

As in the above, with the voice recognition unit 51, voice recognition is performed using the identified phrase language model and no-phrase language model, whereby input voice including the identified phrase and input voice not including the identified phrase can both accurately perform voice recognition.

Further, in the case of performing voice searching, by having the user speak including the identified phrase, whether the user speech is a voice searching request or a command to control the recorder can be distinguished, and even if the word string matches the command text string, voice searching can be performed by using the word string thereof as a keyword.

That is to say, depending on whether the identified phrase is included in the user speech (or depending on whether the user speech matches the command text string), voice searching and recorder control can be switched back and forth.

Note that in FIG. 40 and FIG. 41, the command text string is included in the word string for search results, and a no-phrase language model is generated with the language model generating unit 85 by using only the word string for search results and not the identified phrase, but additionally a language model can be employed as the no-phrase language model that is generated using only the command text string, for example.

Also, in FIG. 40 and FIG. 41, whether or not the input voice from the user is a command to control the recorder is determined by the command determining unit 71, by whether or not, based on the voice recognition results from the voice recognition unit 51, the voice recognition result thereof matches the command text string, but with the command determining unit 71, additionally, determination can be made as to whether or not the input voice is a command to control the recorder, based on the matching results of the matching unit 56, for example.

That is to say, in this case, a word string that is unique to the command that controls the recorder as a command text string, i.e., a word string that has an extremely low probability of appearing in the word string for search results (ideally, no possibility of appearing in the word string for search results) is employed.

For example, as a command text string of the command to cause the record to perform playing, instead of "saisei" or "Play", "recooda contorooru saisei" or "Recorder Control Play" or the like is employed.

Further, the command text string is included in the word string for search results, and matching is performed between the pronunciation symbol string for search results of the word string for search results and the recognition result pronunciation symbol strings of all of the voice recognition results with the matching unit 56, and the matching result thereof is supplied to the command determining unit 71.

With the command determining unit 71, in the case that the word string for search results having the highest degree of similarity obtained by the matching with (the recognition result pronunciation symbol string of) all of the voice recognition results, based on the matching results from the matching unit 56, match the command text string, the input voice is determined to be a command, and in the case that the highest word string for search results does not match the command text string, the input voice is determined not to be a command.

With the command determining unit 71, in the case that the input voice is determined to be a command, the control unit 72 performs processing according to the command thereof, and based on the matching results of the matching unit 56, restricts the output unit 57 from outputting the word string for search results.

On the other hand, in the case that the input voice is determined not to be a command by the command determining unit 71, the control unit 72 deletes the identified phrase from the recognition result pronunciation symbol when the identified phrase is included in the voice recognition result of the input voice, and controls the matching unit 56 so as to perform matching between the recognition result pronunciation symbol string after deletion thereof and the pronunciation symbol string for search results, while controlling the output unit 57 to output the word string for search results based on the matching result of the matching unit 56.

Note that as in the above, in the case of employing a word string unique to a command as the command text string, regardless of whether the identified phrase is included in the input voice, the command determining unit 71 can determine whether or not the input voice is a command, whereby to perform voice searching, the user can speak the input voice only for the voice searching keyword without speaking the input voice that includes the identified phrase (the user does not need to speak the identified phrase to perform voice searching).

In this case, when the command determining unit 71 determines that the input voice is not a command, the control unit 72 controls the output unit 57 to output the search result word string, based on the matching results of the matching between the word string for search results and all of the voice recognition results which is already performed with the matching unit 56.

FIG. 42 and FIG. 43 are diagrams illustrating other examples of voice searching with the input voice that includes the identified phrase.

As described with FIG. 36 and FIG. 37, in the case that the word string for search results is divided into multiple fields such as a program title field, entertainer name field, and a detailed information field or the like, with the voice recognition unit 51 (FIG. 9 (and FIG. 10)), a language model for a program title filed, language model for entertainer name filed, and language model for detailed information field are generated which as language models for each field, and voice recognition can be performed using the language models for each field thereof, thereby finding voice recognition results for each field.

Further, with the voice recognition unit 51, voice recognition results wherein the recognition score is the highest rank or more, from among all of the voice recognition results of each of the program title field, entertainer name field, and detailed information field, is detected, the voice recognition results thereof can be set as total voice recognition results, that are used for matching with the matching unit 56.

Also, with the matching unit 56 (FIG. 9), matching of the total voice recognition results and the word string for search results of the each field can be performed, and with the output unit 57 (FIG. 9), the word strings for search results having a degree of similarity within the voice recognition results within the top N places, based on the matching results for each field, can be output as the search result word string.

In this case, the search result word string is output for each field.

That is to say, the search result word strings are output for the program title field, entertainer name field, and detailed information field, respectively.

Accordingly, even in the case that, in an effort to search a program that includes the predetermined test string in the title, the user speaks the predetermined text string thereof, for example, not only the word string for search results of the program title, but also the word strings for search results that match the voice recognition results in each of the program title field, entertainer name field, and detailed information field are output as the search result word strings.

Consequently, even if the program title does not match the predetermined text string spoken by the user, a program including entertainer names or detailed information that matches the predetermined text string thereof as metadata can be output as the search result text string.

As in the above, for a program title that does not match the predetermined text string spoken by the user to be output as the search result text string can cause the user to feel uneasy.

Also, for example, in the case of searching for a program, being able to search for programs only including the predetermined text string in the title, or to search for programs only including predetermined text string in the entertainer name, and so forth would be convenient.

Thus, with the recorder in FIG. 9 (and in FIG. 10), in the case of performing voice searching, by having the user speak the input voice which includes identified phrases that instruct voice searching and that express the field of the word string for search results that is to be matched with the voice recognition results, such as "search with program name" or "search with person name" or the like, for example, voice searching can be performed, while restricting the fields of the word strings for search results to be matched with the voice recognition results to identified fields.

In the case of performing voice searching while restricting the fields of the word strings for search results to be matched with the voice recognition results to identified fields, a language model is generated for each field with the language model generating unit 85 of the voice recognition unit 51 (FIG. 29), using the word strings for search results stored in the storage unit for search results unit 53 (FIG. 9) and a field phrase which is an identified phrase to indicate the field.

That is to say, for example, as described above, in the case that the word strings for search results are divided in to three fields, which are the program title field, entertainer name field, and detailed information field, the language model generating unit 85 generates a language model for the program title field, using for example, "search by program name" (Japanese) or "Program Title Search by", serving as a field phrase which is an identified phrase indicating the program title field, and the word strings for search results of the program title field.

Further, the language model generating unit 85 generates a language model for the entertainer name field, using for example, "search by person name" (Japanese) or "Cast Search by", serving as a field phrase indicates the entertainer name field, and the word strings for search results of the entertainer name field, and also generates a language model for the detailed information field, using for example, "search by detailed information" (Japanese) or "Information Search by", serving as a field phrase indicates the entertainer name field, and the word strings for search results of the detailed information field.

Note that in the case of employing a bi-gram, for example, as a language model, according to the language model for the program title field, in the case that the field phrase of the program title field "search by program name" (Japanese) or "Program Title Search by", and the words making up the word string for search results of the program title field are next to each other, a high value language score is given.

The language model for the entertainer name field and the language model for the detailed information field are also similar.

With the voice recognition unit 51, voice recognition is performed using the language model for the program title field, the language model for the entertainer name field and the language model for the detailed information field.

According to voice recognition using the language model for the program title field, the language model for the entertainer name field and the language model for the detailed information field, a recognition hypothesis wherein the field phrase of the program title field "search by program name" (Japanese) or "Program Title Search by", and the words making up the word string for search results of the program title field, the field phrase of the entertainer name field "search by person name" (Japanese) or "Cast Search by", and the words making up the word string for search results of the entertainer name field, or the field phrase of the detailed information field "search by detailed information" (Japanese) or "Information Search by", and the words making up the word string for search results of the detailed information field, are next to each other, a high value language score is given.

Accordingly, in the case that the user has spoken an input voice including a field phrase, the input voice thereof can be accurately subjected to voice recognition.

In the case of restricting the field of the word string for search results to be matched with the voice recognition results to an identified field for performing voice recognition, as in the above, with the voice recognition unit 51 (FIG. 29), voice recognition is performed using a language model for each field, and also, matching to the voice recognition results is performed of only the word strings for recognition of the field indicated by the field phase included in the voice recognition result (the field of the language model used to obtain voice recognition results) with the matching unit 56, and with the output unit 57, the word string for search results is output based on the matching results thereof.

FIG. 42 shows an example of voice searching with the voice recognition unit 51 in FIG. 9, in the case that a language model for each field is used to perform voice recognition of the Japanese input voice, and matching is performed with the matching unit 56 of the voice recognition results and only the word strings for recognitions of the field indicated by the field phrase included in the voice recognition results.

As shown in FIG. 42, for example in the case that the user has spoken an input voice "search by program name for . . . " which includes the field phrase "search by program name", the input voice "search by program name for . . . " is subjected to voice recognition with the voice recognition unit 51.

As described above, with the voice recognition unit 51, voice recognition is performed using a language model for the program title field, a language model for the entertainer name field, and a language model for the detailed information field, whereby a language score (and acoustic score), and therefore a recognition score, of the recognition hypothesis "search by program name for . . . " which includes the field phrase "search by program name" of the program title field, as to the input voice "search by program name for . . . " which includes the field phrase "search by program name" of the program title field, will be sufficiently higher than the recognition score of the recognition hypothesis which does not include the field phrase "search by program name" (includes a recognition hypothesis that includes a field phrase other than the field phrase "search by program name" of the program title field).

Consequently, as to the Japanese input voice including the field phrase "search by program name" of the program title field, the recognition hypothesis "search by program name for . . . " which includes the field phrase of the program title field thereof becomes the voice recognition result, while the recognition hypothesis which does not include the field phrase of the program title field can be prevented from becoming the voice recognition result.

The voice recognition result "search by program name for . . . " which the voice recognition unit 51 outputs is converted to a recognition result pronunciation symbol string via the pronunciation symbol converting unit 52, and is supplied to the matching unit 56.

Also, the pronunciation symbol string for search results of the word string for search results is supplied to the matching unit 56 from the storage unit for search results 53, via the morpheme analyzing unit 54 and the pronunciation symbol converting unit 55.

In the case that the (pronunciation symbol of the) field phrase is included in the recognition result pronunciation symbol string, the matching unit 56 deletes the field phrase from the recognition result pronunciation symbol string, and performs matching with the recognition result pronunciation symbol string after deletion only for the pronunciation symbol string for search results of the word string for search results of the field which the field phrase included in the recognition result pronunciation symbol string indicates, from among the word strings for search results.

The matching unit 56 then supplies the degree of similarity serving as the matching result between the recognition result pronunciation symbol string and the pronunciation symbol string for search results, to the output unit 57.

Accordingly, with the matching unit 56, as to the voice recognition result "search by program name for . . . " which includes the field phrase of the program title field, matching with the voice recognition result (voice recognition result having deleted the field phrase) is made only for the word strings for search results of the program title field.

Based on the degree of similarity serving as the matching results from the matching unit 56, the output unit 57 outputs the word strings for search results having a degree of similarity within the top N places as the search result word string.

Accordingly, in the case that the user has spoken the Japanese input voice "search by program name for . . . " which includes the field phrase of the program title field, the text string " . . . " which is the voice recognition result "search by program name for . . . " after deleting the field phrase is matched to the word string for search results of the program title field, and as a result thereof, a program matching the text string " . . . " is output as the word string for search results.

Also, in shown in FIG. 42, in the case that the user speaks the input voice "search by person name for . . . " which includes the field phrase of the entertainer name field, for example, the input voice "search by person name for . . . " thereof is subjected to voice recognition with the voice recognition unit 51.

As described above, with the voice recognition unit 51, voice recognition is performed using a language model for the program title field, a language model for the entertainer name field, and a language model for the detailed information field, whereby a language score (and acoustic score), and therefore a recognition score, of the recognition hypothesis "search by person name for . . . " which includes the field phrase "search by person name" of the entertainer name field, as to the input voice "search by person name for . . . " which includes the field phrase "search by person name" of the entertainer name field, will be sufficiently higher than the recognition score of the recognition hypothesis which does not include the field phrase "search by person name".

Consequently, as to the Japanese input voice including the field phrase "search by person name" of the entertainer name field, the recognition hypothesis "search by person name for . . . " which includes the field phrase of the entertainer name field thereof becomes the voice recognition result, while the recognition hypothesis which does not include the field phrase of the entertainer name field can be prevented from becoming the voice recognition result.

The voice recognition result "search by person name for . . . " which the voice recognition unit 51 outputs is converted to a recognition result pronunciation symbol string via the pronunciation symbol converting unit 52, and is supplied to the matching unit 56.

Also, the pronunciation symbol string for search results of the word string for search results is supplied to the matching unit 56 from the storage unit for search results 53, via the morpheme analyzing unit 54 and the pronunciation symbol converting unit 55.

In the case that the (pronunciation symbol of the) field phrase is included in the recognition result pronunciation symbol string, the matching unit 56 deletes the field phrase from the recognition result pronunciation symbol string, and performs matching with the recognition result pronunciation symbol string after deletion only for the pronunciation symbol string for search results of the word string for search results of the field which the field phrase included in the recognition result pronunciation symbol string indicates, from among the word strings for search results.

The matching unit 56 then supplies the degree of similarity serving as the matching result between the recognition result pronunciation symbol string and the pronunciation symbol string for search results, to the output unit 57.

Accordingly, with the matching unit 56, as to the voice recognition result "search by person name for . . . " which includes the field phrase of the entertainer name field, matching with the voice recognition result (voice recognition result having deleted the field phrase) is made only for the word strings for search results of the entertainer name field.

Based on the degree of similarity serving as the matching results from the matching unit 56, the output unit 57 outputs the word strings for search results having a degree of similarity within the top N places as the search result word string.

Accordingly, in the case that the user has spoken the Japanese input voice "search by person name for . . . " which includes the field phrase of the entertainer name field, the text string " . . . " which is the voice recognition result "search by program name for . . . " after deleting the field phrase is matched to the word string for search results of the entertainer name field, and as a result thereof, an entertainer name matching the text string " . . . " is output as the word string for search results.

From the above, even in the case of performing a program searching with a certain text string " . . . " as the keyword, depending on the field phrase included in the Japanese input voice, a different program may be obtained as the search result.

FIG. 43 shows an example of voice searching with the voice recognition unit 51 in FIG. 10, in the case that a language model for each field is used to perform voice recognition of the English input voice, and matching is performed with the matching unit 56 of the voice recognition results and only the word strings for recognitions of the field indicated by the field phrase included in the voice recognition results.

As shown in FIG. 42, for example in the case that the user has spoken an input voice "Program Title Search by XX" which includes the field phrase "Program Title Search by", the input voice "Program Title Search by XX" is subjected to voice recognition with the voice recognition unit 51.

As described above, with the voice recognition unit 51, voice recognition is performed using a language model for the program title field, a language model for the entertainer name field, and a language model for the detailed information field, whereby a language score (and acoustic score), and therefore a recognition score, of the recognition hypothesis "Program Title Search by XX" which includes the field phrase "Program Title Search" of the program title field, as to the input voice "Program Title Search by XX" which includes the field phrase "Program Title Search by" of the program title field, will be sufficiently higher than the recognition score of the recognition hypothesis which does not include the field phrase "Program Title Search" (includes a recognition hypothesis that includes a field phrase other than the field phrase "Program Title Search by" of the program title field).

Consequently, as to the English input voice including the field phrase "Program Title Search by" of the program title field, the recognition hypothesis "Program Title Search by XX" which includes the field phrase of the program title field thereof becomes the voice recognition result, while the recognition hypothesis which does not include the field phrase of the program title field can be prevented from becoming the voice recognition result.

The voice recognition result "Program Title Search by XX" which the voice recognition unit 51 outputs is converted to a recognition result pronunciation symbol string via the pronunciation symbol converting unit 52, and is supplied to the matching unit 56.

Also, the pronunciation symbol string for search results of the word string for search results is supplied to the matching unit 56 from the storage unit for search results 53, via the pronunciation symbol converting unit 55.

In the case that the (pronunciation symbol of the) field phrase is included in the recognition result pronunciation symbol string, the matching unit 56 deletes the field phrase from the recognition result pronunciation symbol string, and performs matching with the recognition result pronunciation symbol string after deletion only for the pronunciation symbol string for search results of the word string for search results of the field which the field phrase included in the recognition result pronunciation symbol string indicates, from among the word strings for search results.

The matching unit 56 then supplies the degree of similarity serving as the matching result between the recognition result pronunciation symbol string and the pronunciation symbol string for search results, to the output unit 57.

Accordingly, with the matching unit 56, as to the voice recognition result "Program Title Search by XX" which includes the field phrase of the program title field, matching with the voice recognition result (voice recognition result having deleted the field phrase) is made only for the word strings for search results of the program title field.

Based on the degree of similarity serving as the matching results from the matching unit 56, the output unit 57 outputs the word strings for search results having a degree of similarity within the top N places as the search result word string.

Accordingly, in the case that the user has spoken the English input voice "Program Title Search by XX" which includes the field phrase of the program title field, the text string "XX" which is the voice recognition result "Program title Search by XX" after deleting the field phrase is matched to the word string for search results of the program title field, and as a result thereof, a program title matching the text string "XX" is output as the word string for search results.

As shown in FIG. 42, for example in the case that the user has spoken an input voice "Cast Search by XX" which includes the field phrase "Cast Search by", the input voice "Cast Search by XX" is subjected to voice recognition with the voice recognition unit 51.

As described above, with the voice recognition unit 51, voice recognition is performed using a language model for the program title field, a language model for the entertainer name field, and a language model for the detailed information field, whereby a language score (and acoustic score), and therefore a recognition score, of the recognition hypothesis "Cast Search by XX" which includes the field phrase "Cast Search" of the program title field, as to the input voice "Cast Search by XX" which includes the field phrase "Cast Search by" of the entertainer name field, will be sufficiently higher than the recognition score of the recognition hypothesis which does not include the field phrase "Cast Search".

Consequently, as to the English input voice including the field phrase "Cast Search by" of the entertainer name field, the recognition hypothesis "Cast Search by XX" which includes the field phrase of the entertainer name field thereof becomes the voice recognition result, while the recognition hypothesis which does not include the field phrase of the entertainer name field can be prevented from becoming the voice recognition result.

The voice recognition result "Cast Search by XX" which the voice recognition unit 51 outputs is converted to a recognition result pronunciation symbol string via the pronunciation symbol converting unit 52, and is supplied to the matching unit 56.

Also, the pronunciation symbol string for search results of the word string for search results is supplied to the matching unit 56 from the storage unit for search results 53, via the pronunciation symbol converting unit 55.

In the case that the (pronunciation symbol of the) field phrase is included in the recognition result pronunciation symbol string, the matching unit 56 deletes the field phrase from the recognition result pronunciation symbol string, and performs matching with the recognition result pronunciation symbol string after deletion only for the pronunciation symbol string for search results of the word string for search results of the field which the field phrase included in the recognition result pronunciation symbol string indicates, from among the word strings for search results.

The matching unit 56 then supplies the degree of similarity serving as the matching result between the recognition result pronunciation symbol string and the pronunciation symbol string for search results, to the output unit 57.

Accordingly, with the matching unit 56, as to the voice recognition result "Cast Search by XX" which includes the field phrase of the entertainer name field, matching with the voice recognition result (voice recognition result having deleted the field phrase) is made only for the word strings for search results of the entertainer name field.

Based on the degree of similarity serving as the matching results from the matching unit 56, the output unit 57 outputs the word strings for search results having a degree of similarity within the top N places as the search result word string.

Accordingly, in the case that the user has spoken the English input voice "Cast Search by XX" which includes the field phrase of the program title field, the text string "XX" which is the voice recognition result "Cast Search by XX" after deleting the field phrase is matched to the word string for search results of the entertainer name field, and as a result thereof, a entertainer name matching the text string "XX" is output as the word string for search results.

From the above, even in the case of performing a program searching with a certain text string "XX" as the keyword, depending on the field phrase included in the English input voice, a different program may be obtained as the search result.

Note that as a field phrase, not only a phrase indicating one field, but a phrase indicating multiple fields can also be employed.

Also, as a field, a field to which a command belongs to control the recorder in FIG. 9 (and FIG. 10) can be employed, in this case, determination can be made by the field phrase included in the voice recognition result as to whether or not the input voice is a command, and further, in the case that the input voice is a command, the type of command (the command is, what type of processing does the command request?) can be searched for by the matching with the matching unit 56.

[Increasing Speed of Matching and Reducing Storage Capacity]

Figure 44:
FIG. 44 is a diagram illustrating a vector for search results and vector substitution information.

FIG. 44 is a diagram illustrating a vector for search results and vector substitution information.

With the voice recognition device 50 (FIG. 9 (and FIG. 10)), in order to quickly output the search result word strings, for example matching has to be performed at high speed.

On the other hand, in matching the voice recognition results and the word string for search results, in the case of finding the cosine distance or correction distance to serve as a degree of similarity, the vector for search results which indicates the pronunciation symbol string for search results and the recognition result vector which indicates the recognition result pronunciation symbol string are necessary, but if each time the voice recognition result is obtained, the word string for search results stored in the storage unit for search results 53 (FIG. 9) is converted to a vector for search results, time is required for matching, preventing increased speed of matching.

Thus, there is a method to increase the matching speed by finding, the vector for search results that is needed to calculate the degree of similarity beforehand, from the word string for search results stored in the storage unit for search results 53 (FIG. 9), and by storing this in an unshown memory that is built into the matching unit 56, matching at a higher speed can be accommodated.

However, if the vector for search results is stored in the memory that is built into the matching unit 56, the memory thereof requires an enormous capacity of memory.

That is to say, for example, by setting the value of the component of the vector for search results to be 1 or 0, depending on whether or not the syllable corresponding to the component thereof exists in the pronunciation symbol string for search results, in the case that the number of types of pronunciation symbols is C, the vector for search results is a C-dimension vector.

For example, as pronunciation symbols, in the case of employing symbols indicating Japanese syllables, the number of pronunciation symbol types C is approximately 100 to 300.

Further, for example, even if the number of pronunciation symbol types C is 100, in the case of employing 2-gram syllables as increments of matching, the vector for search results becomes a 10,000 (=100×100)-dimension vector.

Also, if the dimension of the vector for search results is D-dimensions, and the number of word strings for search results stored in the storage unit for search results 53 (FIG. 9) is Z, the memory built into the matching unit 56 will need storage capacity to store (vectors for search results of) D×Z components.

Now, a vector for search results is generally a sparse vector (Sparse Vector), i.e., often is a vector wherein most of the components are 0.

Thus, with the matching unit 56, for each vector for search results, (an ID (Identification) that identifies) only a pronunciation symbol of a syllable corresponding to a component that is not 0 of the vector for search results (in the case of employing 2-gram syllables as increments of matching, a pronunciation symbol string of a 2-gram syllable corresponding to a component that is no 0) is stored in the built-in memory.

Note that as a component value of the vector for search results, for example in the case of employing a frequency (tf) that the syllable corresponding to the component thereof appears in the pronunciation symbol string for search results, only a pair made up of (an ID to identify) the syllables corresponding to components that are not 0 of the vector for search results and the frequency of the syllable thereof appearing (component value of the vector for search results) is stored in the memory built into the matching unit 56.

In the case of only storing the pronunciation symbols of the syllables corresponding to components that are not 0 of the vector for search results in the memory built into the matching unit 56, if the number of components that are not 0 in the vector for search results of the i'th word string for search results is K(i), the memory built into the matching unit 56 is sufficient to have a storage capacity for storing K(1)+K(2)+ . . . +K(Z) pronunciation symbols.

Now, the values that the components of the vector for search results takes are the two values of 0 and 1, whereas as a value that the pronunciation symbols take, as described above, is a value of approximately 100 to 300, whereby one component of the vector for search results can be expressed with 1 bit, but in order to express a pronunciation symbol, approximately 7 to 9 bits are needed.

However, most of the components of the vectors for search results are 0, whereby with a vector for search results, the number of components that are not 0 K(i) is a small value, and the storage capacity for storing only the K(1)+K(2)+ . . . +K(Z) pronunciation symbols becomes small as compared to the storage capacity for storing D×Z components (of the vector for search results).

Accordingly, with the matching unit 56, for each vector for search results, by only storing the pronunciation symbols of the syllables corresponding to components of the vector for search results that are not 0 in the built-in memory, the storage capacity needed for the memory thereof can be reduced as compared to the case of storing the vector for search results itself.

Now, the pronunciation symbols of the syllables corresponding to the components of the vectors for search results that are not 0, which are stored in the memory built into the matching unit 56 are information substituting for the vectors for search results, whereby, hereafter as appropriate, this may also be called vector substitution information.

FIG. 44 illustrates a vector for search results and the vector substitution information that substitutes for the vector for search results thereof.

The component values of the vector for search results are 1 or 0, depending on whether the syllable corresponding to the component thereof exists in the pronunciation symbol string for search results.

On the other hand, the vector substitution information that substitutes for the vector for search results is only made up of pronunciation symbols of the syllables corresponding to the components that are not 0 of the vector for search results.

Now, with the vector substitution information in FIG. 44, pronunciation symbols of the same syllables that appear multiple times in a word string for search results (pronunciation symbol string for search results) are distinguished with a number in parentheses.

That is to say, in FIG. 44, for example, in the word string for search results "SEKAI ISAN", the same pronunciation symbol "I" appears twice, but in the vector substitution information, of the pronunciation symbol of the syllable "I" that appears twice, the first pronunciation symbol is expressed as "I", and the second pronunciation symbol is expressed with "2(2)", wherein the numeral "(2)" with parentheses indicating that it is the second, is appended to the second pronunciation symbol "I", and thus, the pronunciation symbols of the syllable "I" that appears twice are distinguished respectively.

Note that with the vector substitution information, the pronunciation symbols of the same syllable that appears multiple times in the word string for search results can also be expressed without being distinguished.

That is to say, in FIG. 44, the same pronunciation symbol of the syllable "I" that appears twice in the word string for search results "SEKAI ISAN" can be expressed with a pair ("I, 2") made up of (an ID to identify) the syllable "I" and the frequency "2" that the syllable "I" appears.

As in the above, with the memory built into the matching unit 56, in the case of storing the vector substitution information instead of the vector for search results, access to the components that are 0 of the vectors for search results (readout of the 0 components from the memory) which had been necessary in the case of stored the vectors for search results is not necessary with matching, whereby in addition to reducing the memory storage capacity, the matching can be performed at a higher speed.

Figure 45:
FIG. 45 is a diagram describing calculations of the degree of similarity between the voice recognition results and word string for search results, in the case of using vector substitution information instead of vector for search results.

FIG. 45 is a diagram describing calculation of the degree of similarity between the voice recognition result and the word string for search results in the case of storing the vector substitution information instead of the vector for search results in the memory built into the matching unit 56.

Figure 46:
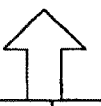
FIG. 46 is a diagram describing a method to create a reverse lookup index from the vector substitution information of the word string for search results.

Note that in FIG. 45, similar to FIG. 44, the pronunciation symbols of the same syllable that appears multiple times in the word string for search results is expressed being distinguished in the vector substitution information. The following FIG. 46 and FIG. 47 are also similar.

Also, in FIG. 45, similar to the (pronunciation symbol string for search results of the) word string for search results being expressed with vector substitution information instead of vectors for search results, the (recognition result pronunciation symbol string of the) voice recognition results also are expressed with vector substitution information instead of recognition result vectors. The following FIG. 47 is also similar.

In the case of finding the cosine distance or correction distance as the degree of similarity between the voice recognition result and word string for search results, the inner product $V_{UTR} \cdot V_{TITLE}(i)$ of the recognition result vector $V_{UTR}$ and the size $|V_{UTR}|$ of the recognition result vector $V_{UTR}$ is necessary.

Also, in the case of finding the cosine distance and the first correction distance of the correction distances, the size $|V_{TITLE}(i)|$ of the vector for search results $V_{TITLE}(i)$ is further necessary.

The size $|V_{UTR}|$ of the recognition result vector $V_{UTR}$ can be found by calculating the square root of the sum of the number of pronunciation symbols serving as the components to make up the vector substitution information of the voice recognition results.

The size $|V_{TITLE}(i)|$ of the vector for search results $V_{TITLE}(i)$ can also be obtained similar to the size $|V_{UTR}|$ of the recognition result vector $V_{UTR}$, by using vector substitution information of the word string for search results.

Also, in the case that the inner product $V_{UTR} \cdot V_{TITLE}(i)$ has an initial value of 0, and the pronunciation symbols making up the vector substitution information of the voice recognition result are sequentially caused to be focus symbols, and a pronunciation symbol that matches the focus symbol exists in the vector substitution information of the word string for search results, the inner product $V_{UTR} \cdot V_{TITLE}(i)$ of the recognition result vector $V_{UTR}$ and the vector for search results $V_{TITLE}(i)_{can}$ be found by incrementing the inner product $V_{UTR} \cdot V_{TITLE}(i)$ by 1 at a time.

Accordingly, the cosine distance and correction distance as the degree of similarity between the voice recognition result and word string for search result can be found using the vector substitution information for the voice recognition results and the word string for search results.

Now, as described above, in the case that a pronunciation symbol that matches the focus symbol of the pronunciation symbols making up the vector substitution information of the voice recognition results exists in the vector substitution information of the word string for search results, with a method to find the inner product $V_{UTR} \cdot V_{TITLE}(i)$ by incrementing the inner product $V_{UTR} \cdot V_{TITLE}(i)$ by 1 at a time (hereafter, also called the first inner product calculating method), each one of the pronunciation symbols making up the vector substitution information of the word string for search results stored in the memory built into the matching unit 56 needs to be confirmed as to whether each matches the focus symbol.

Accordingly, with the first inner product calculating method, with the point of having to access the pronunciation symbols that do not match the pronunciation symbols making up the vector substitution information of the voice recognition results, of the pronunciation symbols making up the vector substitution information of the word string for search results, the calculation of the inner product $V_{UTR} \cdot V_{TITLE}(i)$, and therefore the matching, requires time.

Thus, with the matching unit 56, from the pronunciation symbols, a reverse lookup that can search a word string for search results that is in the vector substitution information for the pronunciation symbol thereof can be created beforehand from the vector substitution information of the word string for search results, and using the reverse lookup index thereof, the inner product $V_{UTR} \cdot V_{TITLE}(i)$ can be calculated.

Now, the vector substitution information can be said to be an index which can search for pronunciation symbols of a syllable from a word string for search results that the word string for search results thereof has, but according to the reverse index, the search of the reverse thereof, i.e. from the pronunciation symbols, the pronunciation symbols thereof can be searched from the word string for search results that the vector substitution information has.

FIG. 46 is a diagram describing a method to create a reverse lookup index from the vector substitution information of the word string for search results.

The matching unit 56 creates a reverse lookup index for the pronunciation symbols that are to become components of the vector substitution information, by correlating the pronunciation symbols and an ID for search results that identifies the word string for search results having the pronunciation symbols thereof as components of the vector substitution information.

According to the reverse lookup index in FIG. 46, for example a word string for search results having the pronunciation symbol "I" as a component of the vector substitution information can be detected (searched) immediately as a word string for search results having an ID for search results of 3 and a word string for search results having an ID for search results of 3.

FIG. 47 is a diagram describing a method to calculate the inner product $V_{UTR} \cdot V_{TITLE}(i)$, using the reverse lookup index (also called a second inner product calculating method).

With the second inner product calculating method, the matching unit 56 sets the initial value of the inner product $V_{UTR} \cdot V_{TITLE}(i)$ to 0, causes the pronunciation symbols making up the vector substitution information of the voice recognition result to sequentially be focus symbols, and from the reverse lookup index, detects (the ID for search results of) a word string for search results that has the pronunciation symbol matching the focus symbol as a component of the vector substitution information.

Also, for a word string for search results that has the pronunciation symbol matching the focus symbol as a component of the vector substitution information, the matching unit 56 increments the inner product $V_{UTR} \cdot V_{TITLE}(i)$ for the word string for search results thereof by 1 at a time.

According to the second inner product calculating method, of the pronunciation symbols of the reverse lookup index, a pronunciation symbol that does not match the pronunciation symbols making up the vector substitution information of the voice recognition results is not accessed, whereby to that point, the calculation of the inner product $V_{UTR} \cdot V_{TITLE}(i)$ can be performed in a shorter amount of time than with the first inner product calculating method, and consequently, matching at a higher speed can be accommodated.

Note that, additionally, of the calculations of the degree of similarity, the calculation portions that can be performed before the voice recognition is performed with the voice recognition unit 51 is performed beforehand, and by holding this in the memory built into the matching unit 56, matching at a higher speed can be accommodated.

That is to say, for example, in the case of employing cosine distance or the first correction distance as the degree of similarity, as described above, the inner product $V_{UTR} \cdot V_{TITLE}(i)$, the size $|V_{UTR}|$ of the recognition vector $V_{UTR}$, and the size $|V_{TITLE}(i)|$ of the vector for search results $V_{TITLE}(i)$ are necessary.

Of the inner product $V_{UTR} \cdot V_{TITLE}(i)$, the size $|V_{UTR}|$ of the recognition vector $V_{UTR}$, and the size $|V_{TITLE}|$ of the vector for search results $V_{TITLE}(i)$, the size $|V_{TITLE}(i)|$ of the vector for search results $V_{TITLE}(i)$ can be calculated before voice recognition is performed.

Accordingly, the size $|V_{TITLE}(i)|$ of the vector for search results $V_{TITLE}(i)$ can be calculated beforehand, and by holding this in the memory built into the matching unit 56, matching at a higher speed can be accommodated.

[Processing of the Voice Searching Device 50]

Figure 48:
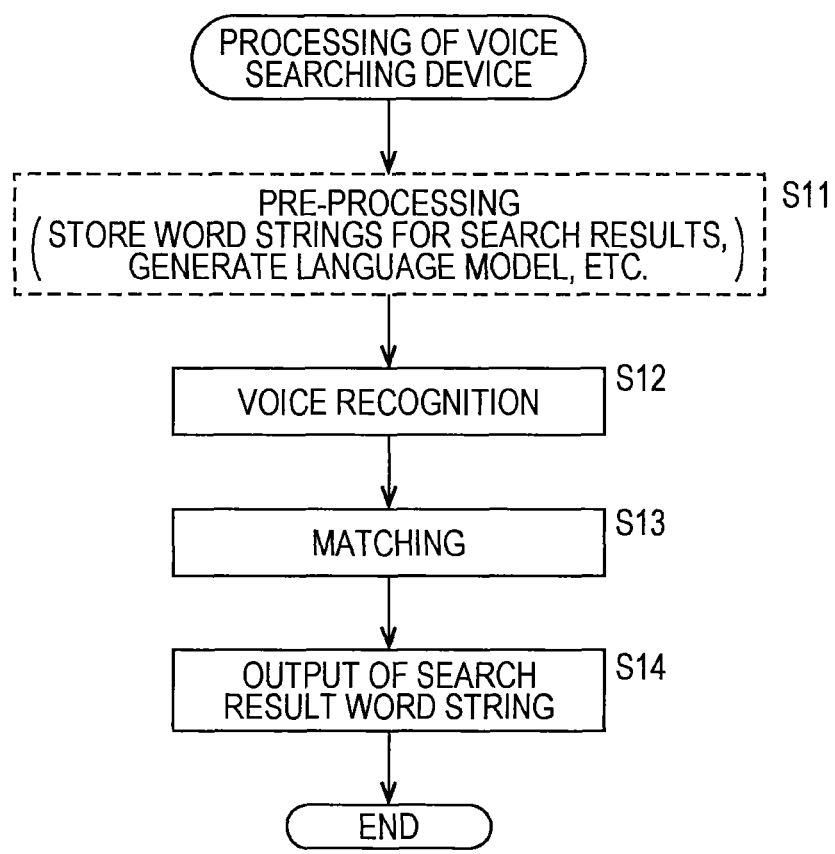
FIG. 48 is a flowchart describing the processing of the voice searching device 50.

FIG. 48 is a flowchart describing the processing of the voice searching device 50 in FIG. 9 (and FIG. 10).

In step S11, the voice searching device 50 performs necessary pre-processing.

That is to say, as pre-processing, the voice searching device 50 performs processing to read out the program title, entertainer names, detailed information, and so forth which are configuration elements making up the EPG that is stored in the storage medium 63, supplies this to the storage unit for search results 53, and stores this as word strings for search results, for example.

Also, with the voice searching device 50, as pre-processing, the voice recognition unit 51 perform processing to use the word string for search results stored in the storage unit for search results 53 and generates a language model.

Note that the pre-processing in step S11 is performed at a predetermined point-in-time every day, for example. Alternatively, the pre-processing in step S11 is performed when the recorded program that is recorded in the storage medium 63 is changed, or when the EPG stored in the storage medium 63 is changed (updated), and so forth, for example.

Following the latest pre-processing, upon the user performing speech and the input voice of the speech thereof being supplied to the voice recognition unit 51, the voice recognition unit 51 subjects the input voice thereof to voice recognition in step S12.

Note that the voice recognition with the voice recognition unit 51 is performed using a language model generated with the latest pre-processing.

The voice recognition results obtained by the voice recognition unit 51 performing voice recognition of the input voice becomes recognition result pronunciation symbols via the pronunciation symbol converting unit 52, and are supplied to the matching unit 56.

Also, the word string for search results stored in the storage unit for search results 53 becomes a pronunciation symbol string for search results via the morpheme analyzing unit 54 and pronunciation symbol converting unit 55, and is supplied to the matching unit 56.

In step S13, the matching unit 56 matches the recognition result pronunciation symbol string supplied from the voice recognition unit 51 via the pronunciation symbol converting unit 52, and the pronunciation symbol string for search results supplied from the storage unit for search results 53 via the morpheme analysis unit 54 and pronunciation symbol converting unit 55, for each of all of the word strings for search results stored in the storage unit for search results 53, and supplies the matching results thereof to the output unit 57.

That is to say, the matching unit 56 calculates a correction distance or the like, for example, as a degree of similarity with the voice recognition results, for each of the word strings for search results stored in the storage unit for search results 53, and supplies the degrees of similarities thereof as matching results to the output unit 57.

Note that in the case that the recognition result pronunciation symbol string includes (pronunciation symbols of) an identified phrase, the matching unit 56 matches the recognition result pronunciation symbol string having the identified phrase thereof deleted, and the pronunciation symbol string for search results.

In step S14, the output unit 57 selects and outputs (a word string for search results serving as) a search result word string, which is the result of searching for a word string corresponding to the input voice from among the word strings for search results stored in the storage unit for search results 53, based on the matching results from the matching unit 56.

That is to say, the output unit 57 selects and outputs the word string for search results having a degree of similarity with the voice recognition results within the top N places, from among the word strings for search results stored in the storage unit for search results 53, as the search result word string.

Note that in the case that the word string for search results is a program title, entertainer name, or detailed information, for example, when an entertainer name (or detailed information), other than the title, for example, is in the word string for search results having a degree of similarity with the voice recognition results within the top N places, with the output unit 57, together with the entertainer name thereof, or instead of the entertainer name thereof, the program title having the entertainer name as metadata can be selected as the search result word string.

[Description of Computer to which the Present Invention is Applied]

Next, the above-described series of processing can be performed with hardware or can be performed with software. In the case of performing the series of processing with software, the program making up the software is installed on a general-use computer or the like.

Thus, FIG. 49 shows a configuration example of an embodiment of a computer wherein a program to execute the above-describe series of processing is installed.

The program can be recorded beforehand in a hard disk 105 or ROM 103 serving as the recording medium built into the computer.

Alternatively, the programs can be recorded on a removable recording medium 111. Such a removable recording medium 111 can be provided as so-called packaged software. Now, the removable recording medium 111 may be a flexible disk, CD-ROM (Compact Disc Read Only Memory), MO (Magneto Optical) disk, DVD (Digital Versatile Disc), magnetic disk, semiconductor memory, or the like.

Note that the program can be installed from the removable recording medium 111 such as described above, or can be downloaded to a computer via a communication network or broadcast network and installed on a built-in hard disk 105. That is to say, the program can be transferred wirelessly to the computer from a download site via a satellite for digital satellite broadcasting, or can be transferred to the computer by cable, via a network such as a LAN (Local Area Network) or the Internet.

The computer as a CPU (Central Processing Unit) 102 built in, and an input/output interface 110 is connected to the CPU 102 via a bus 101.

The CPU 102, upon a command being input by the user operating the input unit 107 and so forth via the input/output interface 110, accordingly executes the program stored in the ROM (Read Only Memory) 103. Alternatively, the CPU 102 loads the program stored on the hard disk 105 to the RAM (Random Access Memory) 104 and executes this.

Thus, the CPU 102 performs processing according to the above-describe flowchart, or processing that is performed with the above-described block diagram configurations. The CPU 102 then, as needed, for example, outputs the processing results thereof from the output unit 106 via the input/output interface 110, or transmits from a communication unit 108, and further stores this on the hard disk 105, and so forth.

Note that the input unit 107 is made up of a keyboard, mouse, microphone, and the like. The output unit 106 is made up of a LCD (Liquid Crystal Display) or speaker and the like.

Now, according to the present Specification, the processing that the computer performs according to the program does not necessarily have to be performed in a time-series manner following the order described as the flowchart. That is to say, processing that the computer performs according to the program includes processing executed concurrently or individually (e.g., parallel processing or processing by object).

Also, the program may be processed with one computer (processor), or may be distributed and processed by multiple computers. Further, the program may be transferred to a computer at a distance and executed.

Note that the embodiment according to the present invention is not restricted to the above-described embodiment, and various modifications can be made without departing from the spirit and scope of the present invention.

That is to say, for example, the input voice languages are not restricted to Japanese and English.

REFERENCE SIGNS LIST 11 voice recognition unit
12 pronunciation symbol converting unit
13 storage unit for search results
14 morpheme analyzing unit
15 pronunciation symbol converting unit
16 matching unit
17 output unit
21 pronunciation symbol converting unit
31 storage unit for search results
41 voice recognition unit
51 voice recognition unit
52 pronunciation symbol converting unit
53 storage unit for search results
54 morpheme analyzing unit
55 pronunciation symbol converting unit
56 matching unit
57 output unit
60 recorder function unit
61 tuner
62 recording/playing unit
63 recording medium
71 command determining unit
72 control unit
73 output I/F
81 recognition unit
82 dictionary storage unit
83 acoustic model storage unit
84 language model storage unit
85 language model generating unit
91 total score calculating unit
92 program title total score calculating unit
93 entertainer name total score calculating unit
94 detailed information total score calculating unit
95 score comparison ordering unit
96 similarity comparison ordering unit
101 bus
102 CPU
103 ROM
104 RAM
105 hard disk
106 output unit
107 input unit
108 communication unit
109 drive
110 input/output interface
111 removable recording medium

The invention claimed is:

1. A searching device, comprising:
circuitry configured to:
subject input speech to speech recognition;
match a pronunciation symbol string for search results and a recognition result pronunciation symbol string based on calculation of a correction distance, for each of a plurality of word strings for search results, wherein said plurality of word strings for search results are to be search results for word strings that correspond to said input speech,
wherein said pronunciation symbol string for search results is an array of pronunciation symbols that express pronunciation of each of said plurality of word strings for search results, and each of said pronunciation symbols is a symbol that expresses pronunciation of a syllable or a phoneme,
wherein said recognition result pronunciation symbol string is an array of pronunciation symbols that express pronunciation of speech recognition results of said input speech, and
wherein said circuitry is configured to calculate said correction distance based on a relationship between a vector for search results which is a vector that expresses said pronunciation symbol string for search results, a recognition result vector which is a vector that expresses said recognition result pronunciation symbol string, and a square root of a value obtained by multiplication of a size of said vector for search results and a size of said recognition result vector; and
output a search result word string which is a result of search for said word strings that correspond to said input speech from said plurality of word strings for search results, based on matching results of said pronunciation symbol string for search results and said recognition result pronunciation symbol string for each of said plurality of word strings for search results.

2. The searching device according to claim 1, wherein said circuitry is further configured to convert said speech recognition results of said input speech into said recognition result pronunciation symbol string.

3. The searching device according to claim 2, wherein said circuitry is further configured to convert said plurality of word strings for search results of a plurality of determined fields into said pronunciation symbol string for search results.

4. The searching device according to claim 1, wherein said circuitry is further configured to calculate said correction distance based on said square root of said value obtained by said multiplication of said size of said vector for search results and said size of said recognition result vector, instead of said size of said vector for search results.

5. The searching device according to claim 1, wherein said circuitry is further configured to calculate said correction distance based on said size of said recognition result vector, instead of said size of said vector for search results.

6. The searching device according to claim 1, wherein said circuitry is further configured to calculate said correction distance by division of an inner product of said recognition result vector and said vector for search results by a product of said size of said recognition result vector and said square root of said value obtained by multiplication of said size of said vector for search results and said size of said recognition result vector.

7. The searching device according to claim 1, wherein said correction distance is calculated by correction of a cosine distance of a vector-space method so as to reduce influence from a difference in string length between said pronunciation symbol string for search results and said recognition result pronunciation symbol string.

8. The searching device according to claim 7, wherein said cosine distance is a distance between said vector for search results and said recognition result vector.

9. The searching device according to claim 1, wherein said circuitry is further configured to match said pronunciation symbol string for search results and said recognition result pronunciation symbol string in increments of two-gram or more notation symbols.

10. A searching method to search for a word string corresponding to input speech, said searching method comprising:

subjecting said input speech to speech recognition;

matching, using circuitry, a pronunciation symbol string for search results and a recognition result pronunciation symbol string based on calculation of a correction distance, regarding each of a plurality of word strings for search results, wherein said plurality of word strings for search results are to be search results for word strings corresponding to said input speech, said pronunciation symbol string for search results being an array of pronunciation symbols expressing pronunciation of each of said plurality of word strings for search results, and each of said pronunciation symbols being a symbol expressing pronunciation of a syllable or a phoneme, said recognition result pronunciation symbol string being an array of pronunciation symbols expressing pronunciation of speech recognition results of said input speech, wherein said correction distance is calculated based on a relationship between a vector for search results which is a vector that expresses said pronunciation symbol string for search results, a recognition result vector which is a vector that expresses said recognition result pronunciation symbol string, and a square root of a value obtained by multiplication of a size of said vector for search results and a size of said recognition result vector; and outputting a search result word string, which is a result of searching said word strings corresponding to said input speech from said plurality of word strings for search results, based on matching results of said pronunciation symbol string for search results and said recognition result pronunciation symbol string regarding each of said plurality of word strings for search results.

11. A non-transitory computer-readable storage medium including computer-executable instructions, which when executed by a computer cause said computer to execute operations, comprising:

subjecting input speech to speech recognition;

matching a pronunciation symbol string for search results and a recognition result pronunciation symbol string by calculating a correction distance, regarding each of a plurality of word strings for search results, wherein said plurality of word strings for search results are to be search results for word strings corresponding to said input speech, said pronunciation symbol string for search results being an array of pronunciation symbols expressing pronunciation of each of said plurality of word strings for search results, and each of said pronunciation symbols being a symbol expressing pronunciation of a syllable or a phoneme, said recognition result pronunciation symbol string being an array of pronunciation symbols expressing pronunciation of speech recognition results of said input speech, wherein said correction distance is calculated based on a relationship between a vector for search results which is a vector that expresses said pronunciation symbol string for search results, a recognition result vector which is a vector that expresses said recognition result pronunciation symbol string, and a square root of a value obtained by multiplication of a size of said vector for search results and a size of said recognition result vector; and outputting a search result word string which is a result of searching said word strings corresponding to said input speech from said plurality of word strings for search results, based on matching results of said pronunciation symbol string for search results and said recognition result pronunciation symbol string regarding each of said plurality of word strings for search results.

* * * * *